(12) United States Patent
Obama et al.

(10) Patent No.: US 10,451,858 B2
(45) Date of Patent: Oct. 22, 2019

(54) ZOOM OPTICAL SYSTEM, OPTICAL DEVICE AND METHOD FOR MANUFACTURING THE ZOOM OPTICAL SYSTEM

(71) Applicant: Nikon Corporation, Minato-ku, Tokyo (JP)

(72) Inventors: Akihiko Obama, Tokyo (JP); Kensuke Uchida, Fujisawa (JP)

(73) Assignee: Nikon Corporation, Tokyo (JP)

( * ) Notice: Subject to any disclaimer, the term of this patent is extended or adjusted under 35 U.S.C. 154(b) by 10 days.

(21) Appl. No.: 15/299,451

(22) Filed: Oct. 20, 2016

(65) Prior Publication Data

US 2017/0115472 A1 Apr. 27, 2017

Related U.S. Application Data

(63) Continuation of application No. PCT/JP2015/002101, filed on Apr. 16, 2015.

(30) Foreign Application Priority Data

Apr. 21, 2014 (JP) .................................. 2014-087085
Apr. 21, 2014 (JP) .................................. 2014-087086

(Continued)

(51) Int. Cl.
*G02B 15/20* (2006.01)
*G02B 5/00* (2006.01)
(Continued)

(52) U.S. Cl.
CPC ............. *G02B 15/20* (2013.01); *G02B 5/005* (2013.01); *G02B 7/021* (2013.01); *G02B 7/10* (2013.01);
(Continued)

(58) Field of Classification Search
CPC ...... G02B 13/009; G02B 15/14; G02B 15/15; G02B 15/16; G02B 15/163; G02B 15/167; G02B 15/20; G02B 15/22; G02B 15/24
(Continued)

(56) References Cited

U.S. PATENT DOCUMENTS 5,202,992 A  4/1993  Banno et al.
5,241,420 A  8/1993  Yamanashi
(Continued)

FOREIGN PATENT DOCUMENTS

CN     1755413 A    4/2006
CN   103389571 A   11/2013
(Continued)

OTHER PUBLICATIONS

Office Action dated Aug. 8, 2017, in Japanese Patent Application No. 2014-087086.
(Continued)

*Primary Examiner* — Darryl J Collins
(74) *Attorney, Agent, or Firm* — Shapiro, Gabor and Rosenberger, PLLC

(57) ABSTRACT

A first lens group having positive refractive power, a second lens group having negative refractive power, a third lens group having positive refractive power, a fourth lens group having positive refractive power, a fifth lens group are arranged in order from an object. Respective distances between the first and second lens groups, the second and third lens groups, the third and fourth lens groups, and the fourth lens and fifth lens groups change upon zooming, and a lens group arranged closest to an image is approximately fixed relative to an image surface upon zooming. The third lens group moves along the optical axis upon focusing, and the following expression (1) is satisfied:

$$0.480 < f3/ft < 4.000 \quad (1)$$

(Continued)

where ft denotes a focal length of the zoom optical system in a telephoto end state, and f3 denotes a focal length of the third lens group.

47 Claims, 45 Drawing Sheets

(30) Foreign Application Priority Data

Apr. 21, 2014 (JP) .................. 2014-087087
Apr. 21, 2014 (JP) .................. 2014-087088

(51) Int. Cl.
*G02B 7/02* (2006.01)
*G02B 7/10* (2006.01)
*G02B 27/00* (2006.01)
*G02B 15/173* (2006.01)

(52) U.S. Cl.
CPC ....... *G02B 15/173* (2013.01); *G02B 27/0025* (2013.01)

(58) Field of Classification Search
USPC .................. 359/676–679, 683–685
See application file for complete search history.

(56) References Cited

U.S. PATENT DOCUMENTS

| | | | |
|---|---|---|---|
| 5,477,297 A | 12/1995 | Suzuki | |
| 5,537,255 A | 7/1996 | Tochigi | |
| 6,010,537 A | 1/2000 | Konno et al. | |
| 6,989,942 B1 | 1/2006 | Nurishi | |
| 7,817,347 B2* | 10/2010 | Watanebe | G02B 15/177 359/684 |
| 2006/0066954 A1 | 3/2006 | Sato | |
| 2006/0268428 A1 | 11/2006 | Kuroda et al. | |
| 2007/0188887 A1* | 8/2007 | Ohtake | G02B 15/173 359/687 |
| 2007/0236806 A1 | 10/2007 | Ori | |
| 2008/0212184 A1 | 9/2008 | Ohtake | |
| 2008/0218878 A1 | 9/2008 | Arai et al. | |
| 2009/0015939 A1 | 1/2009 | Muramatsu | |
| 2009/0116121 A1* | 5/2009 | Take | G02B 15/173 359/687 |
| 2009/0135498 A1 | 5/2009 | Take | |
| 2009/0284842 A1 | 11/2009 | Chang | |
| 2010/0214658 A1 | 8/2010 | Ito | |
| 2011/0080652 A1 | 4/2011 | Nakayama et al. | |
| 2011/0085249 A1 | 4/2011 | Seo | |
| 2011/0141576 A1 | 6/2011 | Seo | |
| 2011/0222166 A1 | 9/2011 | Iwasawa | |
| 2012/0026602 A1 | 2/2012 | Uchida et al. | |
| 2013/0148005 A1 | 6/2013 | Imaoka et al. | |
| 2013/0286276 A1* | 10/2013 | Kawamura | G02B 15/14 348/345 |
| 2013/0301141 A1 | 11/2013 | Ryu | |
| 2014/0361337 A1 | 12/2014 | Sugiyama et al. | |
| 2015/0055221 A1 | 2/2015 | Yokoi | |

FOREIGN PATENT DOCUMENTS

| | | |
|---|---|---|
| JP | 03-154014 A | 7/1991 |
| JP | 03-177806 A | 8/1991 |
| JP | 04-013110 A | 1/1992 |
| JP | H5-27172 A | 2/1993 |
| JP | 07-092431 A | 4/1995 |
| JP | 07-151967 A | 6/1995 |
| JP | H07-318805 A | 12/1995 |
| JP | H8-179214 A | 7/1996 |
| JP | 11-064728 A | 3/1999 |
| JP | 11-202202 A | 7/1999 |
| JP | 2001-100099 A | 4/2001 |
| JP | 2003-287680 A | 10/2003 |
| JP | 2006-113257 A | 4/2006 |
| JP | 2006-301474 A | 11/2006 |
| JP | 2007-279351 A | 10/2007 |
| JP | 2007-293051 A | 11/2007 |
| JP | 2008-107448 A | 5/2008 |
| JP | 2008-216481 A | 9/2008 |
| JP | 2008-216667 A | 9/2008 |
| JP | 2009-115874 A | 5/2009 |
| JP | 2010-191334 A | 9/2010 |
| JP | 2011-081112 A | 4/2011 |
| JP | 2011-090185 A | 5/2011 |
| JP | 2012-027217 A | 2/2012 |
| JP | 2012-053444 A | 3/2012 |
| JP | 2012-150248 A | 8/2012 |
| JP | 2012-212087 A | 11/2012 |
| JP | 2013-125126 A | 6/2013 |
| JP | 2015-206892 A | 11/2015 |
| WO | WO 2012/026088 A1 | 3/2012 |
| WO | WO 2013/146758 A1 | 10/2013 |

OTHER PUBLICATIONS

Office Action dated Sep. 5, 2017, in Japanese Patent Application No. 2014-087085.
Office Action dated Sep. 5, 2017, in Japanese Patent Application No. 2014-087087.
Office Action dated Sep. 5, 2017, in Japanese Patent Application No. 2014-087088.
International Search Report for International Patent Application No. PCT/JP2015/002101, dated Jul. 21, 2015.
Written Opinion of the International Searching Authority for PCT/JP2015/002101, dated Jul. 21, 2015.
Office Action dated May 3, 2018, in Chinese Patent Application No. 201580030859.X.
Office Action dated May 1, 2018, in Japanese Patent Application No. 2014-087087.
Office Action dated May 1, 2018, in Japanese Patent Application No. 2014-087088.
Decision of Refusal dated Mar. 13, 2018 in Japanese Patent Application No. 2014-087086.
Office Action dated Mar. 19, 2019, in Japanese Patent Application No. 2018-107436.
Decision of Refusal dated Jul. 9, 2019, in Japanese Patent Application No. 2018-107436.
Office Action dated Aug. 27 2019, in Japanese Patent Application No. 2018-227769.

* cited by examiner

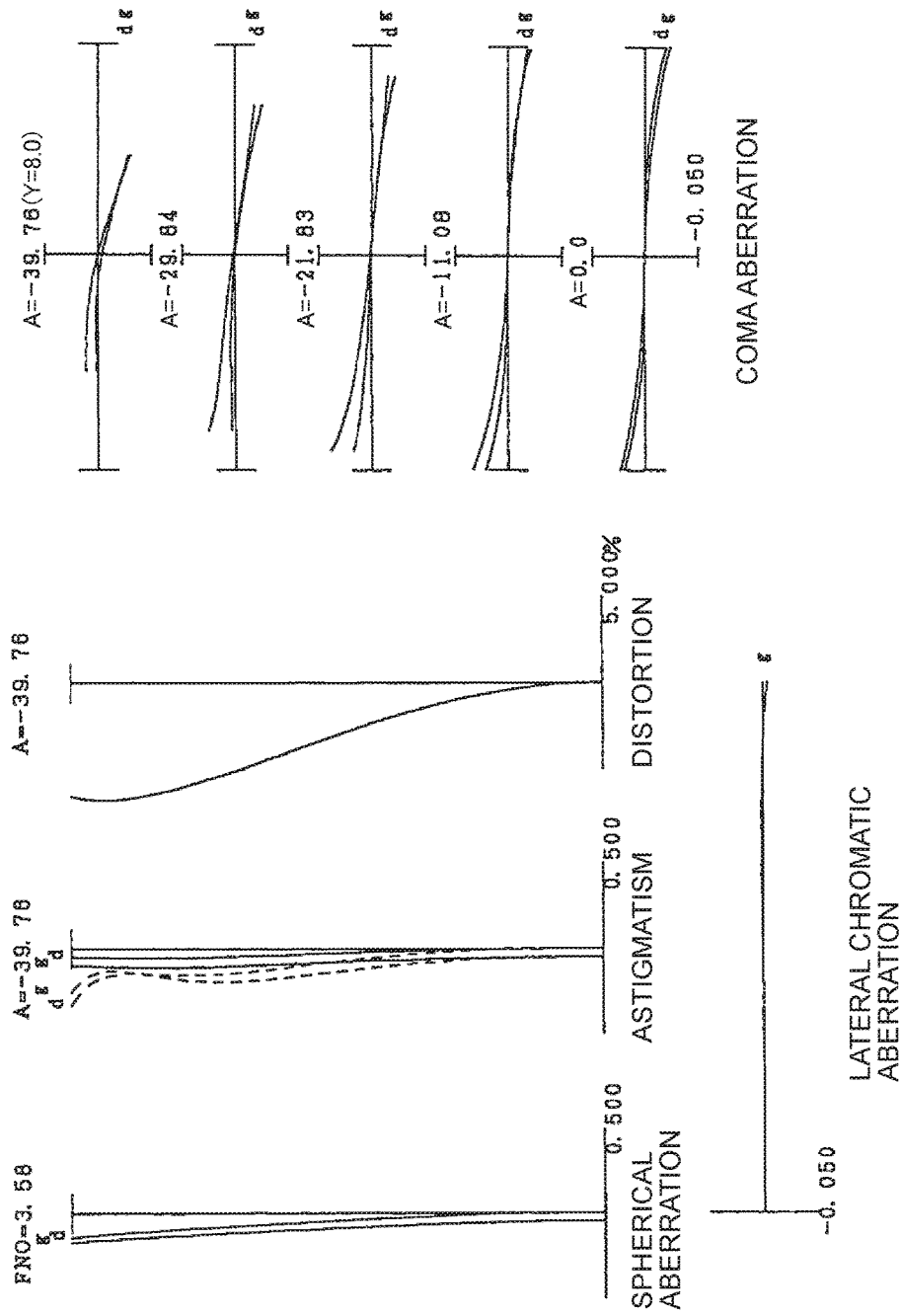

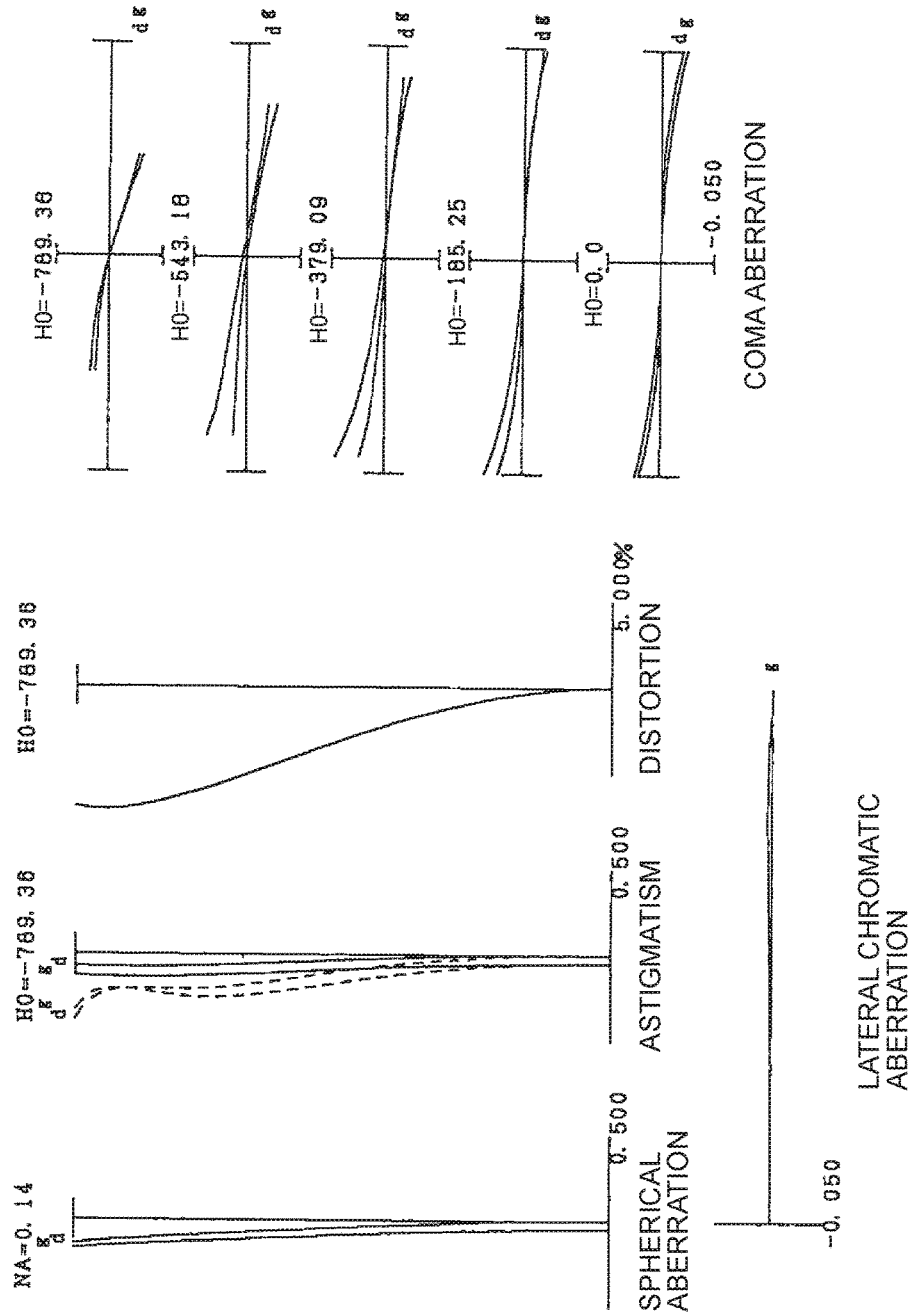

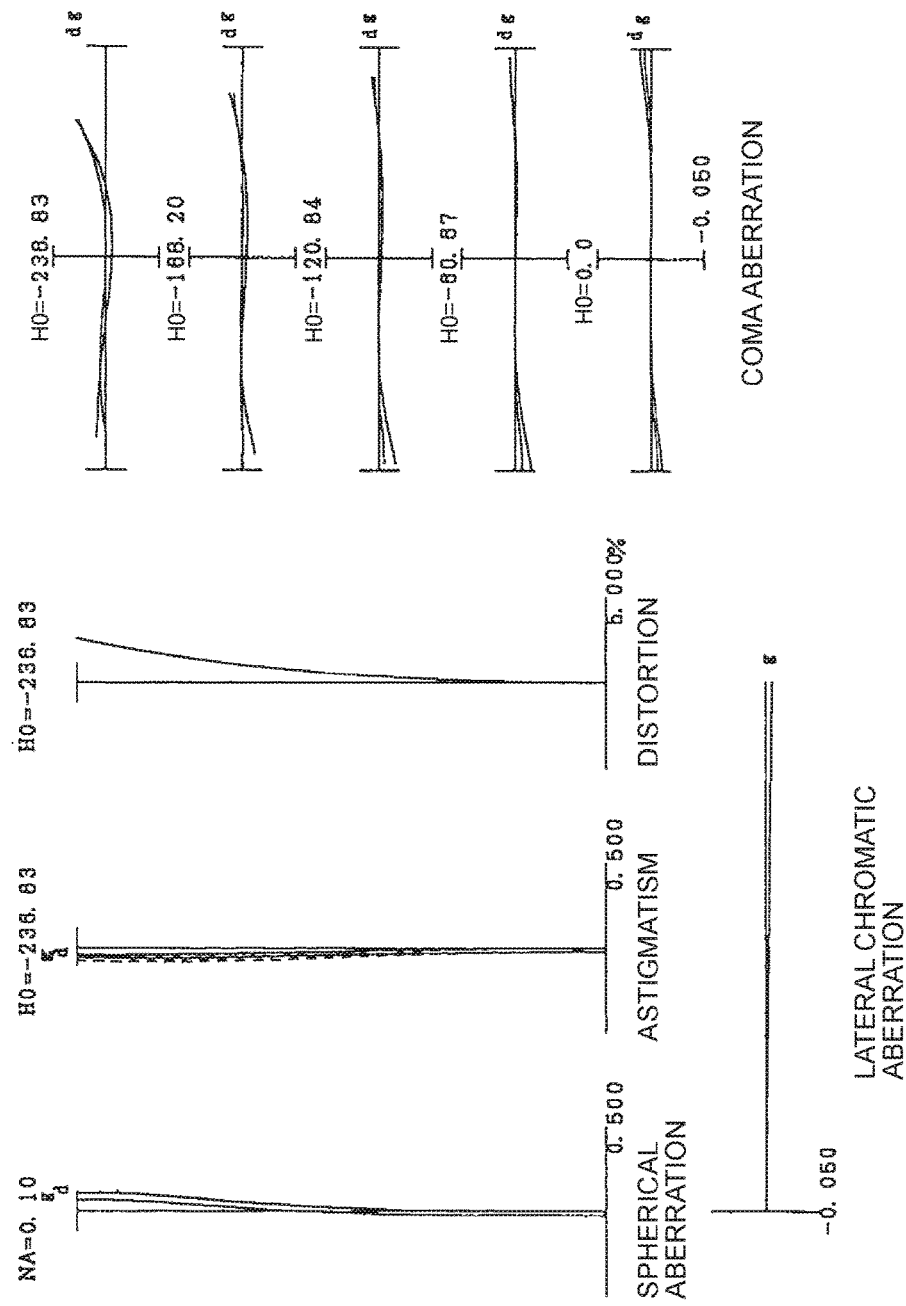

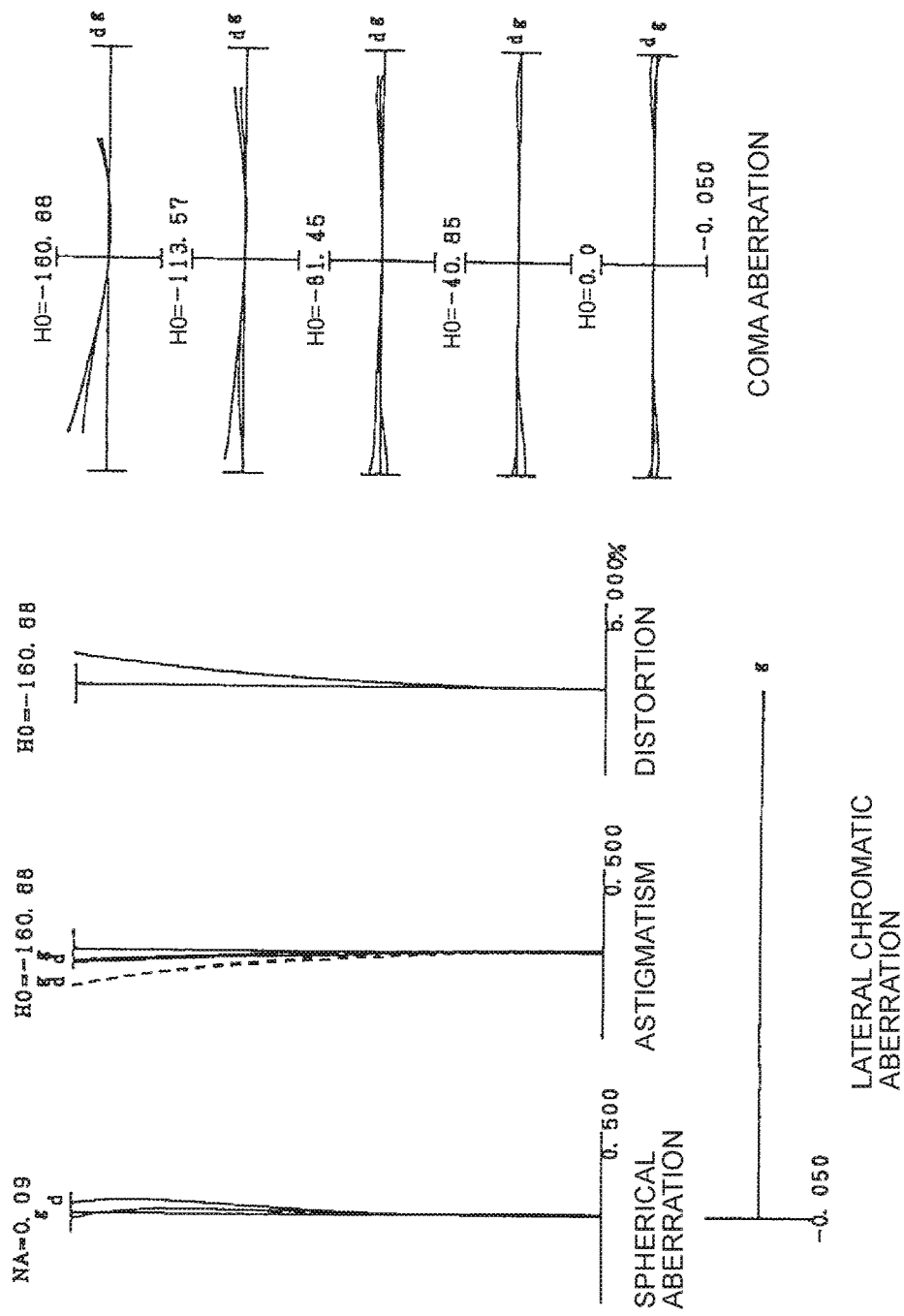

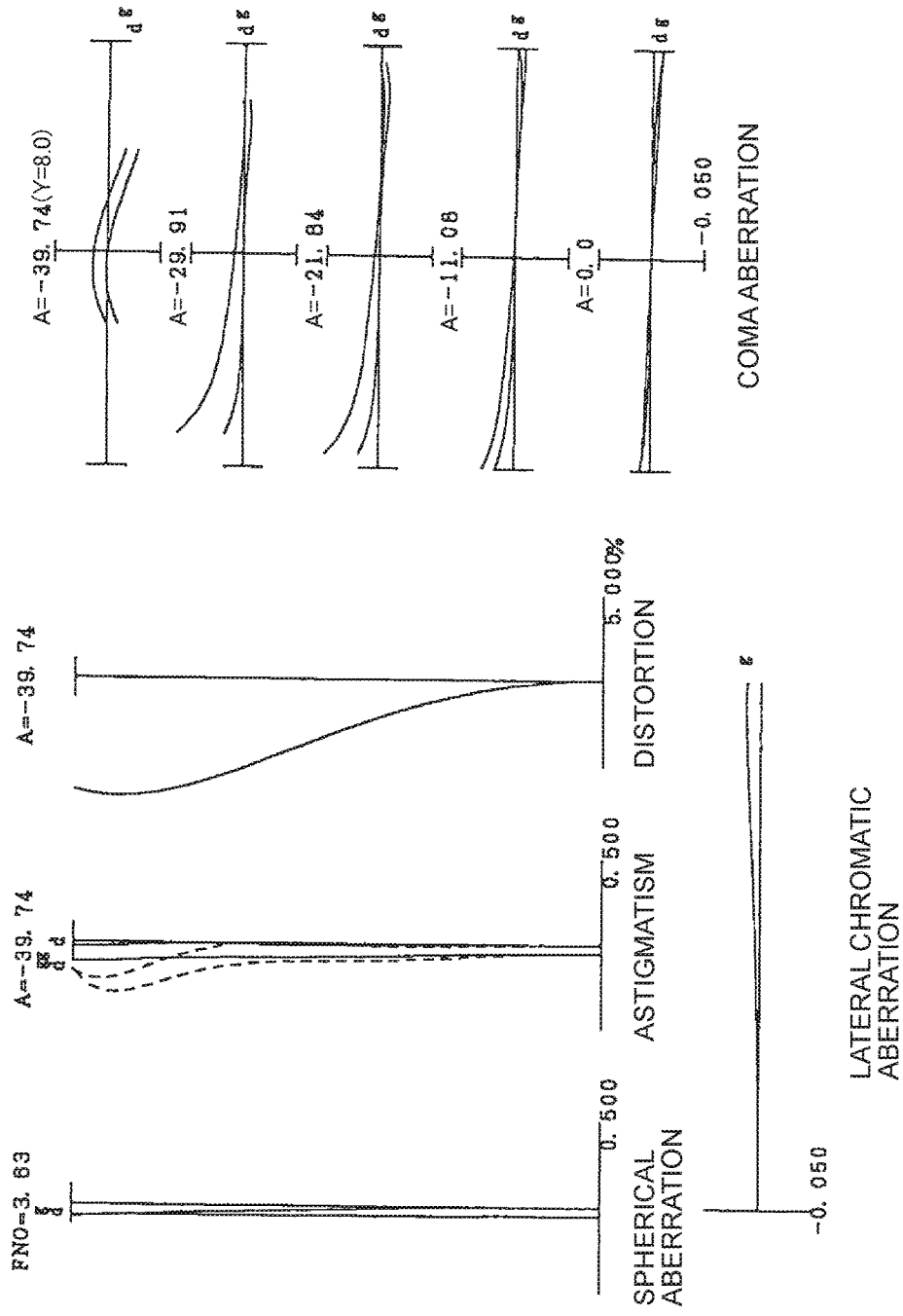

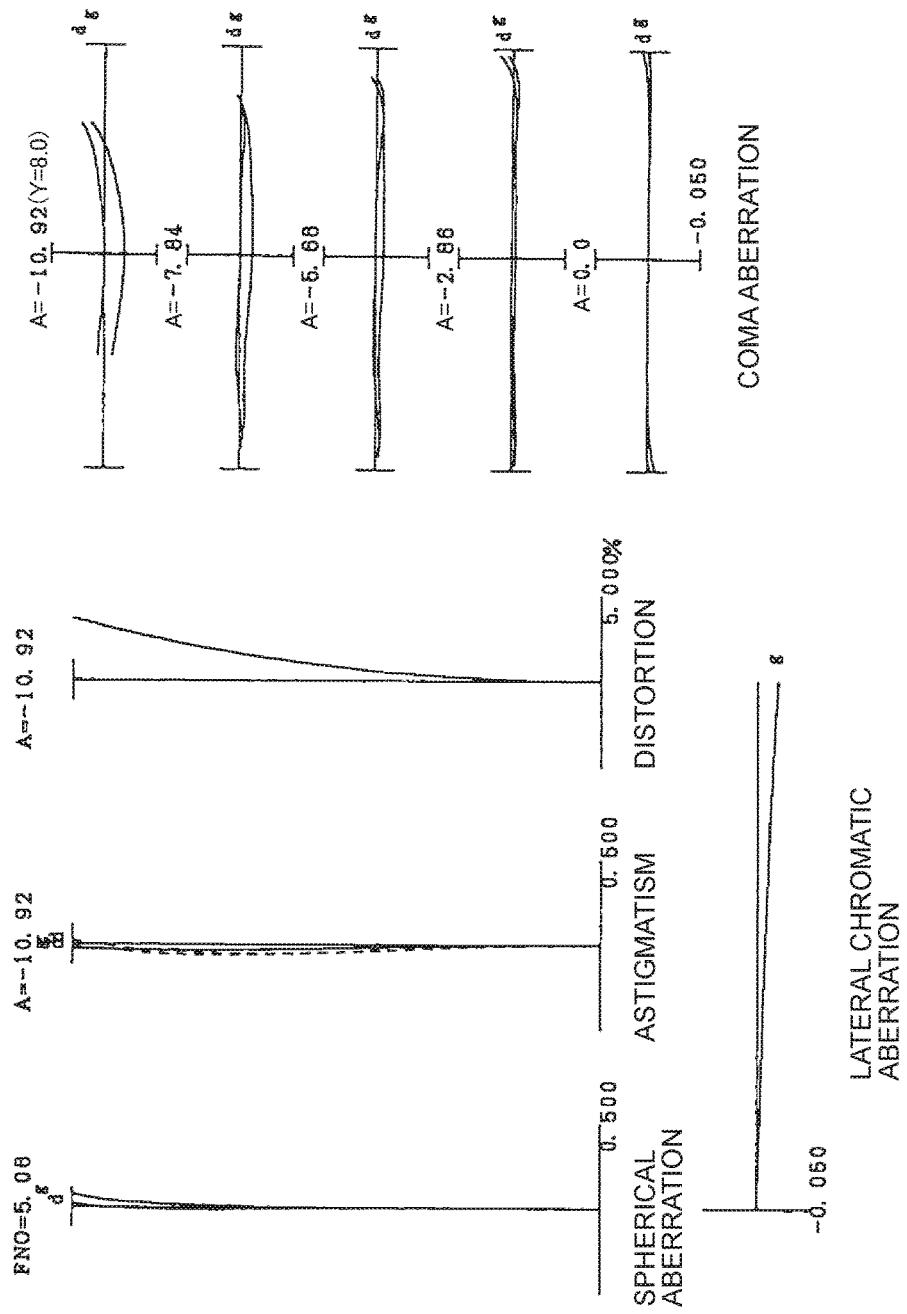

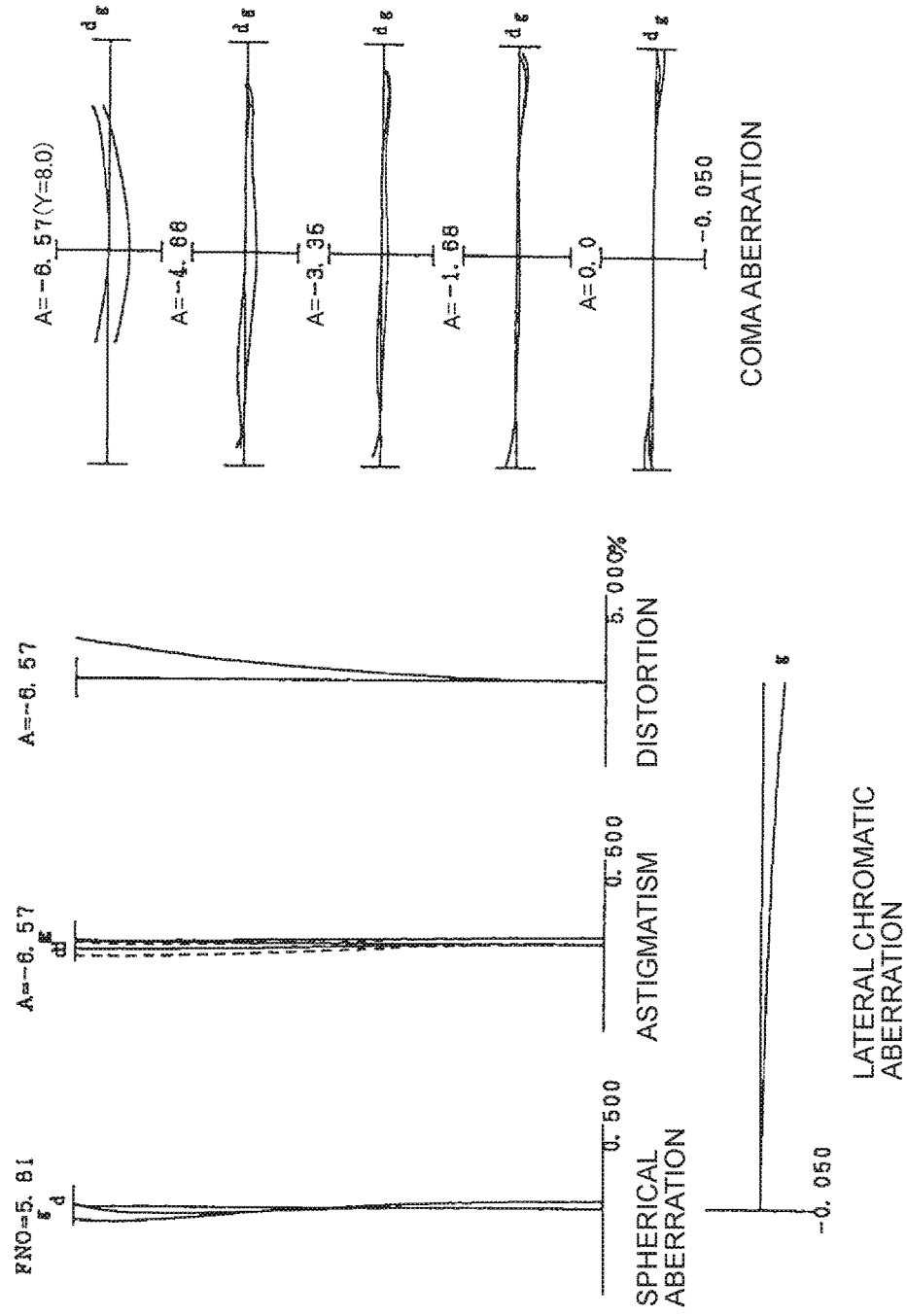

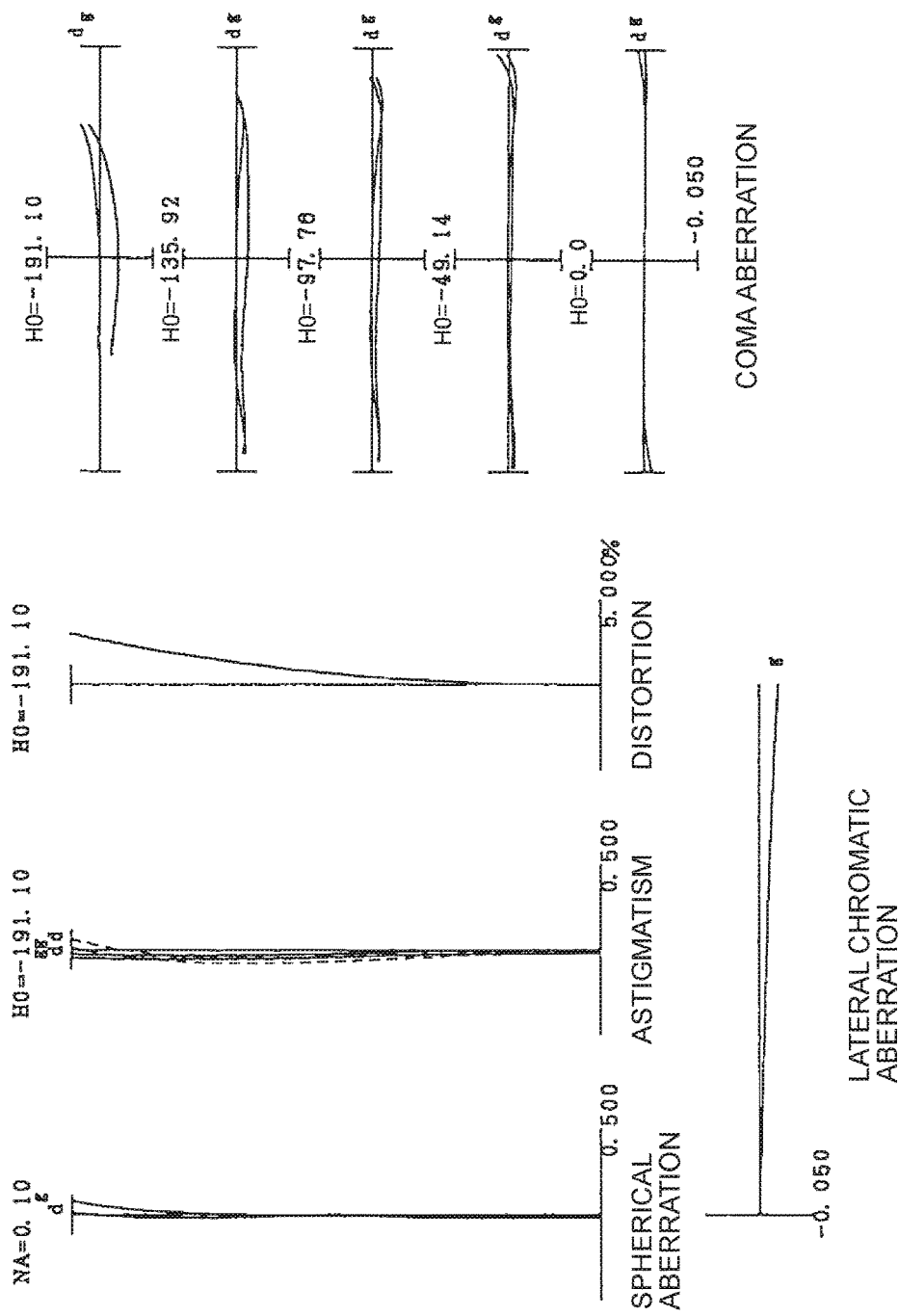

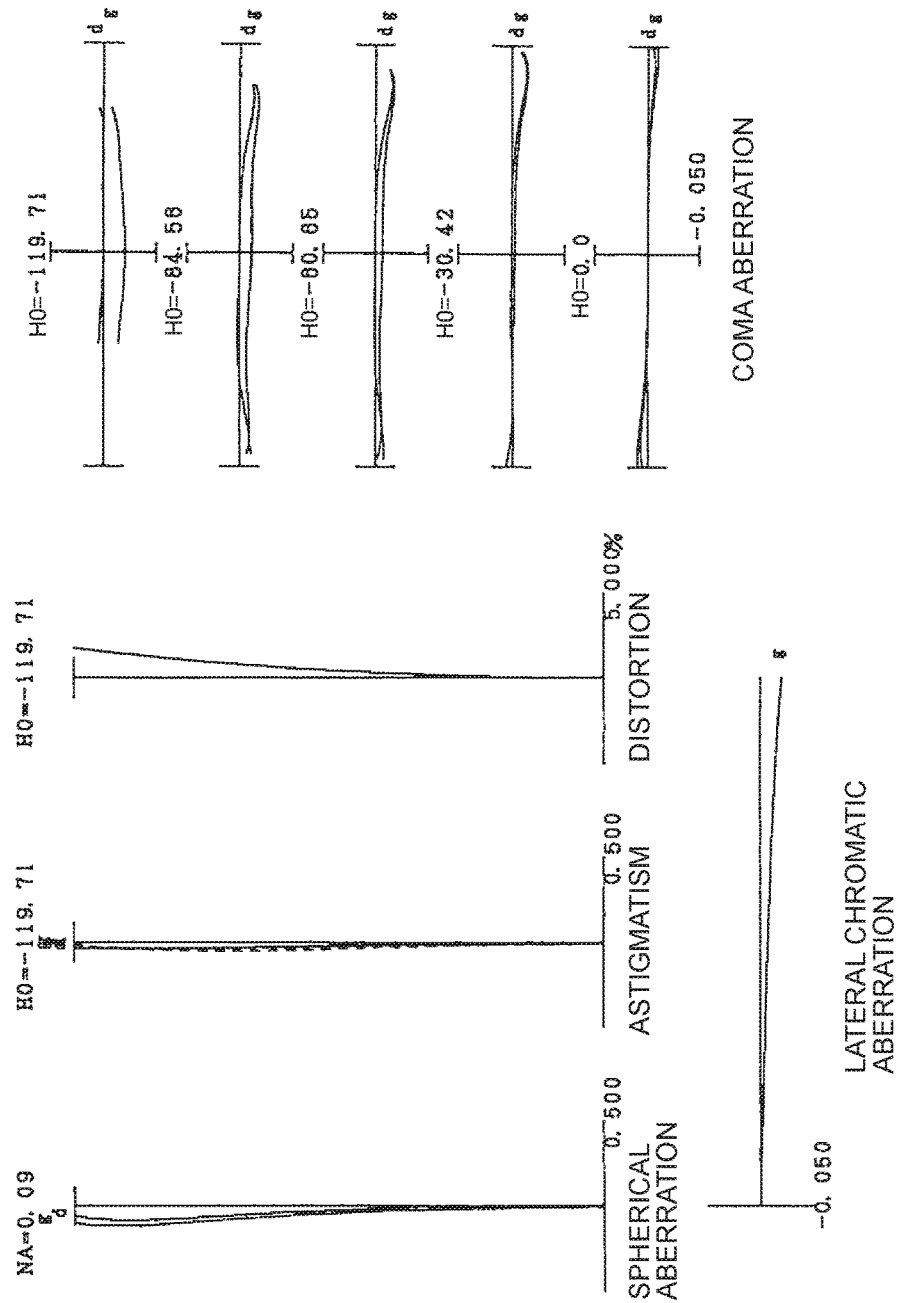

FIG.9
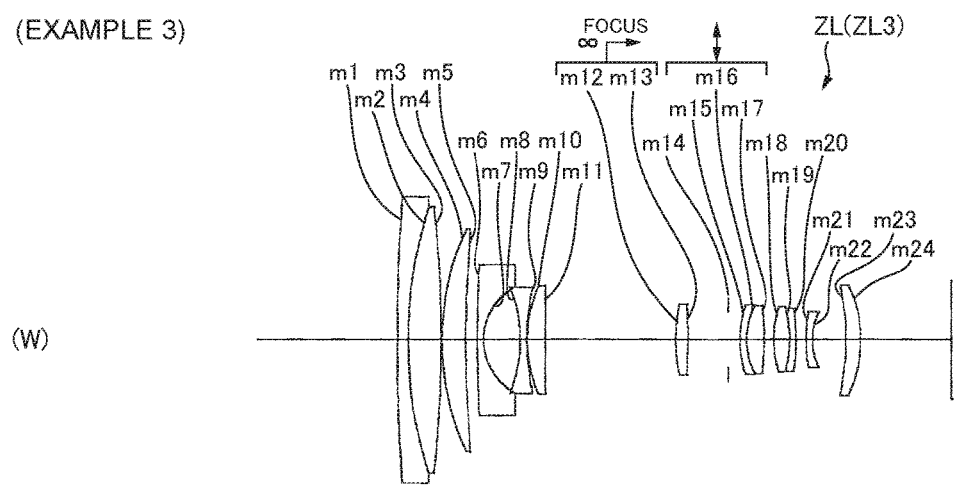
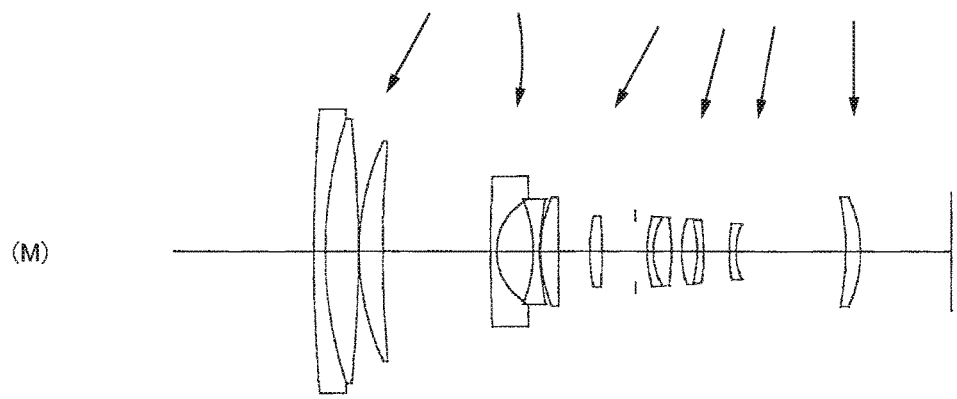
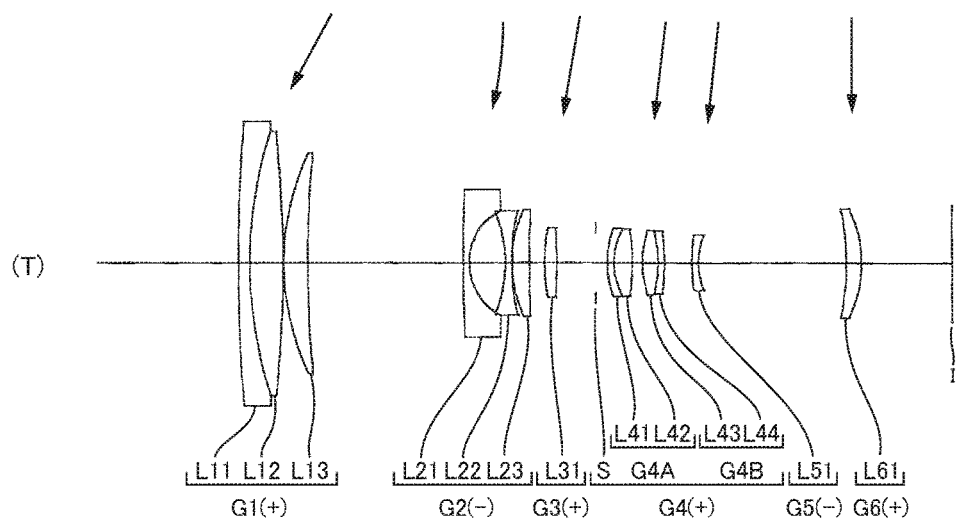

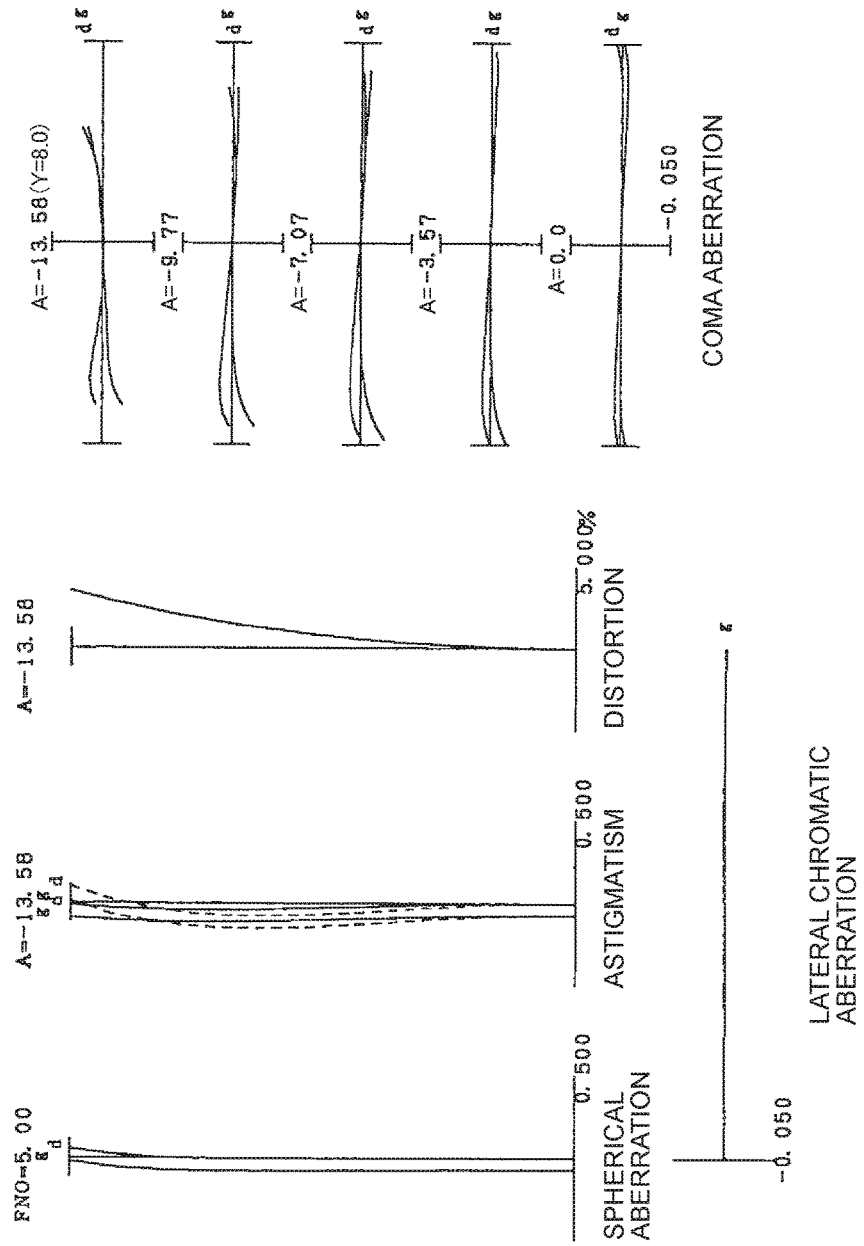

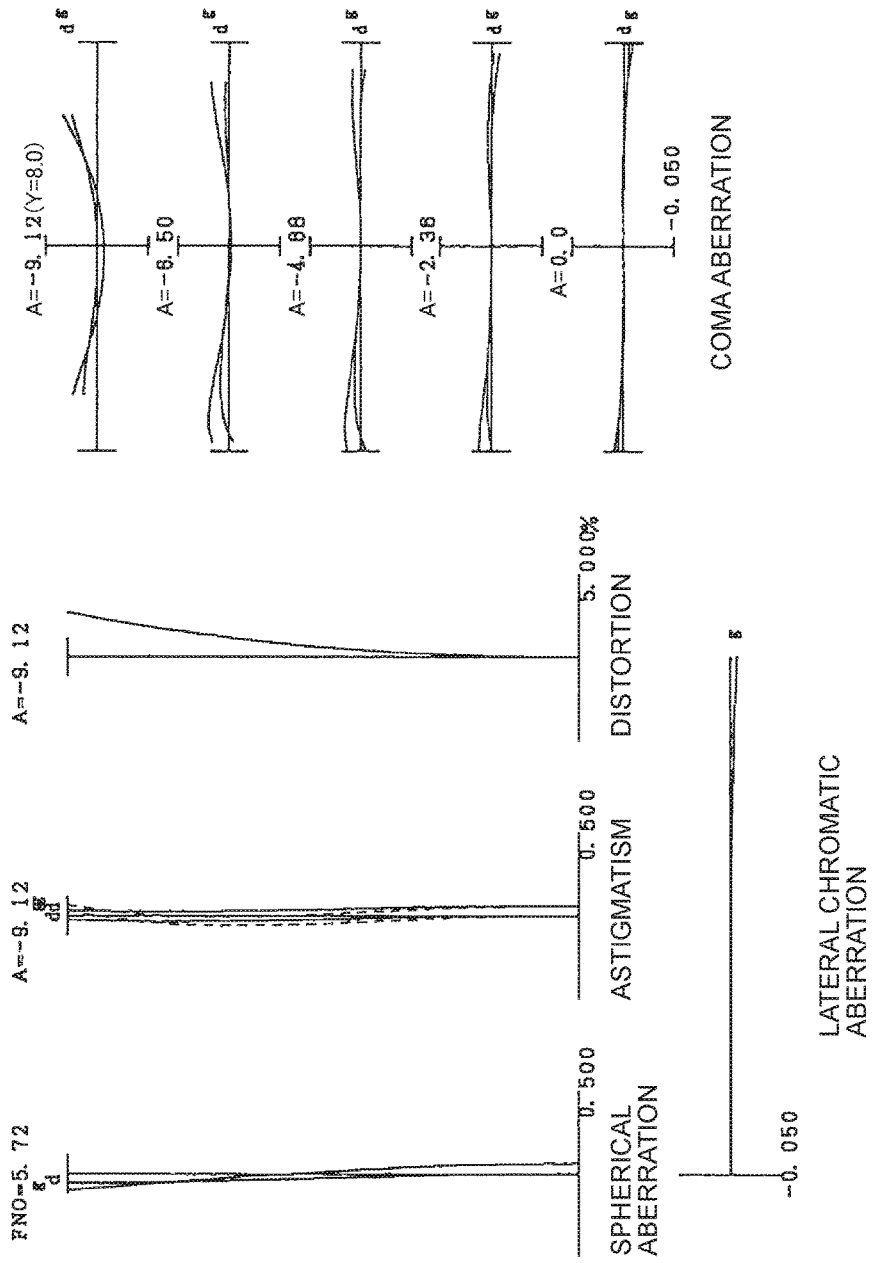

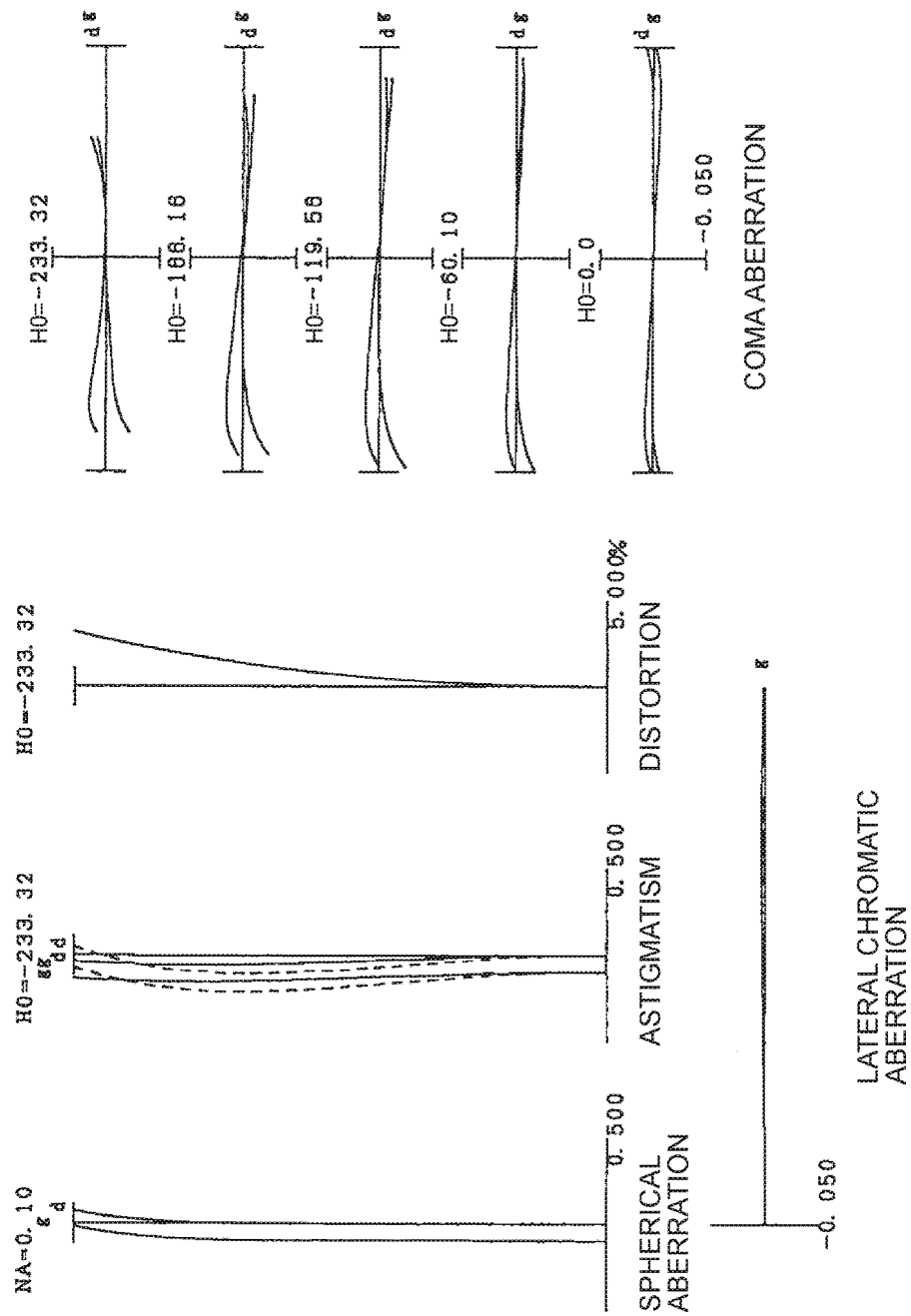

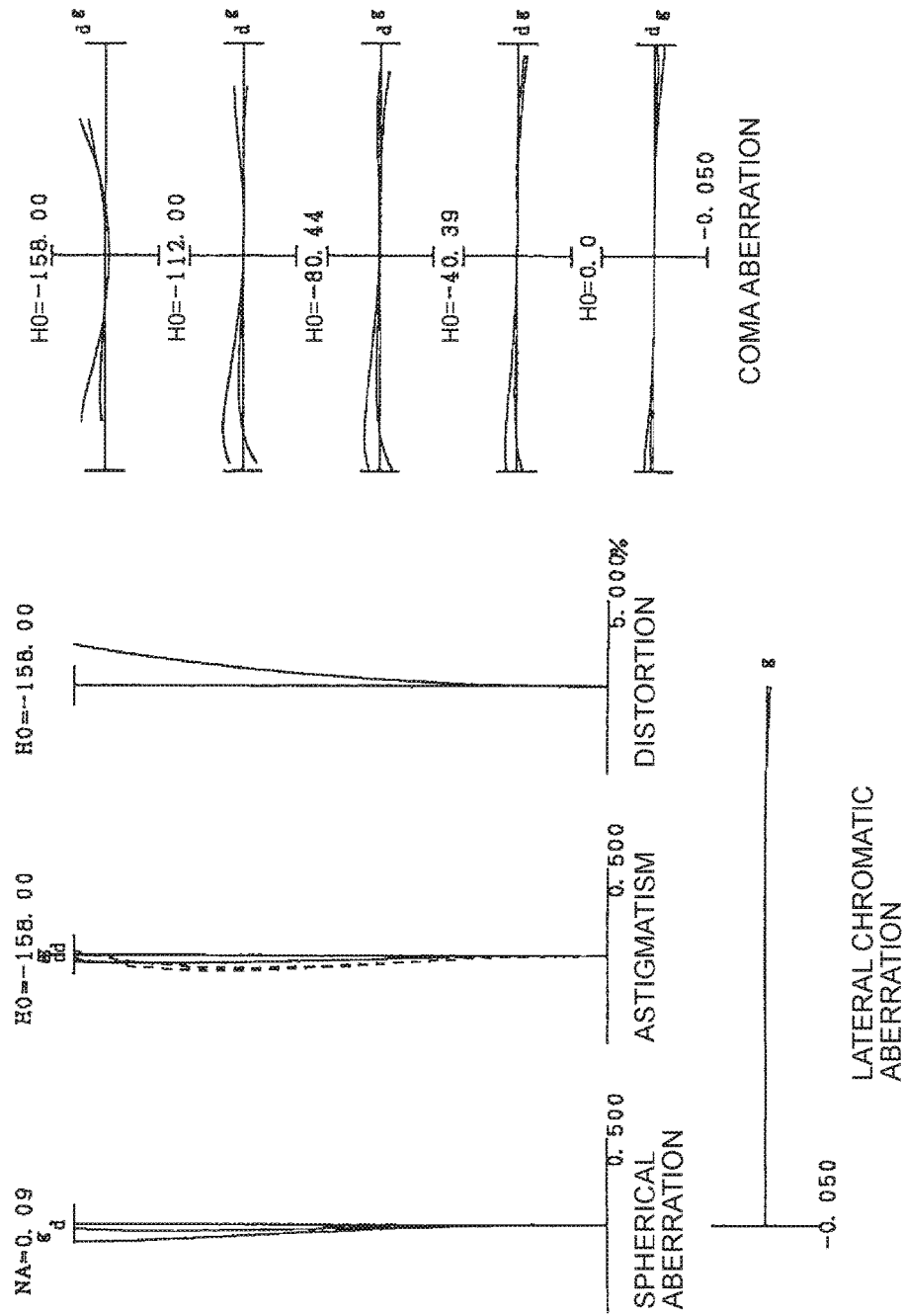

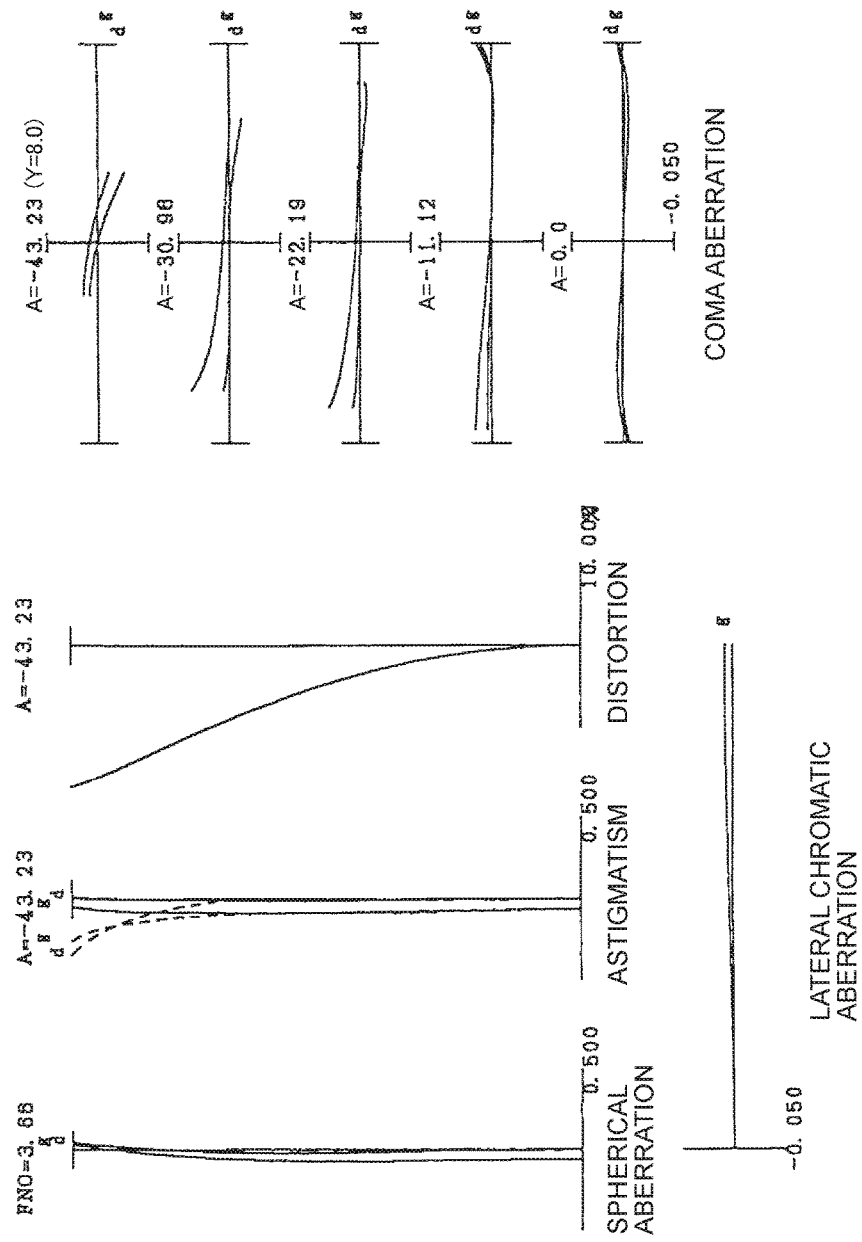

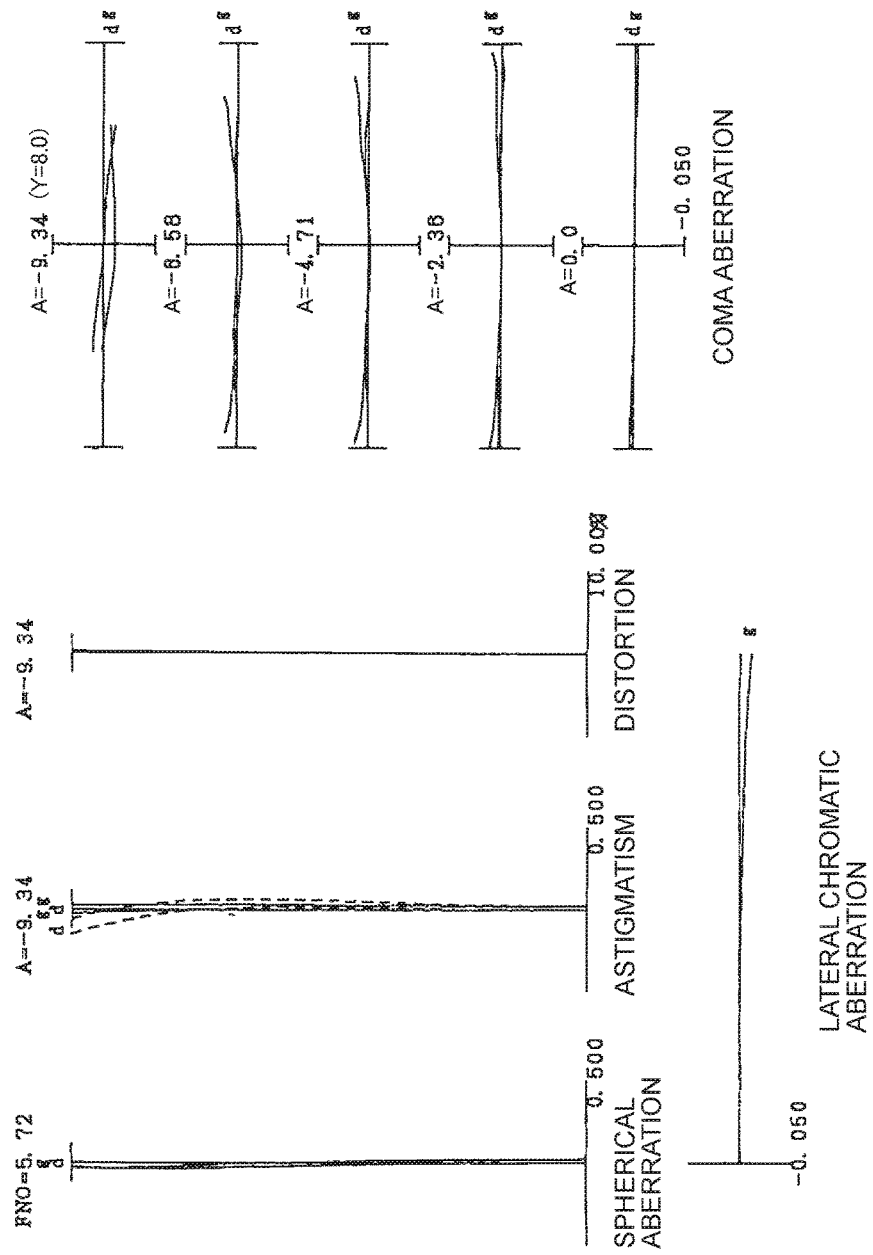

ZOOM OPTICAL SYSTEM, OPTICAL DEVICE AND METHOD FOR MANUFACTURING THE ZOOM OPTICAL SYSTEM

TECHNICAL FIELD

The present invention relates to a zoom optical system, an optical device and a method for manufacturing the zoom optical system.

TECHNICAL BACKGROUND

Conventionally, many zoom optical systems in which a lens group arranged closest to an object has positive refractive power are proposed as a zoom optical system suitable for an interchangeable lens for a camera, a digital camera, a video camera, etc. (for example, refer to Patent Document 1).

An optical system, in which focusing is performed by moving part of a lens group along an optical axis, is proposed from among these zoom optical systems.

Many methods for correcting image blur, in which an image is moved in a direction perpendicular to an optical axis by moving a lens group in the direction perpendicular to the optical axis, are proposed.

PRIOR ART LIST

Patent Document

[Patent Document 1] Japanese Laid-Open Patent Publication No. H8-179214 (A)

SUMMARY OF THE INVENTION

Means to Solve the Problems

A zoom optical system according to a first invention, comprises, in order from an object, a first lens group having positive refractive power, a second lens group having negative refractive power, a third lens group having positive refractive power, a fourth lens group having positive refractive power, and a fifth lens group, and a distance between the first lens group and the second lens group, a distance between the second lens group and the third lens group, a distance between the third lens group and the fourth lens group, and a distance between the fourth lens group and the fifth lens group change upon zooming, and a lens group arranged closest to an image is approximately fixed against an image surface upon zooming, and the third lens group moves along the optical axis upon focusing, and the following conditional expression is satisfied.

$$0.480 < f3/ft < 4.000$$

where, ft denotes a focal length of the zoom optical system in a telephoto end state, and f3 denotes a focal length of the third lens group.

An optical device according to the first invention is equipped with the zoom optical system according to the first invention.

A method for manufacturing a zoom optical system according to the first invention, the zoom optical system comprises, in order from an object, a first lens group having positive refractive power, a second lens group having negative refractive power, a third lens group having positive refractive power, a fourth lens group having positive refractive power, and a fifth lens group, and each lens is disposed in a lens-barrel so that a distance between the first lens group and the second lens group, a distance between the second lens group and the third lens group, a distance between the third lens group and the fourth lens group, and a distance between the fourth lens group and the fifth lens group change upon zooming, and a lens group arranged closest to an image is fixed against an image surface upon zooming, and the third lens group moves along the optical axis upon focusing, and the following conditional expressions is satisfied.

$$0.480 < f3/ft < 4.000$$

wherein ft denotes a focal length of the zoom optical system in a telephoto end state, and f3 denotes a focal length of the third lens group.

A zoom optical lens according to a second invention comprises, in order from an object, a first lens group having positive refractive power, a second lens group having negative refractive power, a third lens group having positive refractive power, a fourth lens group having positive refractive power, and a fifth lens group, and a distance between the first lens group and the second lens group, a distance between the second lens group and the third lens group, a distance between the third lens group and the fourth lens group, and a distance between the fourth lens group and the fifth lens group change upon zooming, and a lens group arranged closest to an image is approximately fixed against an image surface upon zooming, and the following conditional expressions are satisfied.

$$0.480 < f3/ft < 4.000$$

$$-0.100 < (d3t - d3w)/fw < 0.330$$

where, ft denotes a focal length of the zoom optical system in a telephoto end state, f3 denotes a focal length of the third lens group, fw denotes a focal length of the zoom optical system in a wide-angle end state, d3w a distance on the optical axis from a lens surface arranged closest an image side of the third lens group in a wide-angle end state to a lens surface arranged closest to an object side of the fourth lens group, and d3t denotes a distance on the optical axis from a lens surface arranged closest to the image side of the third lens group in a telephoto end state to a lens surface arranged closest to the object side of the fourth lens group.

An optical device according to the second invention is equipped with the zoom optical system according to the second invention.

A method for manufacturing a zoom optical system according to the second invention comprises, in order from an object, a first lens group having positive refractive power, a second lens group having negative refractive power, a third lens group having positive refractive power, a fourth lens group having positive refractive power, and a fifth lens group, and each lens is disposed in a lens-barrel so that a distance between the first lens group and the second lens group, a distance between the second lens group and the third lens group, a distance between the third lens group and the fourth lens group, and a distance between the fourth lens group and the fifth lens group changing upon zooming, and a lens group arranged closest to an image is approximately fixed to an image surface upon zooming, and the following conditional expressions are satisfied.

$$0.480 < f3/ft < 4.000$$

$$-0.100 < (d3t - d3w)/fw < 0.330$$

where, ft denotes a focal length of the zoom optical system in a telephoto end state, f3 denotes a focal length of the third lens group, fw denotes a focal length of the zoom optical system in a wide-angle end state, d3w denotes a distance on the optical axis from a lens surface arranged closest the image side of the third lens group in a wide-angle end state to a lens surface arranged closest to the object side of the fourth lens group, and d3t denotes a distance on the optical axis from a lens surface arranged closest to the image side of the third lens group in a telephoto end state to a lens surface arranged closest to the object of the fourth lens group.

A zoom optical system according to a third invention comprises, in order from an object, a first lens group having positive refractive power, a second lens group having negative refractive power, a third lens group having positive refractive power, a fourth lens group having positive refractive power, and a fifth lens group, and a distance between the first lens group and the second lens group, a distance between the second lens group and the third lens group, a distance between the third lens group and the fourth lens group, and a distance between the fourth lens group and the fifth lens group change upon zooming, and a lens group arranged closest to an image is approximately fixed against an image surface upon zooming, and the fourth lens group comprises an aperture stop.

An optical device according to the third invention is equipped with the zoom optical system according to the third invention.

A method for manufacturing a zoom optical system according to the third invention comprises, in order from an object, a first lens group having positive refractive power, a second lens group having negative refractive power, a third lens group having positive refractive power, a fourth lens group having positive refractive power, and a fifth lens group, and each lens is disposed in a lens-barrel so that a distance between the first lens group and the second lens group, a distance between the second lens group and the third lens group, a distance between the third lens group and the fourth lens group, and a distance between the fourth lens group and the fifth lens group change upon zooming, and a lens group arranged closest to an image is approximately fixed against an image surface upon zooming, and the fourth lens group comprises an aperture stop.

A zoom optical system according to a fourth invention comprises, in order from an object, a first lens group having positive refractive power, a second lens group having negative refractive power, a third lens group having positive refractive power, and a fourth lens group having positive refractive power, and a distance between the first lens group and the second lens group, a distance between the second lens group and the third lens group, and a distance between the third lens group and the fourth lens group change upon zooming, and the fourth lens group comprises, in order from an object, a fourth A sublens group movable in a manner of having a component in a direction perpendicular to the optical axis in order to correct image blur and, and a fourth B sublens group.

The optical device according to a fourth invention carries the zoom optical system according to the fourth invention.

A method for manufacturing an zoom optical system according to a fourth invention, the zoom optical system comprising, in order from an object, a first lens group having positive refractive power, a second lens group having negative refractive power, a third lens group having positive refractive power, and a fourth lens group having positive refractive power, and each lens is disposed in a lens-barrel so that a distance between the first lens group and the second lens group, a distance between the second lens group and the third lens group, and a distance between the third lens group and the fourth lens group change upon zooming, and the fourth lens group comprises, in order from the object, a fourth A sublens group configured to enable to move in a manner of having a component in a direction perpendicular to the optical axis in order to correct image blur, and a fourth B sublens group.

BRIEF DESCRIPTION OF THE DRAWINGS

FIGS. 2A, 2B, and 2C respectively illustrate graphs showing various aberrations upon focusing on an infinity object in a wide-angle end state, intermediate focal length state, and telephoto end state of the zoom optical system according to Example 1.

FIGS. 3A, 3B, and 3C respectively illustrate graphs showing various aberrations upon focusing on a short-distance object in a wide-angle end state, intermediate focal length state, and telephoto end state (1.00 m of a distance between object images) of the zoom optical system according to Example 1.

FIGS. 6A, 6B, and 6C respectively illustrate graphs showing various aberration upon focusing on an infinity object in a wide-angle end state, intermediate focal length state, and telephoto end state of the zoom optical system according to Example 2.

FIGS. 7A, 7B, and 7C respectively illustrate graphs showing various aberrations upon focusing a short-distance object in a wide-angle end state, intermediate focal length state, and telephoto end state (1.00 m of a distance between object images) of the zoom optical system according to Example 2.

FIG. 9 illustrates sectional views in a wide-angle end state (W), intermediate focal length state (M), and telephoto end state (T) of the zoom optical system according to Example 3.

FIGS. 10A, 10B, and 10C respectively illustrate graphs showing various aberrations upon focusing on an infinity object in a wide-angle end state, intermediate focal length state, and telephoto end state of the zoom optical system according to Example 3.

FIGS. 11A, 11B, and 11C respectively illustrate graphs showing various aberrations upon focusing on a short-distance object in a wide-angle end state, intermediate focal length state, and telephoto end state of the zoom optical system according to Example 3 (1.00 m of a distance between images).

FIGS. 14A, 14B, and 14C respectively illustrate graphs showing various aberrations upon focusing on an infinity object in a wide-angle end state, intermediate focal length state, and telephoto end state of the zoom optical system according to Example 4.

DESCRIPTION OF THE EMBODIMENTS
(FIRST TO FOURTH EMBODIMENTS)

Figure 1:
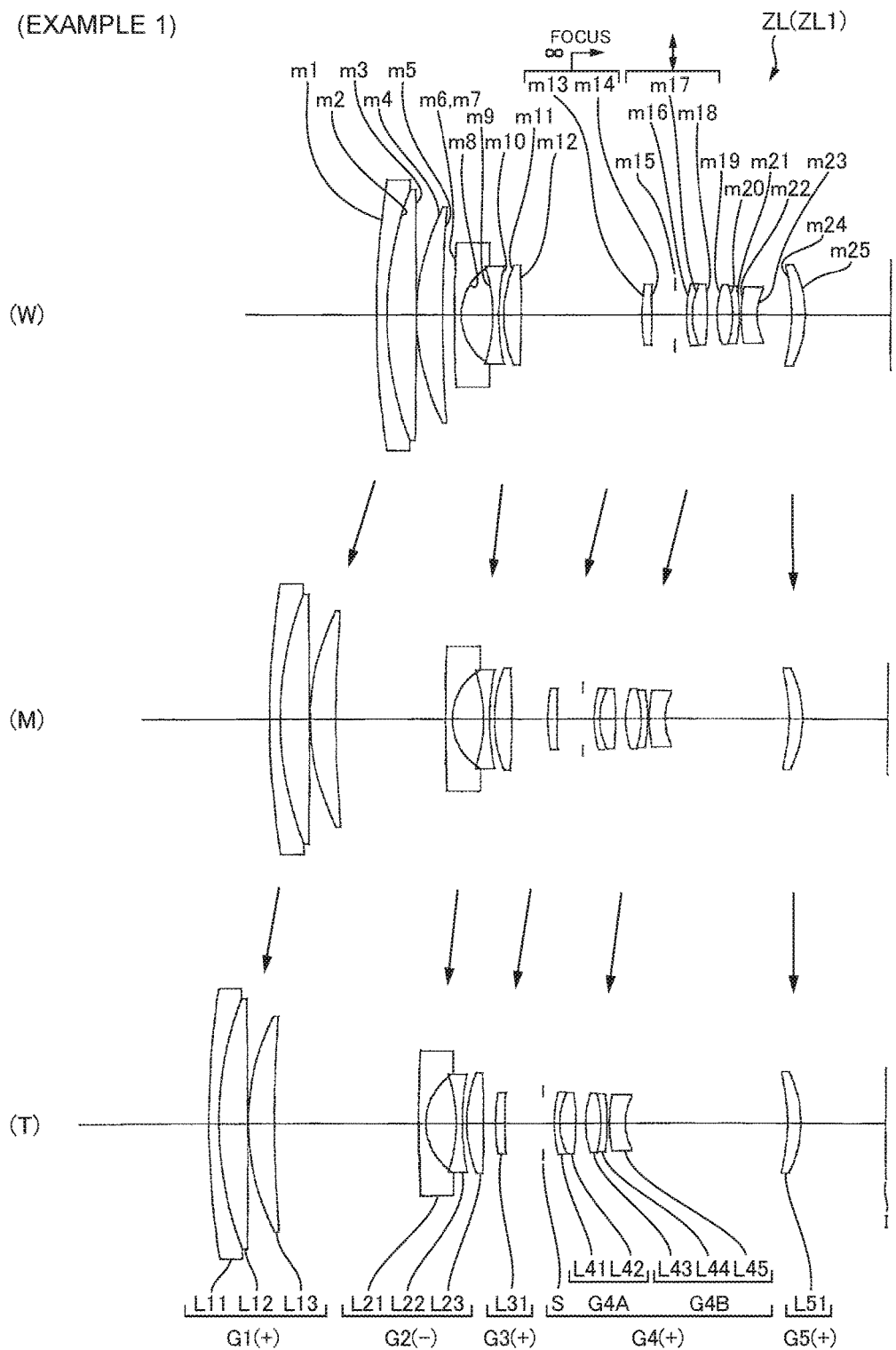
FIG. 1 illustrates sectional views in a wide-angle end state (W), intermediate focal length state (M), and telephoto end state (T) of a zoom optical system according to Example 1.

A first embodiment will be now described with reference to the drawings. A zoom optical system ZL according to the first embodiment comprises, as illustrated in FIG. 1, in order from an object along an optical axis, a first lens group G1 having positive refractive power, a second lens group G2 having negative refractive power, a third lens group G3 having positive refractive power, a fourth lens group G4 having positive refractive power, and a fifth lens group G5, and a distance between the first lens group G1 and the second lens group G2, a distance between the second lens group G2 and the third lens group G3, a distance between the third lens group G3 and the fourth lens group G4, and a distance between the fourth lens group G4 and the fifth lens group G5 are configured to change upon zooming. With this arrangement, it is possible to realize zooming, and suppress respective fluctuations of distortion accompanying zooming, astigmatism, and spherical aberration.

The zoom optical system ZL according to the first embodiment is configured that a lens group arranged closest to an image (corresponding to the fifth lens group G5 in FIG. 1) is approximately fixed against an image surface I upon zooming. With this arrangement, it is possible to optimize a change of a height of an off-axial flux of light passing through the lens group arranged closest to the image upon zooming, and suppress a fluctuation of distortion or astigmatism. In addition, this enables to simplify a lens-barrel structure configuring the zoom optical system ZL according to the first embodiment, suppress decentering due to manufacturing errors, etc., and suppress inclination of a surrounding image surface and decentering coma aberration generated due to decentering of the lens group arranged closest to the image.

The zoom optical system ZL according to the first embodiment is configured that focusing is performed by moving the third lens group G3 along the optical axis. With this arrangement, it is possible to suppress a fluctuation of astigmatism and spherical aberration upon focusing by suppressing amount of movement upon focusing on infinity, and suppressing a fluctuation of a height from the optical axis regarding light incident on the third lens group G3 which is a focusing lens group in a telephoto end state.

In the zoom optical system ZL according to the first embodiment, the following conditional expression (1) is satisfied.

$$0.480 < f3/ft < 4.000 \quad (1)$$

where, ft denotes a focal length of the zoom optical system ZL in a telephoto end state, and
f3 denotes a focal length of the third lens group G3.

The conditional expression (1) defines a range of an appropriate focal length of the third lens group G3. By satisfying the conditional expression (1), it is possible to suppress astigmatism and spherical aberration upon zooming.

When a corresponding value of the conditional expression (1) becomes less than a lower limit, it becomes difficult to suppress a fluctuation of astigmatism and spherical aberration generated in the third lens group G3 upon zooming, therefore high optical performance cannot be realized. When trying to suppress such aberration fluctuation, more configuration lenses are needed, therefore downsizing is not possible.

In order to further ensure the advantageous effect of the first embodiment, it is preferable to set the lower limit of the conditional expression (1) to 0.570.

When the corresponding value of the conditional expression (1) exceeds an upper limit, a fluctuation of astigmatism generated in the fourth lens group G4 becomes excessive upon zooming, therefore high optical performance cannot be realized.

In order to further ensure the advantageous effect of the first embodiment, it is preferable that the upper limit of the conditional expression (1) is set to 0.3200. In order to additionally ensure the advantageous effect of the first embodiment, it is preferable to set the upper limit of the conditional expression (1) to 2.400.

In the zoom optical system ZL according to the first embodiment, it is preferable that the following conditional expression (2) is satisfied.

$$0.900 < (-f2)/fw < 1.800 \quad (2)$$

where, fw denotes a focal length of the zoom optical system ZL in a wide-angle end state, and
f2 denotes a focal length of the second lens group G2.

The conditional expression (2) defines a range of an appropriate focal length of the second lens group G2. By satisfying the conditional expression (2), it is possible to suppress a fluctuation astigmatism and spherical aberration upon zooming.

When a corresponding value of the conditional expression (2) becomes less than a lower limit, it becomes difficult to suppress a fluctuation of astigmatism and spherical aberration generated in the second lens group G2 upon zooming, therefore high optical performance cannot be realized.

In order to further ensure the advantageous effect of the first embodiment, it is preferable to set the lower limit of the conditional expression (2) to 0.970. In order to additionally ensure the advantageous effect of the first embodiment, it is preferable to set the lower limit of the conditional expression (2) to 1.065.

When a corresponding value of the conditional expression (2) exceeds an upper limit, it is necessary to enlarge, in order to secure a predetermined zoom ratio, a distance change between the first lens group G1 and the second lens group G2 upon zooming. As a result, since a ratio of a diameter of an axial flux of light passing through the first lens group G1 and the second lens group G2 greatly changes, a fluctuation of spherical aberration upon zooming becomes excessive, therefore high optical performance cannot be realized.

In order to further ensure the advantageous effect of the first embodiment, it is preferable to set the upper limit of the conditional expression (2) to 1.600.

In the zoom optical system ZL according to the first embodiment, it is preferable that the following conditional expression (3) is satisfied.

$$0.600 < f3/f4 < 4.000 \tag{3}$$

where, f4 denotes a focal length of the fourth lens group G4.

The conditional expression (3) defines a range of an appropriate focal length of the third lens group G3 and the fourth lens group G4. By satisfying the conditional expression (3), it is possible to suppress a fluctuation of astigmatism and spherical aberration upon focusing.

When a corresponding value of the conditional expression (3) becomes less than a lower limit, it becomes difficult to suppress a fluctuation of astigmatism and spherical aberration generated in the third lens group G3 upon focusing, therefore high optical performance is not realized.

In order to further ensure the advantageous effect of the first embodiment, it is preferable that the lower limit of the conditional expression (3) is set to 0.840. In order to additionally ensure the advantageous effect of the first embodiment, it is preferable that the lower limit of a conditional expression (3) is set to 0.970.

When a corresponding value of the conditional expression (3) exceeds an upper limit, it is necessary to greatly change, in order to secure a predetermined focusing range, a distance between the third lens group G3 and the fourth lens group G4 upon focusing. As a result, since a diameter of an axial flux of light passing through the third lens group G3 greatly changes, a fluctuation of spherical aberration upon focusing becomes excessive, therefore high optical performance is not realized.

In order to further ensure the advantageous effect of the first embodiment, it is preferable to set the upper limit of the conditional expression (3) to 2.880.

In the zoom optical system ZL according to the first embodiment, it is preferable that only the third lens group G3 moves along the optical axis upon focusing. With this arrangement, compared to a case in which focusing is performed with a plurality of lenses, it is possible to suppress mutual decentering when manufacturing between focusing lens groups upon focusing, and suppress generating decentering coma aberration, therefore high optical performance can be realized.

In the zoom optical system ZL according to the first embodiment, t is preferable that the third lens group G3 is composed of one lens component. With this arrangement, it is possible to downsize the focusing lens groups, and suppress a fluctuation of spherical aberration upon focusing. This configuration can contribute to speeding up upon focusing.

In the zoom optical system ZL according to the first embodiment, it is preferable that the third lens group G3 is composed of one single lens. With this arrangement, it is possible to downsize the focusing lens group. This configuration can contribute to speeding up upon focusing. Because lenses configuring the third lens group G3 are not composed of a plurality of and cementing lenses, it is possible to relatively suppress influence of decentering coma aberration, etc. due to decentering of mutual lenses, therefore higher optical performance can be realized.

In the zoom optical system ZL according to the first embodiment, it is preferable that the third lens group G3 comprises a lens made from an optical material satisfying the following conditional expression (4).

$$48.00 < v3 \tag{4}$$

where, v3 denotes an Abbe number on the basis of d-line of the optical material used for the lens configuring the third lens group G3.

The conditional expression (4) defines a range of an appropriate Abbe number of an optical material used for the lens configuring the third lens group G3. When a corresponding value of the conditional expression (4) becomes less than a lower limit, it becomes difficult to suppress a fluctuation of chromatic aberration upon focusing, therefore high optical performance cannot be realized.

In order to further ensure the advantageous effect of the first embodiment, it is preferable that the lower limit of the conditional expression (4) is set to 55.00. In order to additionally ensure the advantageous effect of the first embodiment, it is preferable that the lower limit of a conditional expression (4) is set to 58.00.

In order to further ensure the advantageous effect of the first embodiment, it is preferable that the upper limit of a conditional expression (4) is set to 90.00. In order to further ensure the advantageous effect of the first embodiment, it is preferable that the upper limit of a conditional expression (4) is set to 75.00.

In the zoom optical system ZL according to the first embodiment, it is preferable that in the third lens group G3 at least one surface is aspherical-shaped. With this arrangement, it is possible to suppress a fluctuation of astigmatism and spherical aberration upon zooming and focusing.

In the zoom optical system ZL according to the first embodiment, it is preferable that the following conditional expression (5) is satisfied.

$$0.050 < (d3t - d3w)/fw < 0.330 \tag{5}$$

where, fw denotes a focal length of the zoom optical system ZL in a wide-angle end state, d3w denotes a distance on the optical axis from a lens surface arranged closest to the image side of the third lens group G3 in a wide-angle end state to a lens surface arranged closest to an object side of the fourth lens group G4, and d3t denotes a distance on the optical axis from the lens surface arranged closest to the image side of the third lens group G3 in a telephoto end state to the lens surface arranged closest to the object side of the fourth lens group G4.

The conditional expression (5) defines an appropriate range of a distance change between the third lens group G3 and the fourth lens group G4 upon zooming. By satisfying the conditional expression (5), it is possible to suppress a fluctuation of astigmatism upon zooming.

When a corresponding value of the conditional expression (5) becomes less than a lower limit, it becomes difficult to suppress a fluctuation of astigmatism generated in the third lens group G3 upon zooming, therefore high optical performance cannot be realized.

In order to further ensure the advantageous effect of the first embodiment, it is preferable that the lower limit of a conditional expression (5) is set to 0.010.

When a corresponding value of the conditional expression (5) exceeds an upper limit, a change of height from the optical axis of an off-axial flux of light passing through the fourth lens group G4 upon zooming becomes large, therefore a fluctuation of astigmatism generated in the fourth lens group G4 becomes excessive, thereby high optical performance cannot be realized.

In order to further ensure the advantageous effect of the first embodiment, it is appreciated that the upper limit of a conditional expression (5) is set to 0.275.

In the zoom optical system ZL according to the first embodiment, it is preferable the fourth lens group G4 has an aperture stop S. With this arrangement, it is possible to suppress a fluctuation of astigmatism generated in the fourth lens group G4, thereby high optical performance can be realized.

In the zoom optical system ZL according to the first embodiment, it is preferable that the aperture stop S is disposed between the third lens group G3 and the fourth lens group G4. With this arrangement, a change in a height direction from the optical axis of the off-axial flux of light passing through the third lens group G3 and the fourth lens group G4 upon zooming can be reduced, therefore a fluctuation of astigmatism generated in the third lens group G3 and the fourth lens group G4 can be suppressed, thereby high optical performance can be realized.

In the zoom optical system ZL according to the first embodiment, it is preferable that the following conditional expression (6) is satisfied.

$$0.470 < f4/ft < 0.900 \quad (6)$$

where, f4 denotes a focal length of the fourth lens group G4.

The conditional expression (6) defines a range of an appropriate focal length of the fourth lens group G4. By satisfying the conditional expression (6), it is possible to suppress a fluctuation of astigmatism and spherical aberration upon zooming.

When a corresponding value of the conditional expression (6) becomes less than a lower limit, it becomes difficult to suppress a fluctuation of astigmatism and spherical aberration generated in the fourth lens group G4 upon zooming, therefore high optical performance cannot be realized.

In order to further ensure the advantageous effect of the first embodiment, it is preferable that the lower limit of the conditional expression (6) is set to 0.530.

When a corresponding value of the conditional expression (6) exceeds an upper limit, it is necessary to enlarge, in order to secure a predetermined zoom ratio, amount of movement of the fourth lens group G4 against the image surface I upon zooming. As a result, since a diameter of an axial flux of light passing through the fourth lens group G4 greatly changes, a fluctuation of the spherical aberration upon zooming becomes excessive, therefore high optical performance cannot be realized.

In order to further ensure the advantageous effect of the first embodiment, it is preferable that the upper limit of the conditional expression (6) is set to 0.720.

In the zoom optical system ZL according to the first embodiment, it is preferable that a lens group arranged closest to the image has positive refractive power. With this arrangement, magnification used in the lens arranged closest to the image becomes less than 100%, therefore it is possible to relatively enlarge a composite focal length of the lens group arranged closer to the object (for example, corresponding to the first lens group G1 to the fourth lens group G4 in FIG. 1) rather than the lens group arranged closest to the image. As a result, it is possible to relatively suppress influence of decentering coma aberration, etc. generated due to decentering between lenses, generated in the lens arranged closer to the object side rather than the lens group arranged closest to the image when manufacturing, therefore high optical performance can be realized.

In the zoom optical system ZL according to the first embodiment, it is appreciated that the following conditional expression (7) is satisfied.

$$3.000 < fR/fw < 9.500 \quad (7)$$

where, fw denotes a focal length of the zoom optical system ZL in a wide-angle end state, and fR denotes a focal length of the lens group arranged closest to the image.

The conditional expression (7) defines a range of an appropriate focal length of the lens group arranged closest to the image. By satisfying the conditional expression (7), it is possible to suppress a fluctuation of distortion and astigmatism upon zooming.

When a corresponding value of the conditional expression (7) becomes less than a lower limit, it becomes difficult to suppress a fluctuation of distortion and astigmatism generated in the lens group arranged closest to the image upon zooming, therefore high optical performance cannot be realized.

In order to further ensure the advantageous effect of the first embodiment, it is preferable that the lower limit of the conditional expression (7) is set to 4.200.

When a corresponding value of the conditional expression (7) exceeds an upper limit, it becomes difficult to correct, by the lens group arranged closest to the image, a fluctuation of astigmatism generated in a lens group arranged closer to the object rather than the lens group arranged closest to the image, therefore high optical performance cannot be realized.

In order to further ensure the advantageous effect of the first embodiment, it is preferable that the upper limit of the conditional expression (7) is set to 7.600.

In the zoom optical system ZL according to the first embodiment, it is preferable that the lens group arranged closest to the image is the fifth lens group G5. With this arrangement, it is possible to appropriately correct a fluctuation of spherical aberration upon zooming.

In the zoom optical system ZL according to the first embodiment, the lens group arranged closest to the image can configure a sixth lens group G6. With this arrangement, it is possible to appropriately correct a fluctuation of astigmatism upon zooming.

In the zoom optical system ZL according to the first embodiment, it is preferable that the third lens group G3 moves to an image side upon focusing from an infinity object to a short-distance object. With this arrangement, it is possible to focus only with the third lens group G3, and suppress a fluctuation of astigmatism and spherical aberration upon focusing while downsizing the focusing lens group, therefore high optical performance can be realized.

In the zoom optical system ZL according to the first embodiment, it is preferable that the first lens group G1 moves to the object side upon zooming from a wide-angle end state to a telephoto end state. With this arrangement, it is possible to suppress a change of a height from the optical axis of the off-axial flux of light passing through the first lens group G1 upon zooming. As a result, it is possible to suppress a fluctuation of astigmatism upon zooming, generated in the first lens group G1. Note that the first lens group G1 may monotonically move to the object side, or move in a manner of drawing a locus of a convex may on the image side.

In the zoom optical system ZL according to the first embodiment, it is preferable that a distance between the first lens group G1 and the second lens group G2 increases upon zooming from a wide-angle end state to a telephoto end state. With this arrangement, since magnification of the second lens group G2 can be enlarged upon zooming from the wide-angle end state to the telephoto end state, a focal length of all lens groups can be configured to be long, therefore it is possible to suppress a fluctuation of astigmatism and spherical aberration upon zooming.

In the zoom optical system ZL according to the first embodiment, it is preferable that a distance between the second lens group G2 and the third lens group G3 decreases upon zooming from a wide-angle end state to a telephoto end state. With this arrangement, since composite magnification up to the lens group arranged closest to the image from the third lens group G3 upon zooming from the wide-angle end state to the telephoto end state, a focal length of all lens groups can be configured to be long, therefore it is possible to suppress a fluctuation of astigmatism and spherical aberration upon zooming.

In the zoom optical system ZL according to the first embodiment, it is preferable that the second lens group G2 moves to the object side upon zooming from a wide-angle end state to a telephoto end state. With this arrangement, downsizing can be attained. Additionally, this configuration enables to suppress a fluctuation of astigmatism and spherical aberration upon zooming. Note that the second lens group G2 may monotonically move to the object side, or move in a manner of drawing a locus of a convex on the image side.

According to the zoom optical system ZL according to the first embodiment equipped with the configurations above, it is possible to realize the zoom optical system having high optical performance upon zooming and focusing.

Figure 17:
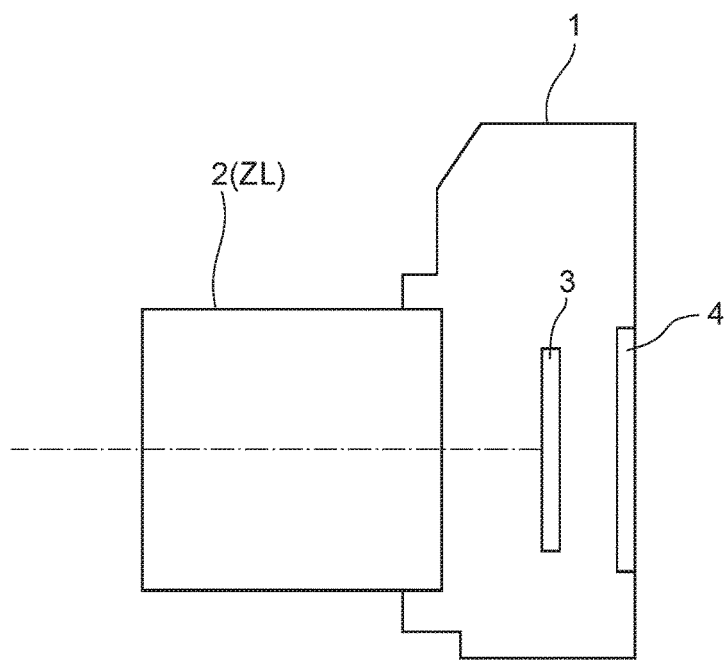
FIG. 17 is a diagram illustrating a configuration of a camera comprising a zoom optical system according to each of Examples 1 to 4.

Next, referring of FIG. 17, a camera (optical device) equipped with the above zoom optical system ZL is described. A camera 1 is, as shown in FIG. 17, a lens-interchangeable camera (so-called mirror-less camera) equipped with the above zoom optical system ZL as a photographing lens 2. In this camera 1, light from an unillustrated object (photographic subject) is condensed by the photographing lens 2, and configures a photographic subject image on an imaging surface of an imaging unit 3 via an unillustrated OLPF (Optical Low Pass Filter). A picture of the photographic subject is created by photoelectrically converting the photographic subject by a photoelectric conversion element provided in the imaging unit 3. This picture is displayed on a EVF (Electronic View Finder) 4 provided in the camera 1. With this arrangement, it is possible to observe the photographing subject via the EVF 4. When an unillustrated release button is pressed by a photographer, an image of the photographic subject taken by the imaging unit 3 is memorized in an unillustrated memory. Accordingly, the photographer can shoot the photographic subject by the camera 1.

The zoom optical system ZL according to the first embodiment equipped with in the camera 1 as the photographing lens 2 has, as found based each example mentioned below, high optical performance upon zooming and focusing by means of characteristic lens configurations. Therefore, according to the camera 1 according to the first embodiment, an optical device having high optical performance can be realized upon zooming and focusing.

Note that in case of installing the above zoom optical system ZL on a single-lens-reflex-type camera having a quick return mirror and observing a photographic subject with a finder optical system, the same advantageous effect as the above camera 1 can be obtained. In case of installing the zoom optical system ZL on a video camera, the same advantageous effect as the camera 1 can be obtained as well.

Figure 18:
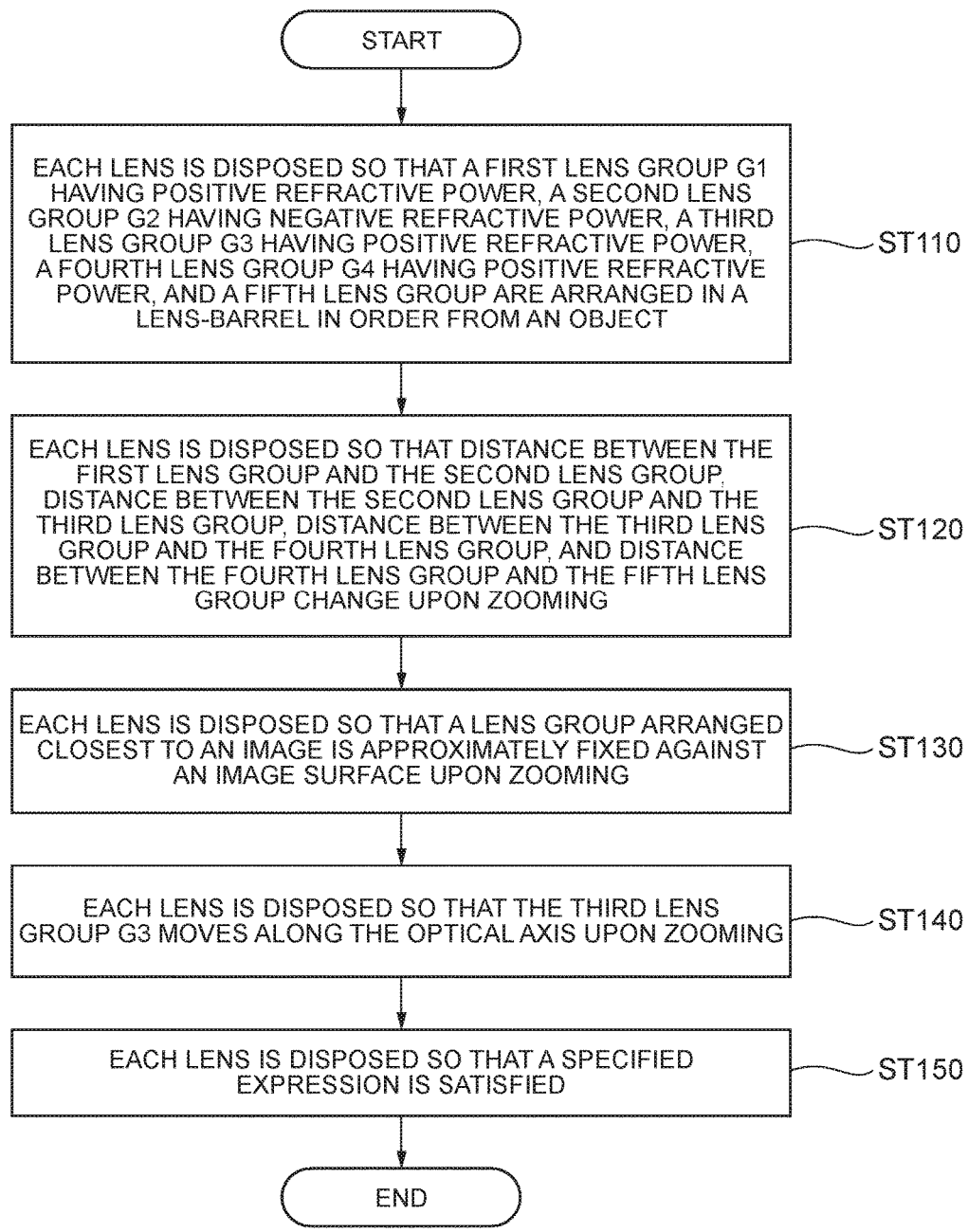
FIG. 18 is a diagram illustrating an outline of a method manufacturing a zoom optical system according to the first embodiment.

Next, referring to FIG. 18, a method for manufacturing the above zoom optical system ZL will be outlined. Firstly, each lens is disposed in a lens-barrel so that a first lens group G1 having positive refractive power, a second lens group G2 having negative refractive power, a third lens group G3 having positive refractive power, a fourth lens group G4 having positive refractive power, and a fifth lens group G5 are arranged in order from an object (Step ST110). At this point, each lens is disposed so that a distance between the first lens group G1 and the second lens group G2, a distance between the second lens group G2 and the third lens group G3, a distance between the third lens group G3 and the fourth lens group G4, and a distance between the fourth lens group G4 and the fifth lens group G5 change upon zooming (Step ST120). Each lens is disposed so that a lens group arranged closest to the image is approximately fixed against an image surface upon zooming (Step ST130). Each lens is disposed so that the third lens group G3 moves along the optical axis upon zooming (Step ST140). Each lens is arranged so that at least a conditional expression (1) among the conditional expressions is satisfied (Step ST150).

$$0.480 < f3/ft < 4.000 \qquad (1)$$

where, ft denotes a focal length of the zoom optical system ZL in a telephoto end state, and f3 denotes a focal length of the third lens group G3.

Exampling a lens arrangement according to the first embodiment, in the zoom optical system ZL illustrated in FIG. 1, as the first lens group G1 having positive refractive power, a cemented lens composed of a negative meniscus lens L11 having a concave surface facing the object and a biconvex positive lens L12, and a positive meniscus lens L13 having a convex surface facing an object are disposed in a lens-barrel in order from the object along the optical surface. As the second lens group G2 having negative refractive power, a negative meniscus lens L21 having a convex surface facing the object, a biconcave negative lens L22, and a biconvex positive lens L23 are disposed in the lens-barrel in order from the object along the optical axis. As the third lens group G3 having positive refractive power, a biconvex positive lens L31 is disposed in the lens-barrel. As the fourth lens group G4 having positive refractive power, a cemented lens composed of a negative meniscus lens L41 having a convex surface facing the object and a biconvex positive lens L42, a cemented lens composed of a biconvex positive lens L43 and a negative meniscus lens L44 having a concave surface facing the object, and a negative meniscus lens L45 having a convex surface facing the object are disposed in the lens-barrel in order from an object along the optical axis. As the fifth lens group G5, a positive meniscus lens L51 having a concave surface facing the object is disposed in the lens-barrel. Each lens is disposed in the lens-barrel so that the conditional expression (1) is satisfied (a corresponding value of the conditional expression (1) is 1.031).

According to the method for manufacturing the zoom optical system according to the first embodiment, it is possible to manufacture the zoom optical system ZL having high optical performance upon zooming and focusing.

As described above, according to the first embodiment, it is possible to solve a problem owned by a conventional zoom optical system, such that it is difficult to sufficiently maintain high optical performance upon focusing.

Next, a second embodiment is described with reference to the drawings. A zoom optical system ZL according to the second embodiment comprises, as illustrated in FIG. 1, in order from the object along the optical axis, a first lens group G1 having positive refractive power, a second lens group G2 having negative refractive power, a third lens group G3 having positive refractive power, a fourth lens group G4 having positive refractive power, and a fifth lens group G5, wherein upon zooming, and a distance between the first lens group G1 and the second lens group G2, a distance between the second lens group G2 and the third lens group G3, a distance between the third lens group G3 and the fourth lens group G4, and a distance between the fourth lens group G4 and the fifth lens group G5 are configured to change upon zooming. With this arrangement, it is possible to suppress respective fluctuations such as distortion accompanying zooming, astigmatism, and spherical aberration.

In the zoom optical system ZL according to the second embodiment, a lens group arranged closest to the image (corresponding to the fifth lens group G5 in FIG. 1) is approximately fixed against the image surface I upon zooming. With this arrangement, a change of a height of the axial outside flux of light passing through the lens group arranged closest to the image is optimized upon zooming, therefore it is possible to suppress a fluctuation of distortion and astigmatism. In addition, this configuration enables to simplify a lens-barrel structure configuring the zoom optical system ZL according to the second embodiment, and suppress eccentricity due to manufacturing errors, etc., therefore it is possible to suppress inclination of surrounding an image surface and eccentricity coma aberration generated in generated due to eccentricity of the lens group arranged closest to the image.

In the zoom optical system ZL according to the second embodiment the following conditional expression (8) is satisfied.

$$0.480 < f3/ft < 4.000 \tag{8}$$

where, ft denotes a focal length of the zoom optical system ZL in a telephoto end state, and
f3 denotes a focal length of the third lens group G3.

The conditional expression (8) defines a range of an appropriate focal length of the third lens group G3. By satisfying the conditional expression (8), it is possible to suppress a fluctuation of astigmatism and spherical aberration upon zooming.

When a corresponding value of the conditional expression (8) becomes less than a lower limit, it becomes difficult to suppress a fluctuation of astigmatism and spherical aberration generated in the third lens group G3 upon zooming, thereby high optical performance cannot be realized.

In order to further ensure the advantageous effect of the second embodiment, it is preferable that the lower limit of the conditional expression (8) is set to 0.570.

When a corresponding value of the conditional expression (8) exceeds upper limit, a fluctuation of astigmatism generated in the fourth lens group G4 becomes excessive upon zooming, therefore high optical performance cannot be realized.

In order to further ensure the advantageous effect of the second embodiment, it is preferable that set the upper limit of a conditional expression (8) is set to 3.200. In order to additionally ensure the advantageous effect of the second embodiment, it is preferable that the upper limit of the conditional expression (8) si set to 2.400.

In the zoom optical system ZL according to the second embodiment the following conditional expression (9) is satisfied.

$$0.100 < (d3t - d3w)/fw < 0.330 \tag{9}$$

where, fw denotes a focal length of the zoom optical system ZL in a wide-angle end state,
d3w denotes a distance on the optical axis from a lens surface arranged closest to the image side of the third lens group G3 in the wide-angle end state to a lens surface arranged closest to the object side of the fourth lens group G4, and
d3t denotes a distance on the optical axis from the lens surface arranged closest to the image side of the third lens group G3 in a telephoto end state to the lens surface arranged closest to the object side of fourth lens group G4.

The conditional expression (9) defines an appropriate range the distance between the third lens group G3 and the fourth lens group G4 upon zooming. By satisfying the conditional expression (9), a fluctuation of astigmatism upon zooming can be suppressed.

When a corresponding value of the conditional expression (9) becomes less than a lower limit, it becomes difficult to suppress a fluctuation of astigmatism generated in the third lens group G3 upon zooming, therefore high optical performance cannot be realized.

In order to further ensure the advantageous effect of the second embodiment, it is preferable that the lower limit of the conditional expression (9) is set to −0.080.

When a corresponding value of the conditional expression (9) exceeds an upper limit, a change of a height from the optical axis of the axial flux of light passing through the fourth lens group G4 upon zooming becomes large, therefore a fluctuation of astigmatism generated in the fourth lens group G4 becomes excessive, thereby high optical performance cannot be realized.

In order to further ensure the advantageous effect of the second embodiment, it is preferable that the upper limit of the conditional expression (9) is set to 0.275.

In the zoom optical system ZL according to the second embodiment, it is most preferable that the lens group arranged closest to the image has positive refractive power. With this arrangement, magnification used in the lens group arranged closest to the image becomes less 100%, therefore a composite focal length of the lens group arranged closer to the object than the lens group arranged closest to the image (for example, corresponding to the first lens group G1 to the fourth lens group G4 in FIG. 1) can be relatively enlarged.

As a result, it is possible to relatively suppress influence of decentering coma aberration, etc. due to decentering of lenses generated in the lens group arranged closer to the object than the lens group arranged closest to the image when manufacturing, therefore high optical performance can be realized.

In the zoom optical system ZL according to the second embodiment, it is preferable that the following conditional expression (10) is satisfied.

$$3.000 < fR/fw < 9.500 \quad (10)$$

where, fR denotes a focal length of the lens group arranged closest to the image.

The conditional expression (10) defines a range of an appropriate focal length of the lens group arranged closest to the image. By satisfying the conditional expression (10), a fluctuation of distortion and astigmatism upon zooming can be suppressed.

When a corresponding value of the conditional expression (10) is less than a lower limit, it becomes difficult to suppress a fluctuation of distortion and astigmatism generated in the lens group arranged closest to the image upon zooming, thereby high optical performance is realized.

In order to further ensure the advantageous effect of the second embodiment, it is preferable that the lower limit of the conditional expression (10) is set to 4.200.

When a corresponding value of the conditional expression (10) exceeds an upper limit, it becomes difficult to correct a fluctuation of astigmatism generated in the lens group arranged closer to the object side than the lens group arranged closest to the image, therefore high optical performance cannot be realized.

In order to further ensure the advantageous effect of the second embodiment, it is preferable that the upper limit of the conditional expression (10) is set to 7.600.

In the zoom optical system ZL according to the second embodiment, it is preferable the following conditional expression (11) is satisfied.

$$0.730 < (-f2)/fw < 1.800 \quad (11)$$

where, f2 denotes a focal length of the second lens group G2.

The conditional expression (11) defines a range of an appropriate focal length of the second lens group G2. By satisfying the conditional expression (11), a fluctuation of astigmatism and spherical aberration upon zooming can be suppressed.

When a corresponding value of the conditional expression (11) becomes less than a lower limit, it becomes difficult to suppress a fluctuation of astigmatism and spherical aberration generated in the second lens group G2 upon zooming, therefore high optical performance cannot be realized.

In order to further ensure the advantageous effect of the second embodiment, it is preferable that the lower limit of the conditional expression (11) is set to 0.900. In order to additionally ensure the advantageous effect of the second embodiment, it is preferable that the lower limit of the conditional expression (11) is set to 1.065.

When a corresponding value of the conditional expression (11) exceeds an upper limit, it is necessary to enlarge a distance between the first lens group G1 and the second lens group G2 upon zooming in order to secure a predetermined zoom ratio. As a result, since a ratio of a diameter of an axial flux of light passing through the first lens group G1 and the second lens group G2 greatly changes, therefore a fluctuation of spherical aberration upon zooming becomes excessive, thereby high optical performance cannot be realized.

In order to further ensure the advantageous effect of the second embodiment, it is preferable that the upper limit of the conditional expression (11) is set to 1.600.

In the zoom optical system ZL according to the second embodiment, it is preferable that the following conditional expression (12) is satisfied.

$$0.470 < f4/ft < 0.900 \quad (12)$$

where, f4 denotes a focal length of the fourth lens group G4.

The conditional expression (12) defines a range of an appropriate focal length of the fourth lens group G4. By satisfying the conditional expression (12), a fluctuation of astigmatism and spherical aberration upon zooming can be suppressed.

When a corresponding value of the conditional expression (12) is less than a lower limit, it becomes difficult to suppress a fluctuation of astigmatism and spherical aberration generated in the fourth lens group G4 upon zooming, therefore high optical performance cannot be realized.

In order to further ensure the advantageous effect of the second embodiment, it is preferable that the lower limit of the conditional expression (12) is set to 0.530.

When a corresponding value of the conditional expression (12) exceeds an upper limit, it is necessary to enlarge amount of movement of the fourth lens group G4 against the image surface I upon zooming, in order to secure a predetermined zoom ratio. As a result, since a diameter of the axial flux of light passing through the fourth lens group G4 greatly changes, a fluctuation of spherical aberration upon zooming becomes excessive, therefore high optical performance cannot be realized.

In order to further ensure the advantageous effect of the second embodiment, it is preferable that the upper limit of a conditional expression (12) is set to 0.720.

In the zoom optical system ZL according to the second embodiment, it is preferable that the first lens group G1 moves to the object upon zooming from a wide-angle end state to a telephoto end state. With this arrangement, it is possible to suppress a height from the optical axis of the axial flux of light passing through the first lens group G1 upon zooming. As a result, it impossible to suppress a fluctuation of astigmatism upon zooming generated in the first lens group G1.

In the zoom optical system ZL according to the second embodiment, it is preferable that a distance between the first lens group G1 and the second lens group G2 increases upon zooming from a wide-angle end state to a telephoto end state. With this arrangement, it is possible to double magnification of the second lens group G2 upon zooming from a wide-angle end state to a telephoto end state, therefore a focal length of all the lens groups can have a long configuration, therefore a fluctuation of astigmatism and spherical aberration upon zooming can be suppressed.

In the zoom optical system ZL according to the second embodiment, it is preferable that a distance between the second lens group G2 and the third lens group G3 decreases upon zooming from a wide-angle end state to a telephoto end state. With this arrangement, since a composite magnification from the third lens group G3 to the fifth lens group G5 can be doubled upon zooming from a wide-angle end state to a telephoto end state, a focal length of all lens groups can be configured to be long, therefore a fluctuation of astigmatism and spherical aberration upon zooming can be suppressed.

In the zoom optical system ZL according to the second embodiment, it is preferable that the following conditional expression (13) is satisfied.

$$0.350 < (d1t - d1w)/ft < 0.800 \quad (13)$$

where, d1w denotes a distance on the optical axis from the lens surface arranged closest to the image side of the first lens group G1 in a wide-angle end state to the lens surface arranged closest to the object side of the second lens group G2, and d1t denotes a distance on the optical axis from the lens surface arranged closest to the image side of the first lens group G1 in a telephoto end state to the lens surface arranged closest to the object side of the second lens group G2.

The conditional expression (13) defines an appropriate range of a change of a distance between the first lens group G1 and the second lens group G2 upon zooming. By satisfying the conditional expression (13), a fluctuation of coma aberration and astigmatism upon zooming can be suppressed.

When a corresponding value of the conditional expression (13) becomes less than a lower limit, it is necessary to improve refractive power of the first lens group G1 and the second lens group G2 in order to realize a predetermined zoom ratio. Then, it becomes difficult to suppress a fluctuation of coma aberration and astigmatism upon zooming, generated in the second lens group G2, therefore high optical performance cannot be realized.

In order to further ensure the advantageous effect of the second embodiment, it is preferable that the lower limit of the conditional expression (13) is set to 0.380.

When a corresponding value of the conditional expression (13) exceeds an upper limit, a change of a height from the optical axis of the axial flux of light passing through the first lens group G1 upon zooming becomes large, therefore a fluctuation of astigmatism generated in the first lens group G1 becomes excessive, thereby high optical performance cannot be realized.

In order to further ensure the advantageous effect of the second embodiment, it is preferable that the upper limit of a conditional expression (13) is set to 0.650.

In the zoom optical system ZL according to the second embodiment, it is preferable that the following conditional expression (14) is satisfied.

$$0.200 < (d2w - d2t)/ft < 0.700 \quad (14)$$

where, d2w denotes a distance on the optical axis from the lens surface arranged closest to the image side of the second lens group G2 in a wide-angle end state to the lens surface arranged closest to the object side of the third lens group G3, and d2t denotes a distance on the optical axis from the lens surface arranged closest to the image side of the second lens group G2 in a telephoto end state to the lens surface arranged closest to the object to the third lens group G3.

The conditional expression (14) defines an appropriate range of a change of a distance between the second lens group G2 and the third lens group G3 upon zooming. By satisfying the conditional expression (14), a fluctuation of astigmatism and spherical aberration upon zooming can be suppressed.

When a corresponding value of the conditional expression (14) becomes less than a lower limit, it is necessary to improve refractive power of the second lens group G2 and the third lens group G3 in order to realize a predetermined zoom ratio. Then, it becomes difficult to suppress a fluctuation of astigmatism and spherical aberration upon zooming generated in the second lens group G2 and the third lens group G3, therefore high optical performance cannot be realized.

In order to further ensure the advantageous effect of the second embodiment, it is preferable that the lower limit of the conditional expression (14) is set to 0.270.

When a corresponding value of the conditional expression (14) exceeds an upper limit, a change of a height from the optical axis of an off-axial flux of light passing through the second lens group G2 upon zooming becomes large, therefore a fluctuation of astigmatism generated in the second lens group G2 becomes excessive, thereby high optical performance cannot be realized.

In order to further ensure the advantageous effect of the second embodiment, it is preferable that the upper limit of the conditional expression (14) is set to 0.550.

In the zoom optical system ZL according to the second embodiment, it is preferable that the fourth lens group G4 has an aperture stop S. With this arrangement, it is possible to suppress a fluctuation of astigmatism generated in the fourth lens group G4, therefore high optical performance can be realized.

In the zoom optical system ZL according to the second embodiment, it is preferable that the aperture stop S is disposed between the third lens group G3 and the fourth lens group G4. With this arrangement, a change of a height from the optical axis of off-axis flux of light passing tough the third lens group G3 and the fourth lens group G4 upon zooming can be reduced, therefore a fluctuation of astigmatism generated in the third lens group G3 and the fourth lens group G4 can be suppressed, thereby high optical performance can be realized.

In the zoom optical system ZL according to the second embodiment, it is preferable that the third lens group G3 moves along the optical axis upon focusing. With this arrangement, amount of movement on a telephoto side upon focusing is suppressed, a fluctuation of the height from the optical axis regarding light incident on the third lens group G3 which is a focusing lens group on the telephoto side is suppressed, therefore a fluctuation of astigmatism and spherical aberration upon focusing can be suppressed.

In the zoom optical system ZL according to the second embodiment, it is preferable that the third lens group G3 moves to the image upon focusing from an infinity object to a short-distance object. With this arrangement, it becomes possible to focus only with the third lens group G3, a fluctuation of astigmatism and spherical aberration upon focusing can be suppressed, therefore high optical performance can be realized.

According to the zoom optical system ZL according to the second embodiment equipped with the above configuration, it is possible to realize the zoom optical system which has high optical performance over a whole zoom range.

Next, referring to FIG. 17, a camera (optical device) equipped with the zoom optical system ZL is described. This camera 1 has the same configurations as those of the first embodiment, and its configurations have already been described, the explanation is omitted here.

As found in each example mentioned below, the zoom optical system ZL according to the second embodiment equipped on the camera 1 as the photographing lens 2 has high optical performance over the whole zoom range. Thus, according to the camera 1 according to the second embodiment, it is possible to realize an optical device has high optical performance over the whole zoom range.

Note that in case of installing the zoom optical system ZL mentioned above on a single lens reflex type camera having a quick return mirror and observing a photographic subject with a finder optical system, the same advantageous effect as the above camera 1 can be obtained. In case of installing the zoom optical system ZL on a video camera, the same advantageous effect as the camera 1 can be obtained.

Figure 19:
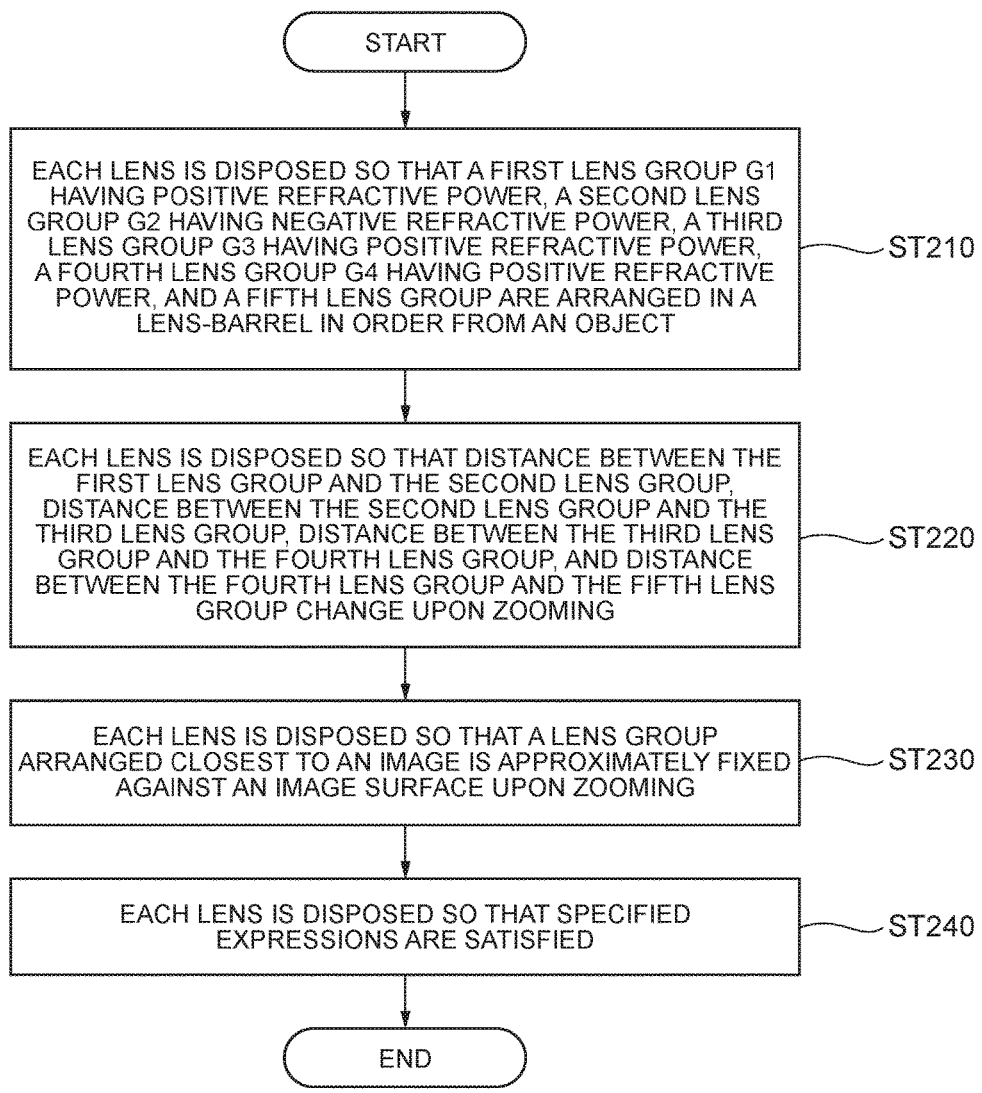
FIG. 19 is a diagram illustrating an outline of a method manufacturing a zoom optical system according to the second embodiment.

Next, referring to FIG. 19, a method for manufacturing the zoom optical system ZL is outlined. Firstly, each lens is disposed in a lens-barrel so that a first lens group having positive refractive power, a second lens group having negative refractive power, a third lens group having positive refractive power, a fourth lens group having positive refractive power, and a fifth lens group are arranged in order from an object (Step ST210). At this point, each lens is disposed in the lens-barrel so that a distance between the first lens group G1 and the second lens group G2, a distance between the second lens group G2 and the third lens group G3, a distance between the third lens group G3 and the fourth lens group G4, and a distance between the fourth lens group G4 and the fifth lens group G5 change upon zooming (Step ST220). Each lens is disposed so that the lens group arranged closest to the image is approximately fixed against an image surface upon zooming (Step ST230). Each lens is arranged so that st least the conditional expressions (8) and (9) among the above conditional expressions are satisfied (Step ST240).

$$0.480 < f3/ft < 4.000 \tag{8}$$

$$-0.100 < (d3t-d3w)/fw < 0.330 \tag{9}$$

where, ft denotes a focal length of the zoom optical system ZL in a telephoto end state, f3 denotes a focal length of the third lens group G3, fw denotes a focal length of the zoom optical system ZL in a wide-angle end state, d3w denotes a distance on the optical axis from a lens surface arranged closest to the image side of the third lens group G3 in a wide-angle end state to a lens surface arranged closest to the object side of the fourth lens group G4, and d3t denotes a distance on the optical axis from the lens surface arranged closest to the image side of the third lens group G3 in a telephoto end state to the lens surface arranged closest to the object side of the fourth lens group G4.

Exampling a lens arrangement according to the second embodiment, in the zoom optical system ZL illustrated in FIG. 1, as the first lens group G1 having positive refractive power, a cemented lens composed of a negative meniscus lens L11 having a convex surface facing an object and a biconvex positive lens L12, and a positive meniscus lens L13 having a convex surface facing the object are disposed in a lens-barrel, in order from the object along the optical axis. As the second lens group G2 having negative refractive power, a negative meniscus lens L21 having a convex surface facing the object, a biconcave negative lens L22, and a biconvex positive lens L23 are disposed in the lens-barrel, in order from the object along the optical axis. As the third lens group G3 having positive refractive power, a biconvex positive lens L31 is disposed in the lens-barrel. As the fourth lens group G4 having positive refractive power, a cemented lens composed of a negative meniscus lens L41 having a convex surface facing the object and a biconvex positive lens L42, a cemented lens composed of a biconvex positive lens L43 and a negative meniscus lens L44 having a concave surface facing the object, and a negative meniscus lens L45 having a convex surface facing the object are disposed in the lens-barrel, in order from the object along the optical axis. As the fifth lens group G5, a positive meniscus lens L51 having a concave surface facing the object is arranged in the lens-barrel. Each lens is disposed in the lens-barrel so that the conditional expressions (8) and (9) are satisfied (the corresponding value of the conditional expression (8) is 1.031, and the corresponding value of the conditional expression (9) is 0.215).

According to the method for manufacturing the zoom optical system according to the second embodiment, it is possible to manufacture the zoom optical system ZL having high optical performance over the whole zoom range.

As described above, according to the second embodiment, it is possible to solve a problem owned by a conventional zoom optical system such that it is difficult to sufficiently maintain high optical performance over a whole zoom range upon focusing.

Next, a third embodiment is described with referred to drawings. The zoom optical system ZL according to the third embodiment is configured to comprise, as illustrated in FIG. 1, in order from an object along an optical axis, a first lens group G1 having positive refractive power, a second lens group G2 having negative refractive power, a third lens group G3 having positive refractive power, a fourth lens group G4 having positive refractive power, and a fifth lens group G5, and a distance between the first lens group G1 and the second lens group G2, a distance between the second lens group G2 and the third lens group G3, a distance between the third lens group G3 and the fourth lens group G4, and a distance between the fourth lens group G4 and the fifth lens group G5 are configured to change upon zooming. With this arrangement, it is possible to realize zooming, and suppress respective fluctuations of spherical aberration, astigmatism, and distortion accompanying zooming.

In the zoom optical system ZL according to the third embodiment, the lens group arranged closest to the image (corresponding to the fifth lens group G5 in FIG. 1) is approximately fixed against the image surface I, upon zooming. With this arrangement, a change of a height of the axial flux of light passing through the lens group arranged closest to the image, upon zooming, is optimized, therefore a fluctuation of astigmatism and distortion can be suppressed. In addition, this configuration enables to simplify a lens-barrel structure configuring the zoom optical system ZL according to the third embodiment, and suppress eccentricity due to manufacturing errors, etc., therefore it is possible to suppress inclination of surrounding an image surface and eccentricity coma aberration generated in generated due to eccentricity of the lens group arranged closest to the image.

In the zoom optical system ZL according to the third embodiment, the fourth lens group G4 is configured to comprise an aperture stop S. With this arrangement, it is possible to suppress a fluctuation of astigmatism generated in the fourth lens group G4, therefore high optical performance can be realized.

In the zoom optical system ZL according to the third embodiment, it is preferable that the following conditional expression (15) is satisfied.

$$0.480 < f3/ft < 4.000 \tag{15}$$

where, ft denotes a focal length of the zoom optical system ZL in a telephoto end state, and f3 denotes a focal length of the third lens group G3.

The conditional expression (15) defines a range of an appropriate focal length of the third lens group G3. By satisfying the conditional expression (15), a fluctuation of astigmatism and spherical aberration upon zooming can be suppressed.

When a corresponding value of the conditional expression (15) becomes less than a lower limit, it becomes difficult to suppress a fluctuation of astigmatism and spherical aberration generated in the third lens group G3 upon zooming, therefore high optical performance can be realized.

In order to further ensure the advantageous effect of the third embodiment, it is preferable that the lower limit of the conditional expression (15) is set to 0.570.

When a corresponding value of the conditional expression (15) exceeds an upper limit, upon zooming, a fluctuation of astigmatism generated in the fourth lens group G4 becomes excessive, therefore high optical performance cannot be realized.

In order to further ensure the advantageous effect of the third embodiment, it is preferable that the upper limit of a conditional expression (15) is set to 3.200. In order to further ensure the advantageous effect of the third embodiment, it is preferable that the upper limit of the conditional expression (15) is set to 2.400.

In the zoom optical system ZL according to the third embodiment, it is preferable that the following conditional expression (16) is satisfied.

$$0.470 < f4/ft < 0.900 \quad (16)$$

where, ft denotes a focal length of the zoom optical system ZL in a telephoto end state, and f4 denotes a focal length of the fourth lens group G4.

The conditional expression (16) defines a range of an appropriate focal length of the fourth lens group G4. By satisfying the conditional expression (16), a fluctuation of astigmatism and aspherical aberration upon zooming can be suppressed.

When a corresponding value of the conditional expression (16) becomes less than a lower limit, it becomes difficult to suppress a fluctuation of astigmatism and spherical aberration generated in the fourth lens group G4 upon zooming, therefore high optical performance cannot be realized.

In order to further ensure the advantageous effect of the third embodiment, it is preferable that the lower limit of the conditional expression (16) is set to 0.530.

When a corresponding value of the conditional expression (16) exceeds an upper limit, it is necessary to enlarge amount of movement of the fourth lens group G4 to the image surface I upon zooming, in order to secure a predetermined zoom ratio. As a result, since a diameter of the axial flux of light passing through the fourth lens group G4 greatly changes, a fluctuation of spherical aberration upon zooming becomes excessive, therefore high optical performance cannot be realized.

In order to further ensure the advantageous effect of the third embodiment, it is preferable to set the upper limit of the conditional expression (16) to 0.720.

In the zoom optical system ZL according to the third embodiment, it is preferable that the lens group arranged closest to the image has positive refractive power. With this arrangement, magnification used in the lens group arranged closest to the image becomes less 100%, therefore a composite focal length of the lens group arranged closer to the object side than the lens group arranged closest to the image (for example, corresponding to the first lens group G1 to the fourth lens group G4 in FIG. 1) can be relatively enlarged. As a result, it is possible to relatively suppress influence of decentering coma aberration, etc. due to decentering of lenses generated in the lens group arranged closer to the object than the lens group arranged closest to the image upon manufacture, therefore high optical performance can be realized.

In the zoom optical system ZL according to the third embodiment, it is preferable that the following conditional expression (17) is satisfied.

$$3.000 < fR/fw < 9.500 \quad (17)$$

where, fw denotes a focal length of the zoom optical system ZL in a wide-angle end state, and fR denotes a focal length of the lens group arranged closest to the image.

The conditional expression (17) defines an appropriate focal length of the lens group arranged closest to the image. By satisfying the conditional expression (17), a fluctuation of distortion and astigmatism upon zooming can be suppressed.

When a corresponding value of the conditional expression (17) becomes less than a lower limit, it becomes difficult to suppress a fluctuation of distortion and astigmatism generated in the lens group arranged closest to the image upon zooming, and high optical performance cannot be realized.

In order to further ensure the advantageous effect of the third embodiment, it is preferable to set the lower limit of a conditional expression (17) to 4.200.

When a corresponding value of the conditional expression (17) exceeds an upper limit, it becomes difficult to correct a fluctuation of astigmatism generated in the lens group arranged closer to the object side than the lens group arranged closest to the image, therefore high optical performance cannot be corrected.

In order to further ensure the advantageous effect of the third embodiment, it is preferable that the upper limit of the conditional expression (17) is set to 7.600.

In the zoom optical system ZL according to the third embodiment, it is preferable that the following conditional expression (18) is satisfied.

$$0.730 < (-f2)/fw < 1.800 \quad (18)$$

where, fw denotes a focal length of the zoom optical system ZL in a wide-angle end state, and f2 denotes a focal length of the second lens group G2.

The conditional expression (18) defines a range of an appropriate focal length of the second lens group G2. By satisfying the conditional expression (18), a fluctuation of astigmatism and spherical aberration upon zooming can be suppressed.

When a corresponding value of the conditional expression (18) becomes less than a lower limit, it becomes difficult to suppress a fluctuation of astigmatism and spherical aberration generated in the second lens group G2 upon zooming, therefore high optical performance cannot be realized.

In order to further ensure the advantageous effect of the third embodiment, it is preferable that the lower limit of the conditional expression (18) is set to 0.900. In order to further ensure the advantageous effect of the third embodiment, it is preferable that the lower limit of the conditional expression (18) is set to 1.065.

When a corresponding value of the conditional expression (18) exceeds an upper limit, it is necessary to enlarge a change of a distance between the first lens group G1 and the second lens group G2 upon zooming, in order to secure a predetermined zoom ratio. As a result, since a ratio of a diameter of the axial flux of light passing through the first lens group G1 and the second lens group G2 greatly changes, a fluctuation of spherical aberration upon zooming becomes excessive, therefore high optical performance cannot be realized.

In order to further ensure the advantageous effect of the third embodiment, it is preferable that the upper limit of a conditional expression (18) is set to 1.600.

In the zoom optical system ZL according to the third embodiment, the following conditional expression (19) is satisfied.

$$0.100 < (d3t - d3w)/fw < 0.330 \tag{19}$$

where, fw denotes a focal length of the zoom optical system ZL in a wide-angle end state, d3w denotes a distance on the optical axis from the lens arranged closest to the image side of the third lens group G3 in a wide-angle end state to the lens surface arranged closest to the object side of the fourth lens group G4, and d3t denotes a distance on the optical axis from the lens surface arranged closest to the image side of the third lens group G3 in a telephoto end state to the lens arranged closest to the object side of the fourth lens group G4.

The conditional expression (19) defines an appropriate range of a change of a distance between the third lens group G3 and the fourth lens group G4 upon zooming. By satisfying the conditional expression (19), a fluctuation of astigmatism upon zooming can be suppressed.

When a corresponding value of the conditional expression (19) becomes less than a lower limit, it becomes difficult to suppress a fluctuation of astigmatism generated in the third lens group G3 upon zooming, therefore high optical performance cannot be realized.

In order to further ensure the advantageous effect of the third embodiment, it is preferable that the lower limit of the conditional expression (19) is set to −0.080.

When a corresponding value of the conditional expression (19) exceeds an upper limit, a change a height from the optical axis of the off-axial flux of light passing through the fourth lens group G4 becomes large upon zooming, therefore a fluctuation of astigmatism generated in the fourth lens group G4 becomes excessive, thereby high optical performance cannot be realized.

In order to further ensure the advantageous effect of the third embodiment, it is preferable that the upper limit of the conditional expression (19) is set to 0.275.

In the zoom optical system ZL according to the third embodiment, it is preferable that the first lens group G1 moves to the object side upon zooming from a wide-angle end state to a telephoto end state. With this arrangement, it is possible to suppress a change of a height on the optical axis of the off-axial flux of light passing through the first lens group G1 upon zooming. As a result, it is possible to suppress a fluctuation of astigmatism generated in the first lens group G1 upon zooming.

In the zoom optical system ZL according to the third embodiment, it is preferable that a distance between the first lens group G1 and the second lens group G2 increases upon zooming from a wide-angle end state to a telephoto end state. With this arrangement, since magnification of the second lens group G2 can be doubled upon zooming from a wide-angle end state to a telephoto end state, a focal length of all lens groups can be configured to be long, therefore a fluctuation of astigmatism and spherical aberration upon zooming can be suppressed.

In the zoom optical system ZL according to the third embodiment, it is preferable that a distance between the second lens group G2 and the third lens group G3 decreases upon zooming from a wide-angle end state to a telephoto end state. With this arrangement, since a composite magnification from the third lens group G3 to the fifth lens group G5 upon zooming from a wide-angle end state to a telephoto end state, a focal length of all lens groups can be configured to be long, therefore a fluctuation of astigmatism and spherical aberration upon zooming can be suppressed.

In the zoom optical system ZL according to the third embodiment, it is preferable that an aperture stop S is disposed between the third lens group G3 and the fourth lens group G4. With this arrangement, a change of a height from the optical axis of the off-axial flux of light passing through the third lens group G3 and the fourth lens group G4 upon zooming can be reduced, therefore a fluctuation of astigmatism generated in the third lens group G3 and the fourth lens group G4 can be suppressed, thereby high optical performance can be realized.

In the zoom optical system ZL according to the third embodiment, it is preferable that the third lens group G3 moves along the optical axis upon focusing. With this arrangement, amount of movement upon focusing on a telephoto side is suppressed, and a fluctuation of a height from the optical axis regarding light incident on the third lens group G3 which is a focusing lens group on the telephoto side is suppressed, therefore a fluctuation of astigmatism and spherical aberration upon focusing can be suppressed.

In the zoom optical system ZL according to the third embodiment, it is preferable that the third lens group G3 moves to the image side upon focusing from an infinity object to a short-distance object. With this arrangement, focusing can be performed only with the third lens group G3, therefore a fluctuation of astigmatism and spherical aberration upon focusing can be suppressed, thereby high optical performance can be realized.

According to the zoom optical system ZL according to the third embodiment equipped with the above configurations, it is possible to realize the zoom optical system having high optical performance over the whole zoom range.

Next, referring to FIG. 17, a camera (optical device) equipped with the above zoom optical system ZL is described. This camera 1 has the same configurations as those of the first embodiment, and its configurations are already described, thus the explanations are omitted.

The zoom optical system ZL according to the third embodiment installed as the photographic lens 2 in the camera 1 has, as found in each example mentioned below, high optical performance over the whole zoom range with the characteristic lens configurations. Thus, according to the camera 1 according to the third embodiment, it is possible to realize an optical device having high optical performance over the whole zoom range.

Note that in case of installing the zoom optical system ZL mentioned above on a single lens reflex type camera having a quick return mirror and observing a photographic subject with a finder optical system, the same advantageous effect as the above camera 1 can be obtained. In case of installing the zoom optical system ZL on a video camera, the same advantageous effect as the camera 1 can be obtained.

Figure 20:
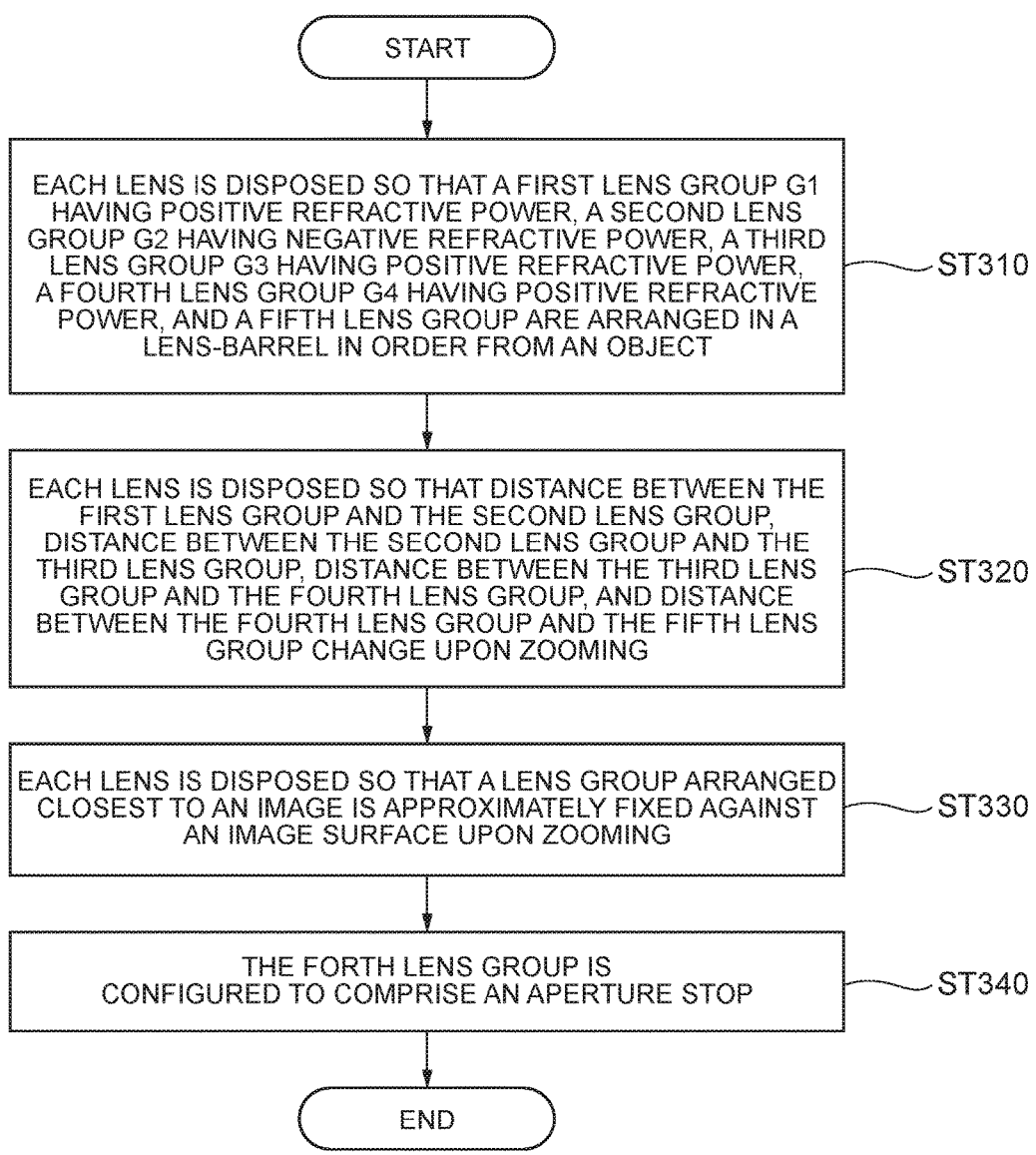
FIG. 20 is a diagram illustrating an outline of a method for manufacturing a zoom optical system according to the third embodiment.

Next, referring to FIG. 20, a method for manufacturing the zoom optical system ZL is outlined. Firstly, each lens is disposed in a lens-barrel so that a first lens group having positive refractive power, a second lens group having negative refractive power, a third lens group having positive refractive power, a fourth lens group having positive refractive power, and a fifth lens group are arranged in order from an object (Step ST310). In this situation, each lens is disposed so that a distance between the first lens group G1 and the second lens group G2 upon zooming, a distance between the second lens group G2 and the third lens group G3, a distance between the third lens group G3 and the fourth lens group G4, and a distance between the fourth lens group G4 and the fifth lens group G5 change upon zooming (Step ST320). Each lens is disposed so that the lens group arranged closest to the images approximately fixed to an image surface upon zooming (Step ST330). The fourth lens group G4 is configured to have an aperture stop S (Step ST340).

Exampling a lens arrangement in the third embodiment, in the zoom optical system ZL illustrated in FIG. 1, as the first lens group G1 having positive refractive power, a cemented lens composed of a negative meniscus lens L11 having a convex surface facing an object and a biconvex positive lens L12, and a positive meniscus lens L13 having a convex surface facing an object are disposed in the lens-barrel in order from an object along an optical axis. As the second lens group G2 having negative refractive power, a negative meniscus lens L21 having a convex surface facing the object, a biconcave negative lens L22, and a biconvex positive lens L23 are disposed in the lens-barrel in order from the object along the optical axis. As the third lens group G3 having positive refractive power, a biconvex positive lens L31 is disposed in the lens-barrel. As the fourth lens group G4 having positive refractive power, the aperture stop S, a cemented lens composed of a negative meniscus lens L41 having a convex surface facing the object and a biconvex positive lens L42, a cemented lens composed of a biconvex positive lens L43 and a negative meniscus lens L44 having a concave surface facing to the object, and a negative meniscus lens L45 having a convex surface facing the object are disposed in the lens-barrel. As the fifth lens group G5, a positive meniscus lens L51 having a concave surface facing the object is disposed in the lens-barrel.

According to the method for manufacturing the zoom optical system according to the third embodiment, it is possible to manufacture the zoom optical system ZL having high optical performance over the whole zoom range.

As described above, according to the third embodiment, it is possible to solve a problem owned by the conventional zoom optical system such that it is difficult to maintain sufficiently high optical performance over the whole zoom range.

Next, the fourth embodiment is described with referred to drawings. The zoom optical system ZL according to the fourth embodiment is configured to comprise, as illustrated in FIG. 1, in order from an object along an optical axis, a first lens group G1 having positive refractive power, a second lens group G2 having negative refractive power, a third lens group G3 having positive refractive power, a fourth lens group G4 having positive refractive power, and a distance between the first lens group G1 and the second lens group G2, a distance between the second lens group G2 and the third lens group G3, and a distance between the third lens group G3 and the fourth lens group G4 are configured to change upon zooming. With this arrangement, it is possible to realize zooming, and suppress respective fluctuations of spherical aberration, astigmatism, and distortion accompanying zooming.

In the zoom optical system ZL according to the fourth embodiment, a fourth lens group G4 comprises, in order from the object along the optical axis, a fourth A sublens group G4A (vibration-free lens group) configured to enable to move in a manner of having a component in a direction perpendicular to the optical axis in order to correct image blur, and a fourth B sublens group G4B. With this arrangement, a ratio of amount of movement regarding an image in the direction perpendicular to the optical axis against amount of movement of the fourth A sublens group G4A in the direction perpendicular to the optical axis can be appropriate, therefore astigmatism and decentering coma aberration generated while the fourth A sublens group G4A is moving can be suppressed.

In the zoom optical system ZL according to the fourth embodiment, it is preferable that a distance between the fourth A sublens group G4A and the fourth B sublens group G4B is constant. With this arrangement, tilt decentering between the fourth A sublens group G4A and the fourth B sublens group G4B when manufacturing can be suppressed, therefore astigmatism and decentering coma aberration due to the tilt decentering can be suppressed.

In the zoom optical system ZL according to the fourth embodiment, it is preferable that the following conditional expression (20) is satisfied.

$$0.480 < f3/ft < 4.000 \tag{20}$$

where, ft denotes a focal length of the zoom optical system ZL in a telephoto end state, and
f3 denotes a focal length of the third lens group G3.

The conditional expression (20) defines a range of an appropriate focal length of the third lens group G3. By satisfying the conditional expression (20), it is possible to suppress a fluctuation of astigmatism and spherical aberration upon zooming, and astigmatism and decentering coma generated when the fourth A sublens group G4A is moving in the direction perpendicular to the optical axis.

When a corresponding value of the conditional expression (20) becomes less than a lower limit, it becomes difficult to suppress a fluctuation of astigmatism and spherical aberration generated in the third lens group G3 upon zooming, therefore high optical performance cannot be realized.

In order to further ensure the advantageous effect of the fourth embodiment, it is preferable that the lower limit of the conditional expression (20) is set to 0.570.

When a corresponding value of the conditional expression (20) exceeds an upper limit, a fluctuation of astigmatism generated in the fourth lens group G4 becomes excessive upon zooming, thereby high optical performance cannot be realized. A ratio of amount of movement regarding the image in the direction perpendicular to the optical axis against amount of movement in the direction perpendicular to the optical axis regarding the fourth A sublens group G4A decreases, accordingly necessary amount of movement of the fourth A sublens group G4A in the direction perpendicular to the optical axis increases. Then, it becomes impossible to suppress astigmatism and decentering coma generated when the fourth A sublens group G4A is moving in the direction perpendicular to the optical axis In order to further ensure the advantageous effect of the fourth embodiment, it is preferable that the upper limit of the conditional expression (20) is set to 3.200. In order to additionally ensure the advantageous effect of the fourth embodiment, it is preferable that the upper limit of the conditional expression (20) is set to 2.400.

In the zoom optical system ZL according to the fourth embodiment, it is preferable that the fourth A sublens group G4A has positive refractive power. With this arrangement, a ratio of amount of movement regarding the image in the direction perpendicular to the optical axis against amount of movement in the direction perpendicular to the optical axis of the fourth A sublens group G4A can be appropriate, thus astigmatism and decentering coma aberration generated while the fourth A sublens group G4A is moving can be suppressed.

In the zoom optical system ZL according to the fourth embodiment, it is preferable that the following conditional expression (21) is satisfied.

$$0.900 < f4/fw < 4.450 \qquad (21)$$

where, fw denotes a focal length of the zoom optical system ZL in a wide-angle end state, and f4 denotes a focal length of the fourth lens group G4.

The conditional expression (21) defines a range of an appropriate focal length of the fourth lens group G4. By satisfying the conditional expression (21), a fluctuation of astigmatism and spherical aberration upon zooming can be suppressed.

When a corresponding value of the conditional expression (21) becomes less than a lower limit, it becomes difficult to suppress a fluctuation of astigmatism and spherical aberration generated in the fourth lens group G4 upon zooming, thereby high optical performance cannot be realized.

In order to further ensure the advantageous effect of the fourth embodiment, it is preferable that the lower limit of the conditional expression (21) is set to 1.400. In order to additionally ensure the advantageous effect of the fourth embodiment, it is preferable that the lower limit of the conditional expression (21) is set to 2.500.

When a corresponding value of the conditional expression (21) exceeds an upper limit, it is necessary to increase amount of movement regarding the fourth lens group G4 against the image surface I, upon zooming, in order to secure a predetermined zoom ratio. As a result, since a diameter of the axial flux of light passing through the fourth lens group G4 greatly changes, a fluctuation of spherical aberration upon zooming becomes excessive, therefore high optical performance cannot be realized.

In order to further ensure the advantageous effect of the fourth embodiment, it is preferable that the upper limit of the conditional expression (21) is set to 4.200.

In the zoom optical system ZL according to the fourth embodiment, it is preferable that the following conditional expression (22) is satisfied.

$$0.600 < f3/f4 < 4.000 \qquad (22)$$

where, f3 denotes a focal length of the third lens group G3, and f4 denotes a focal length of the fourth lens group G4.

The conditional expression (22) defines a range of an appropriate focal length of the third lens group G3 and the fourth lens group G4. By satisfying the conditional expression (22), it is possible to suppress a fluctuation of astigmatism and spherical aberration upon zooming, and astigmatism and decentering coma aberration generated when the fourth A sublens group G4A is moving in the direction perpendicular to the optical axis.

When a corresponding value of the conditional expression (22) becomes less than a lower limit, it becomes difficult to suppress a fluctuation of astigmatism and spherical aberration generated in the third lens group G3 upon zooming, therefore high optical performance cannot be realized.

In order to further ensure the advantageous effect of the fourth embodiment, it is preferable that the lower limit of the conditional expression (22) is set to 0.840. In order to further ensure the advantageous effect of the fourth embodiment, it is preferable that the lower limit of the conditional expression (22) is set to 0.970.

When a corresponding value of the conditional expression (22) exceeds an upper limit, a ratio of amount of movement regarding the image in the direction perpendicular to the optical axis against amount of movement in the direction perpendicular to the optical axis of the fourth A sublens group G4A decreases, accordingly necessary amount of movement regarding the fourth A sublens group G4A in the direction perpendicular to the optical axis increases. Then, it is possible to suppress astigmatism and decentering coma aberration generated when the fourth A sublens group G4A moves in a direction perpendicular to the optical direction.

In order to further ensure the advantageous effect of the fourth embodiment, it is preferable that the upper limit of the conditional expression (22) is set to 2.880.

In the zoom optical system ZL according to the fourth embodiment, it is preferable that the following conditional expression (23) is satisfied.

$$0.155 < (-f2)/ft < 0.500 \qquad (23)$$

where, ft denotes a focal length of the zoom optical system ZL in a telephoto end state, and f2 denotes a focal length of the second lens group G2.

The conditional expression (23) defines a range of an appropriate focal length of the second lens group G2. By satisfying the conditional expression (23), it is possible to suppress a fluctuation of astigmatism and spherical aberration upon zooming.

When a corresponding value of the conditional expression (23) becomes less than a lower limit, it becomes difficult to suppress a fluctuation of astigmatism and spherical aberration generated in the second lens group G2 upon zooming, therefore high optical performance cannot be realized.

In order to further ensure the advantageous effect of the fourth embodiment, it is preferable that the lower limit of the conditional expression (23) is set to 0.170.

When a corresponding value of the conditional expression (23) exceeds an upper limit, it is necessary to enlarge a change of a distance between the first lens group G1 and the second lens group G2 upon zooming in order to secure a predetermined zoom ratio. As a result, since a ratio of a diameter of the axial flux of light passing through the first lens group G1 and the second lens group G2 greatly changes, a fluctuation of spherical aberration upon zooming becomes excessive, therefore high optical performance cannot be realized.

In order to further ensure the advantageous effect of the fourth embodiment, it is preferable that the upper limit of the conditional expression (23) is set to 0.380.

In the zoom optical system ZL according to the fourth embodiment, it is preferable that the following conditional expression (24) is satisfied.

$$0.750 < f1/ft < 3.000 \qquad (24)$$

where, ft denotes a focal length of the zoom optical system ZL in a telephoto end state, and f1 denotes a focal length of the first lens group G1.

The conditional expression (24) defines a range of an appropriate focal length of the first lens group G1. By satisfying the conditional expression (24), it is possible to suppress a fluctuation of astigmatism and spherical aberration upon zooming.

When a corresponding value of the conditional expression (24) becomes less than a lower limit, it becomes difficult to suppress a fluctuation of chromatic aberration of magnification, astigmatism, and spherical aberration generated in the first lens group G1 upon zooming, therefore high optical performance is not realized.

In order to further ensure the advantageous effect of the fourth embodiment, it is preferable that the lower limit of the conditional expression (24) is set to 0.850.

When a corresponding value of the conditional expression (24) exceeds an upper limit, it is necessary to increase a change of a distance between the first lens group G1 and the second lens group G2 upon zooming in order to secure a predetermined zoom ratio. As a result, since a height from the optical axis of the off-axial flux of light passing through the first lens group G1 greatly changes, a fluctuation of astigmatism upon zooming becomes excessive, therefore high optical performance cannot be realized.

In order to further ensure the advantageous effect of the fourth embodiment, it is preferable that the upper limit of the conditional expression (24) is set to 2.000. In order to additionally ensure the advantageous effect of the fourth embodiment, it is preferable that the upper limit of the conditional expression (24) is set to 1.700.

It is preferable that the zoom optical system ZL according to the fourth embodiment comprise the fifth lens group G5 on an image side of the fourth lens group G4 along the optical axis, and a distance between the fourth lens group G4 and the fifth lens group G5 changes upon zooming. With this arrangement, since zooming can be efficiently performed, refractive power of the fourth lens group G4 can be weakened, therefore it is possible to suppress a fluctuation of spherical aberration, astigmatism and distortion accompanying zooming and generated in the fourth lens group G4.

In the zoom optical system ZL according to the fourth embodiment, it is preferable that the lens group arranged closest to the image (for example, corresponding to the fifth lens group G5 in FIG. 1) is approximately fixed against the image surface I. By approximately fixing the lens group arranged closest to the image against the image surface I mentioned above, a change of a height of the off-axial flux of light passing through the lens group arranged closest to the image can be optimized, therefore a fluctuation of astigmatism and distortion can be suppressed. This enables to simplify a lens-barrel structure configuring the zoom optical system ZL, suppress decentering due to manufacturing errors, etc., and suppress inclination of surrounding image surfaces and decentering coma aberration generated due to decentering of the lens group arranged closest to the image.

In the zoom optical system ZL according to the fourth embodiment, it is preferable that the lens group arranged closest to the image has positive refractive power. With this arrangement, magnification used in the lens arranged closest to the image becomes less than 100%, therefore it is possible to relatively increase a composite focal length of the lens group arranged closer to the object (for example, corresponding to the first lens group G1 to the fourth lens group G4 in FIG. 1) than the lens group arranged closest to the image. As a result, it is possible to relatively suppress influence of decentering coma aberration generated due to decentering between lenses, generated in the lens arranged closer to the object than the lens group arranged closest to the image when manufacturing, therefore high optical performance can be realized.

In the zoom optical system ZL according to the fourth embodiment, it is preferable that the following conditional expression (25) is satisfied.

$$3.000 < fR/fw < 9.500 \quad (25)$$

where, fw denotes a focal length of the zoom optical system ZL in a wide-angle end state, and fR denotes a focal length of the lens group arranged closest to the image.

The conditional expression (25) defines a range of an appropriate focal length of the lens group arranged closest to the image. By satisfying the conditional expression (25), it is possible to suppress a fluctuation of distortion and astigmatism upon zooming.

When a corresponding value of the conditional expression (25) becomes less than a lower limit, it becomes difficult to suppress a fluctuation of distortion and astigmatism generated in the lens group arranged closest to the image upon zooming, therefore high optical performance cannot be realized.

In order to further ensure the advantageous effect of the fourth embodiment, it is preferable that the lower limit of the conditional expression (25) is set to 4.200.

When a corresponding value of the conditional expression (25) exceeds an upper limit, it becomes difficult to correct a fluctuation of astigmatism generated in the lens group arranged closer to the object than the lens group arranged closest to the image by the lens group arranged closest to the image, therefore high optical performance cannot be realized.

In order to further ensure the advantageous effect of the fourth embodiment, it is preferable that the upper limit of the conditional expression (25) is set to 7.600.

In the zoom optical system ZL according to the fourth embodiment, it is preferable that only the third lens group G3 moves along the optical axis upon focusing. With this arrangement, amount of movement upon focusing on a telephoto side is suppressed, and a fluctuation of a height from the optical axis regarding light incident on the third lens group G3 which is a focusing lens group in the telephoto side can be suppressed, therefore a fluctuation of astigmatism and spherical aberration upon focusing can be suppressed.

In the zoom optical system ZL according to the fourth embodiment, it is preferable that the third lens group G3 moves to the image side upon focusing from an infinity object to a short-distance object. With this arrangement, it becomes possible to focus only with the third lens group G3, it is possible to suppress a fluctuation of astigmatism and spherical aberration upon focusing while downsizing the focusing lens group, therefore high optical performance can be realized.

In the zoom optical system ZL according to the fourth embodiment, it is preferable that the first lens group G1 moves to the object side upon zooming from a wide-angle end state to a telephoto end state. With this arrangement, it is possible to suppress a change of a height from the optical axis regarding an off-axial flux of light passing through the first lens group G1 upon zooming. With this arrangement, it is possible to suppress a fluctuation of astigmatism upon zooming generated by the first lens group G1.

In the zoom optical system ZL according to the fourth embodiment, it is preferable that a distance between the first lens group G1 and the second lens group G2 increases upon zooming from a wide-angle end state to a telephoto end state. With this arrangement, since magnification of the second lens group G2 can be doubled upon zooming from the wide-angle end state to the telephoto end state, a focal length of all lens groups can be configured to be long, therefore a fluctuation of astigmatism and spherical aberration upon zooming can be suppressed.

In the zoom optical system ZL according to the fourth embodiment, it is preferable that a distance between the second lens group G2 and the third lens group G3 decreases upon zooming from a wide-angle end state to a telephoto end state. With this arrangement, since a composite magnification regarding from the third lens group G3 to the lens group arranged closest to the image can increase upon zooming from the wide-angle end state to the telephoto end state, a focal length of all lens groups can be configured to be long, therefore a fluctuation of astigmatism and spherical aberration upon zooming can be suppressed.

In the zoom optical system ZL according to the fourth embodiment, it is preferable that the fourth lens group G4 has an aperture stop S. With this arrangement, a fluctuation of astigmatism generated in the fourth lens group G4 can be suppressed upon zooming, therefore high optical performance can be realized.

In the zoom optical system ZL according to the fourth embodiment, it is preferable that the aperture stop S is disposed between the third lens group G3 and the fourth lens group G4. With this arrangement, a change of a height from the optical axis regarding an off-axial flux of light passing through the third lens group G3 and the fourth lens group G4 upon zooming can be reduced, and a fluctuation of astigmatism generated in the third lens group G3 and the fourth lens group G4 can be suppressed, therefore high optical performance can be realized.

According to the zoom optical system ZL according to the fourth embodiment equipped with the above configurations, it is possible to realize the zoom optical system not only having high optical performance over a whole zoom range, but also having high optical performance high when correcting image blur.

Next, referring to FIG. 17, a camera (optical device) equipped with the zoom optical system ZL is described. This camera 1 has the same configurations as those of the first embodiment, and its configurations have already been described, the explanation is omitted here.

As found in each example mentioned below, the zoom optical system ZL according to the fourth embodiment equipped on the camera 1 as the photographing lens 2 has not only high optical performance over the whole zoom range, by the characteristic lens configurations, but also have high optical performance when correcting image blur. Therefore, according to the camera 1 according to the fourth embodiment, it is possible to realize an optical device not only having high optical performance over the whole zoom range, but also having high optical performance when correcting image blur.

Note that in case of installing the zoom optical system ZL mentioned above on a single lens reflex type camera having a quick return mirror and observing a photographic subject with a finder optical system, the same advantageous effect as the above camera 1 can be obtained. In case of installing the zoom optical system ZL on a video camera, the same advantageous effect as the camera 1 can be obtained.

Figure 21:
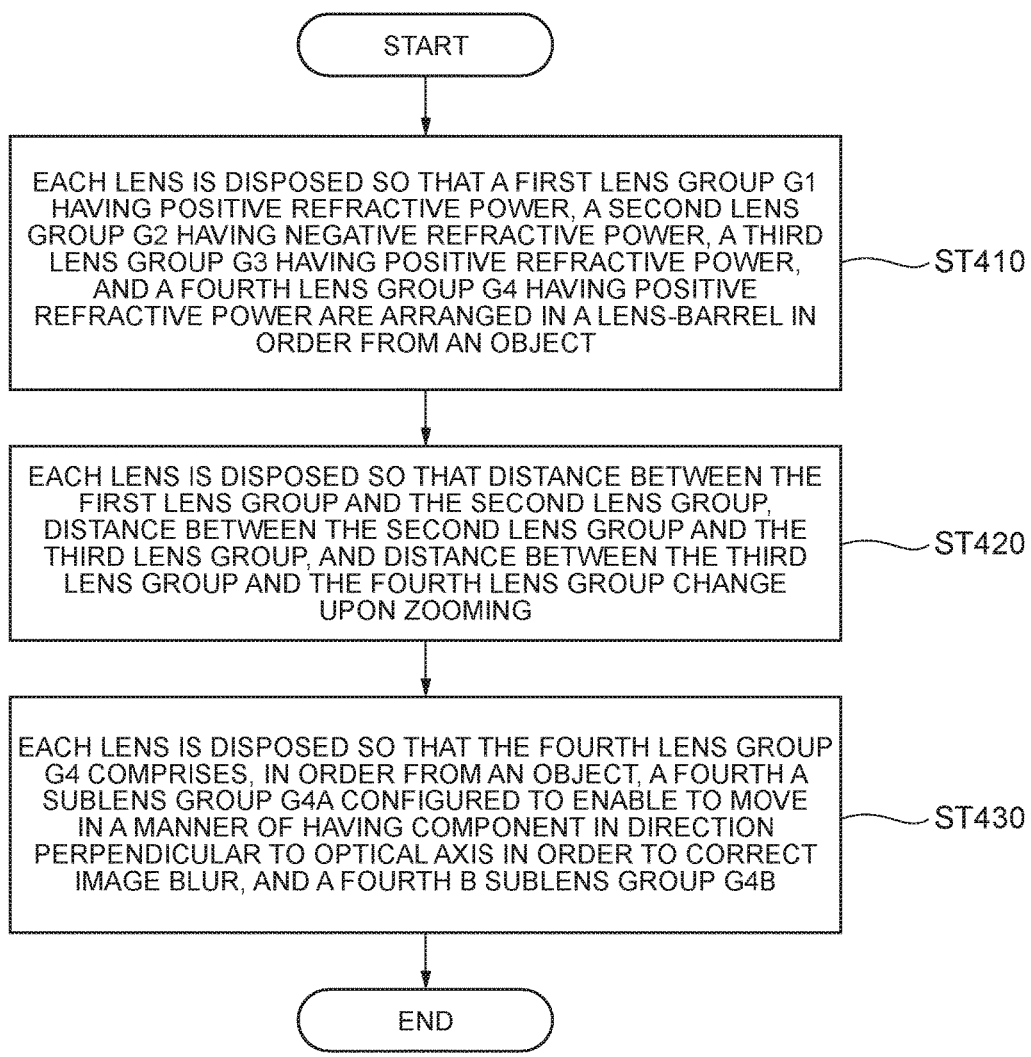
FIG. 21 is a diagram illustrating an outline of a method for manufacturing a zoom optical system according to the fourth embodiment.

Next, referring to FIG. 21, a method for manufacturing the zoom optical system ZL is outlined. Firstly, each lens is disposed in a lens-barrel so that a first lens group G1 having positive refractive power, a second lens group G2 having negative refractive power, a third lens group G3 having positive refractive power, and a fourth lens group G4 having positive refractive power are arranged in order from an object (Step ST410). At this point, each lens is disposed so that a distance between the first lens group G1 and the second lens group G2, a distance between the second lens group G2 and the third lens group G3, and a distance between the third lens group G3 and the fourth lens group G4 change upon zooming (Step ST420). Each lens is disposed so that the fourth lens group G4 comprises, in order from an object, a fourth A sublens group G4A configured to enable to move in a manner of having a component in a direction perpendicular to the optical axis in order to correct image blur, and a fourth B sublens group G4B (Step ST430).

Exampling a lens arrangement according to the fourth embodiment, the zoom optical system ZL illustrated in FIG. 1, as the first lens group G1 having positive refractive power, a cemented lens composed of a negative meniscus lens L11 having a convex surface facing the object and a biconvex positive lens L12, and a positive meniscus lens L13 having a convex surface facing the object are disposed in the lens-barrel. As the second lens group G2 having negative refractive power, a negative meniscus lens L21 having a convex surface facing the object, a biconcave negative lens L22, and a biconvex positive lens L23 are disposed in the lens-barrel. As the third lens group G3 having positive refractive power, a biconvex positive lens L31 is disposed in the lens-barrel. As the fourth lens group G4 having positive refractive power, a fourth A sublens group G4A configured of a cemented lens composed of a negative meniscus lens L41 having a convex surface facing the object and a biconvex positive lens L42, a fourth B lens group G4B composed of a cemented lens composed of a biconvex positive lens L43 and a negative meniscus lens L44 having a concave surface facing the object, and a negative meniscus lens L45 having a convex surface facing the object are disposed in the lens-barrel in order from the object along the optical axis. As the fifth lens group G5, a positive meniscus lens L51 having a concave surface facing the object is disposed in the lens-barrel.

According to the method for manufacturing the zoom optical system according to the fourth embodiment, it is possible to manufacture the zoom optical system ZL not only having high optical performance over the whole zoom range, but also having high optical performance when correcting image blur.

As described above, according to the fourth embodiment, it is possible to solve a problem such that it is difficult to maintain sufficiently-high optical performance over the whole zoom range, and a problem such that it is difficult to obtain sufficiently-high optical performance when correcting image blur, owned by a conventional zoom optical system.

EXAMPLES ACCORDING TO FIRST TO FOURTH EMBODIMENTS

Each example according to the first to fourth embodiments is described based on drawings. Tables 1 to 4 are now shown, and these are Tables of each various data according to Example 1 to Example 4.

However, Example 4 corresponds only to the fourth embodiment.

Each reference sign regarding FIG. 1 according to Example 1 is used independently for every example, in order to avoid complicating explanations due to swelling of the digit number of reference signs. Therefore, even if attached with the same reference signs as those in drawings according to other examples, this does not necessarily mean the same configurations as those in the other examples.

In each example, d-line (wave length of 587.5620 nm) and g-line (wave length of 435.8350 nm) are selected as subjects for calculating aberration characteristics.

In the [Lens data] in tables, a surface number means an order of each optical surface from the object side along a direction light travels, R means a radius of curvature of each optical surface, D means a surface distance on the optical axis from each optical surface to the next optical surface (or image surface), nd means a refractive index against d-line of a material of a optical member, and vd means an Abbe number on the basis of d-line of a material of the light member. Object surface means an object surface, (Variable) means a variable distance between surfaces, "∞" of a radius of curvature means a plane or an aperture, (Stop S) means an aperture stop S, and an image surface means an image surface I. The refractive index "1.000000" of air is omitted. In a case the optical surface is an aspherical surface, a sign "*" is assigned to the surface number and a paraxial radius of curvature is shown in a column of a radius of curvature R.

In [Aspherical surface data] in tables, regarding the aspherical surfaces in the [Lens data], the configuration is defined by the following expression (a). X(y) means a distance along the optical axis direction from a tangent plane in a vertex of the aspherical surface to a position on the aspherical surface in height y, and R means a radius of curvature (paraxial radius of curvature) of a criterion spherical surface, κ means a conic constant, and, Ai means an i-th aspherical surface coefficient. "E-n" means "×10$^{-n}$." For example, 1.234E-05=1.234×10$^{-5}$. Note that the secondary aspherical surface coefficient A2 is 0, and its description is omitted.

$$X(y)=(y^2/R)/\{1+(1-\kappa \times y^2/R^2)^{1/2}\}\pm A4y^4+A6y^6+A8y^8+A10y^{10}+A12y^{12} \quad (a)$$

In [Various data] in Tables, f means a focal length of a lens whole system, and FNo means a F number, ω means an half-angle of view (units: degree), Y means an image height, φ means the diameter of the aperture stop S, TL means a total optical length of a lens (a distance on the optical axis from a first surface upon focusing on an infinity object to the image surface I), and BF means backfocus (a distance on the optical axis from the lens surface arranged closest to the image surface upon focusing on the infinity object to the image surface I). W means a wide-angle end state, M means an intermediate focal length state, and T means a telephoto end state.

In [Variable distance data] in Tables, a value Di of a variable distance in each state of a wide-angle end state upon focusing on infinity (W), an intermediate focal length state (M), and a telephoto end state (T) are shown. Note that Di means a variable distance between an i-th surface and an (i+1)-th surface.

In [Amount of movement of focusing group upon focusing] in Tables, amount of movement of a focusing lens group (the third lens group G3) from an infinity focusing state to a short-distance focusing state (distance between object images: 1.00 m) is shown. Here, regarding a moving direction of the focusing lens group, moving to the image side is defined as positive. An shooting distance means a distance from the object to the image surface I.

In [lens group data] in Tables, a frontend surface and a focal length regarding each lens group are shown.

In [Values corresponding to the conditional expressions] in Tables, values corresponding to the above conditional expressions are shown.

Hereinafter, in all general data values, regarding the focal length f, a radius of curvature R, a distance D, and other lengths, etc. as shown, "mm" is generally used except a specific request, however an optical system is not limited to the above, since equivalent optical performance can be obtained even if the optical system is proportionally enlarged or proportionally shrinked. Moreover, the unit is not limited to "mm," another appropriate unit is available, instead.

The explanations concerning the tables are common among all the examples, thus hereinafter the explanation is omitted.

Example 1

Example 1 is described using FIG. 1, FIGS. 2A, 2B and 2C, FIGS. 3A, 3B and 3C, FIGS. 4A, 4B and 4C and Table 1. The zoom optical system ZL (ZL1) according to Example 1 comprises, as illustrated in FIG. 1, in order from an object along an optical axis, a first lens group G1 having positive refractive power, a second lens group G2 having negative refractive power, a third lens group G3 having positive refractive power, a fourth lens group G4 having positive refractive power, and a fifth lens group G5 having positive refractive power. An aperture stop S is provided between the third lens group G3 and the fourth lens group G4, and the aperture stop S configures the fourth lens group G4. The fifth lens group G5 is the lens group arranged closest to the image.

The first lens group G1 is composed of, in order from the object along the optical axis, a cemented lens composed of a negative meniscus lens L11 having a convex surface facing the object and a biconvex positive lens L12, and a positive meniscus lens L13 having a convex surface facing the object.

The second lens group G2 is composed of, in order from the object along the optical axis, a negative meniscus lens L21 having a convex surface facing the object, a biconcave negative meniscus lens L22, and a biconvex positive lens L23. Note that the negative meniscus lens L21 is a complexed aspherical lens made from resin and glass, in which a lens surface on the object side is aspherical shaped.

The third lens group G3 is composed of a biconvex positive lens L31. Note that the positive lens L31 is a glass-molded aspherical lens, in which lens surfaces on the object and image sides are aspherical shaped.

The fourth lens group G4 is composed of, in order from the object along the optical axis, a fourth A sublens group G4A configured of a cemented lens composed of a negative meniscus lens L41 having a convex surface facing the object and a biconvex positive lens L42, a fourth B sublens group G4B configured of a cemented lens composed of a biconvex positive lens L43 and a negative meniscus lens L44 having a concave surface facing the object, and a negative meniscus lens L45 having a convex surface facing the object. Note that the negative meniscus lens L44 is a glass-molded aspherical lens in which a lens surface on the image side is aspherical shaped.

The fifth lens group G5 is composed of a positive meniscus lens L51 having a concave surface facing the object.

In the zoom optical system ZL1 according to the present example, the first lens group G1 to the fourth lens group G4 moves along the optical axis so that an air distance between the first lens group G1 and the second lens group G2, an air distance between the second lens group G2 and the third lens group G3, an air distance between the third lens group G3 and the fourth lens group G4, and an air distance between the fourth lens group G4 and the fifth lens group G5 respectively change upon focusing from a wide-angle end state to a telephoto end state. The fifth lens group G5 is fixed to the image surface I.

Specifically speaking, the first lens group G1 to the fourth lens group G4 move to the object side. The aperture stop S moves to the object side together with the fourth lens group G4.

With this arrangement, upon zooming, the air distance between the first lens group G1 and the second lens group G2 increases, the air distance between the second lens group G2 and the third lens group G3 decreases, the air distance between the third lens group G3 and the fourth lens group G4 increases, and the air distance between the fourth lens group G4 and the fifth lens group G5 increase. The air distance between the aperture stop S and the third lens group G3 increases.

Focusing is performed by moving the third lens group G3 along the optical axis. Specifically speaking, this is performed by moving the third lens group G3 to the image side along the optical axis upon focusing from an infinity object to a short-distance object.

When image blur is generated, image blur on the image surface I is corrected (vibration-controlled) by moving the fourth A sublens group G4A as a vibration-free lens group in a manner of having a component in a direction perpendicular to the optical axis.

Table 1 shows values of each various data in Example 1. Surface numbers 1 to 25 in Table 1 correspond to each optical surface of m1 to m25 illustrated in FIG. 1.

TABLE 1

[Lens Data]

| Surface number | R | D | nd | vd |
|---|---|---|---|---|
| Object surface | ∞ | | | |
| 1 | 132.7211 | 1.6000 | 1.846660 | 23.80 |
| 2 | 54.2419 | 4.5271 | 1.589130 | 61.22 |
| 3 | −1401.4921 | 0.1000 | | |
| 4 | 36.9475 | 4.0173 | 1.696800 | 55.52 |
| 5 | 200.3945 | D5(Variable) | | |
| *6 | 510.0000 | 0.0800 | 1.560930 | 36.64 |
| 7 | 288.8364 | 1.0000 | 1.816000 | 46.59 |
| 8 | 8.8676 | 4.8531 | | |
| 9 | −23.6529 | 0.9000 | 1.696800 | 55.52 |
| 10 | 37.1909 | 0.7644 | | |
| 11 | 21.6553 | 2.6218 | 1.808090 | 22.74 |
| 12 | −149.6082 | D12(Variable) | | |
| *13 | 31.4469 | 1.4931 | 1.589130 | 61.15 |
| *14 | −454.8143 | D14(Variable) | | |
| 15 | ∞ | 1.7118 | (Stop) | |
| 16 | 17.8093 | 0.9000 | 1.834000 | 37.18 |
| 17 | 10.8731 | 2.4554 | 1.497820 | 82.57 |
| 18 | −36.9740 | 1.5005 | | |
| 19 | 14.0517 | 2.3992 | 1.518230 | 58.82 |
| 20 | −15.0205 | 1.0034 | 1.851350 | 40.13 |
| *21 | −25.0875 | 0.2985 | | |
| 22 | 23.6629 | 2.4328 | 1.902650 | 35.73 |
| 23 | 8.6520 | D23(Variable) | | |
| 24 | −29.8985 | 2.0872 | 1.617720 | 49.81 |
| 25 | −17.6129 | BF | | |
| Image surface | ∞ | | | |

[Aspherical surface data]

The 6th surface $\kappa$ = 1.00000
A4 = 1.30134E−05
A6 = 5.20059E−08
A8 = −1.38176E−09
A10 = 6.06866E−12
A12 = 0.00000E+00

The 13th surface $\kappa$ = 0.3322
A4 = 5.55970E−05
A6 = 3.96498E−07
A8 = 3.97804E−09
A10 = 0.00000E+00
A12 = 0.00000E+00

The 14th surface $\kappa$ = 4.0000
A4 = 9.44678E−05
A6 = 5.47705E−07
A8 = 1.37698E−23

TABLE 1-continued

A10 = 0.00000E+00
A12 = 0.00000E+00
The 21th surface $\kappa$ = −1.0412
A4 = 8.07840E−06
A6 = −1.60525E−07
A8 = −3.84486E−09
A10 = 0.00000E+00
A12 = 0.00000E+00

[Various data]
Zoom ratio 4.71

| | W | M | T |
|---|---|---|---|
| f | 10.29845 | 32.00216 | 48.49978 |
| FNO | 3.60 | 5.06 | 5.79 |
| ω | 39.76047 | 13.63173 | 9.16599 |
| Y | 8.00 | 8.00 | 8.00 |
| φ | 7.80 | 8.30 | 8.30 |
| TL | 79.34243 | 95.80944 | 105.57918 |
| BF | 13.25602 | 13.25602 | 13.25602 |

[Variable distance data]

| | W | M | T |
|---|---|---|---|
| f | 10.29845 | 32.00216 | 48.49978 |
| D5 | 1.80000 | 16.93666 | 22.35926 |
| D12 | 18.49692 | 5.54052 | 1.80069 |
| D14 | 3.61695 | 3.90524 | 5.82908 |
| D23 | 5.42688 | 19.42534 | 25.58847 |

[Amount of movement of focusing group upon focusing]

| | W | M | T |
|---|---|---|---|
| Distance between object and image | 1.00 m | 1.00 m | 1.00 m |
| Amount of movement | 0.2652 | 0.7481 | 1.2334 |

[Lens group data]

| Group number | Group first surface | Group focal length |
|---|---|---|
| G1 | 1 | 57.25524 |
| G2 | 6 | −11.09964 |
| G3 | 13 | 49.98341 |
| G4 | 15 | 28.96589 |
| G5 | 24 | 65.16201 |

[Values corresponding to conditional expressions]

Conditional expression(1)f3/ft = 1.031
Conditional expression(2)(−f2)/fw = 1.078
Conditional expression(3)f3/f4 = 1.726
Conditional expression(4)v3 = 61.15
Conditional expression(5)(d3t − d3w)/fw = 0.215
Conditional expression(6)f4/ft = 0.597
Conditional expression(7)fR/fw = 6.326
Conditional expression(8)f3/ft = 1.031
Conditional expression(9)(d3t − d3w)/fw = 0.215
Conditional expression(10)fR/fw = 6.326
Conditional expression(11)(−f2)/fw = 1.078
Conditional expression(12)f4/ft = 0.597
Conditional expression(13)(d1t − d1w)/ft = 0.424
Conditional expression(14)(d2w − d2t)/ft = 0.344
Conditional expression(15)f3/ft = 1.031
Conditional expression(16)f4/ft = 0.597
Conditional expression(17)fR/fw = 6.326
Conditional expression(18)(−f2)/fw = 1.078
Conditional expression(19)(d3t − d3w)/fw = 0.215
Conditional expression(20)f3/ft = 1.031
Conditional expression(21)f4/fw = 2.812
Conditional expression(22)f3/f4 = 1.726
Conditional expression(23)(−f2)/ft = 0.229
Conditional expression(24)f1/ft = 1.180
Conditional expression(25)fR/fw = 6.326

Based on Table 1, it is found that in the zoom optical system ZL1 according to the present example, the conditional expressions (1) to (25) are satisfied.

Figure 2B:
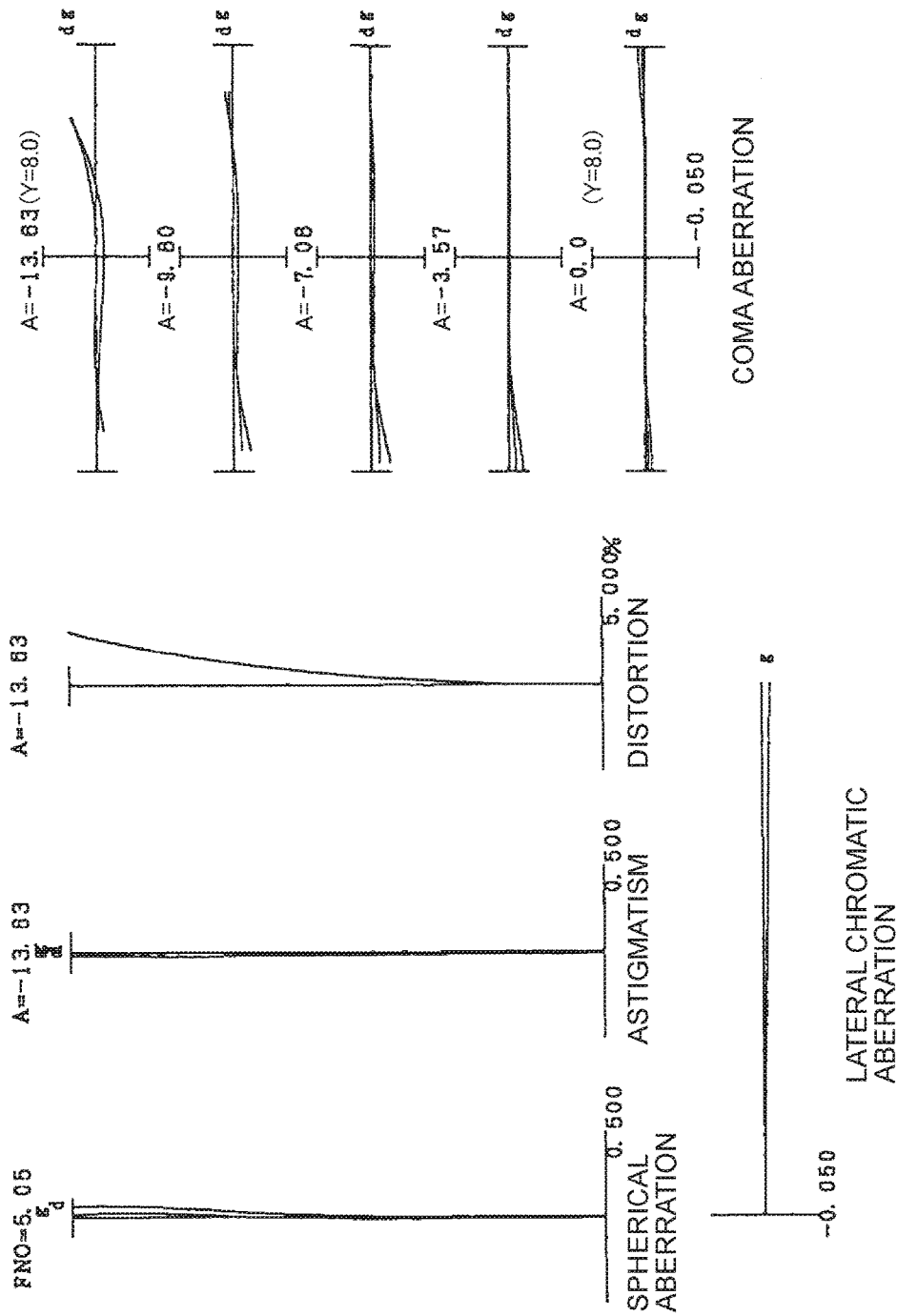
Figure 2C:
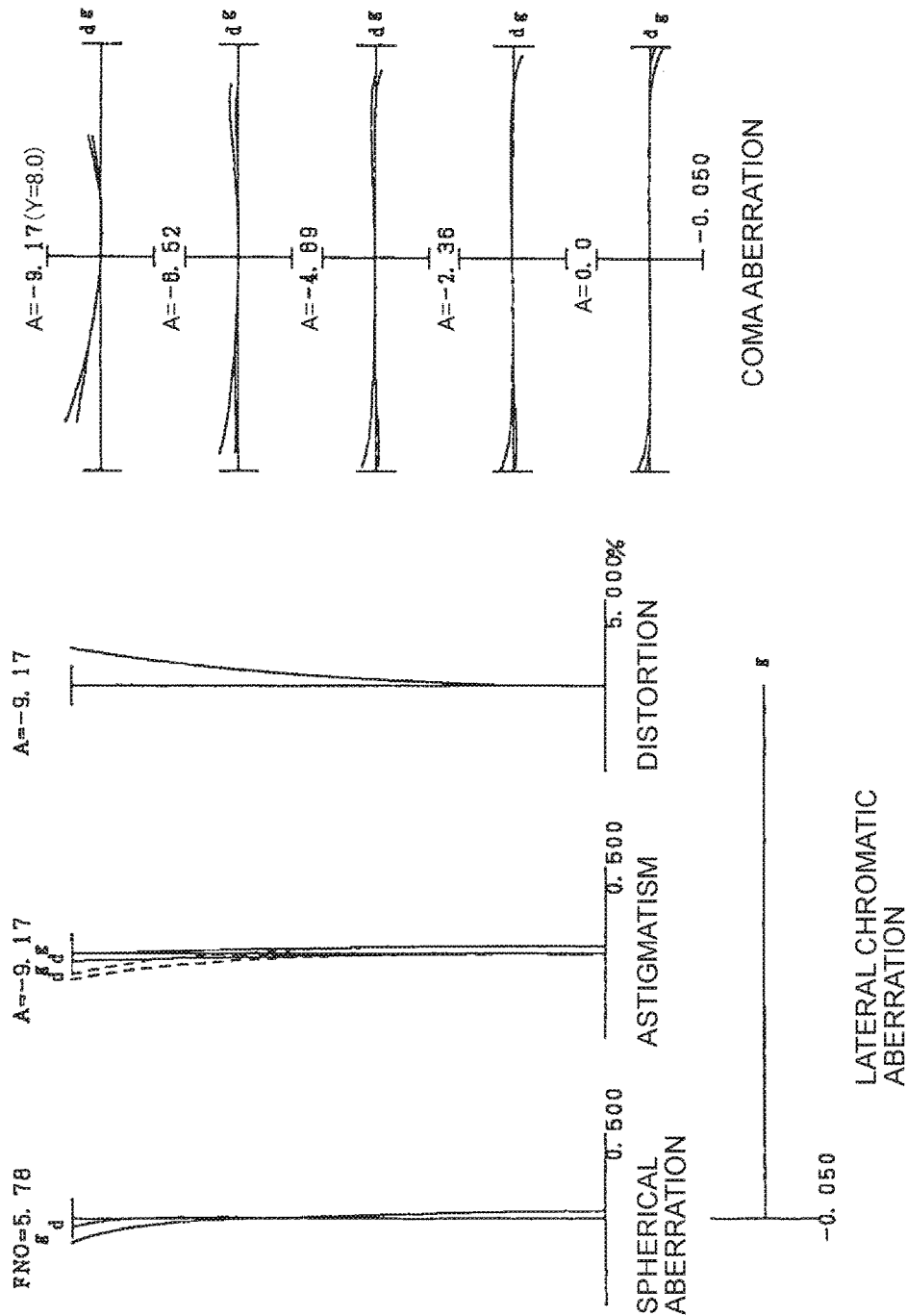
Figure 4A:
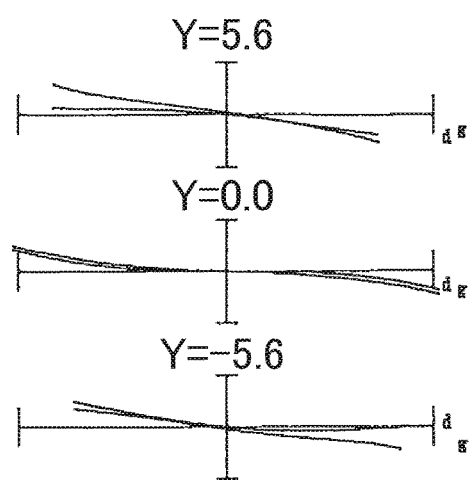
FIGS. 4A, 4B, and 4C respectively illustrate graphs showing meridional lateral aberration when correcting image blur upon focusing on an infinity object in a wide-angle end state, intermediate focal length state, and telephoto end state of the zoom optical system according to Example 1 (shift amount of a vibration-free lens group=0.1 mm).
Figure 4B:
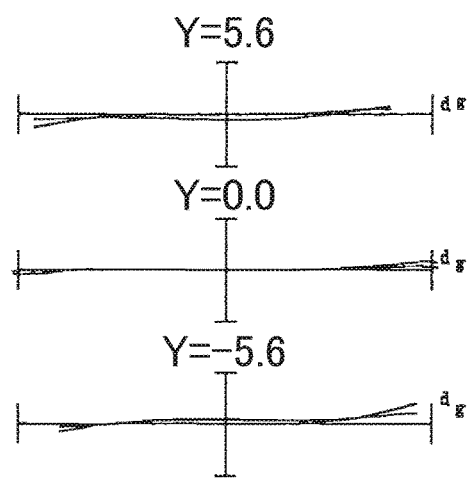
Figure 4C:
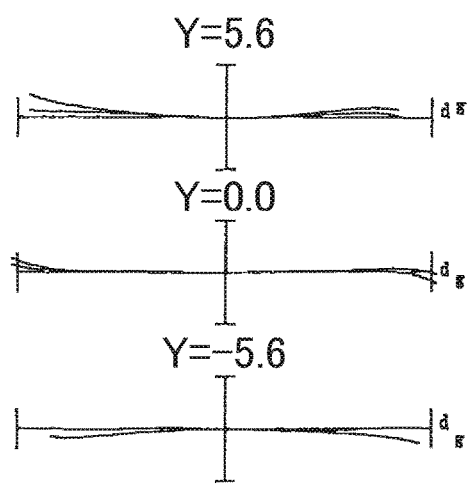

FIGS. 2A, 2B, and 2C illustrate graphs showing various aberrations (spherical aberration, astigmatism, distortion, coma aberration, and lateral chromatic aberration) upon focusing on infinity regarding the zoom optical system ZL1 according to Example 1, where FIG. 2A depicts a wide-angle end state, FIG. 2B depicts an intermediate focal length state, and FIG. 2C depicts a telephoto end state. FIGS. 3A, 3B, and 3C illustrate graphs showing various aberrations (spherical aberration, astigmatism, distortion, coma aberration, and lateral chromatic aberration) upon focusing on a short-distance object (1.00 m of a distance between the object and image) regarding the zoom optical system ZL1 according to Example 1, where FIG. 3A depicts a wide-angle end state, FIG. 3B depicts an intermediate focal length state, and FIG. 3C depicts a telephoto end state. FIGS. 4A, 4B, and 4C illustrate graphs showing meridional lateral aberration when correcting image blur upon focusing on infinity regarding the zoom optical system ZL1 according to Example 1 (shift amount of a vibration-free lens group=0.1 mm), where FIG. 4A depicts a wide-angle end state, FIG. 4B depicts an intermediate focal length state, and FIG. 4C depicts a telephoto end state. In the present example, optical performance when controlling vibration, as illustrated in FIGS. 4A, 4B and 4C, is illustrated in a meridional lateral aberration diagram corresponding to a screen center and an image height ±5.6 mm of an image height.

In each graph showing aberrations, FNO means a F number, and NA means the number of an aperture of light emitted from the lens arranged closest to the image, A means an angle of incidence of light, that is, a half angle of view (units: degree), H0 means the height of the object (units: mm), and Y means an image height. d means d-line, and g means g-line. What is not described with d or g means an aberration according to d-line. In graphs showing spherical aberration, a solid line indicates spherical aberration. In graphs showing astigmatism, a solid line indicates a sagittal image surface and a dashed-line shows a meridional image surface. In graphs showing coma aberration, a solid line indicates coma aberration in a meridional direction. Note that also in graphs showing aberrations of each example described below, the same signs are used as those in the present example.

As obvious based on each graph showing aberrations illustrated in FIGS. 2A, 2B and 2C, FIGS. 3A, 3B and 3C, and FIGS. 4A, 4B and 4C, in the zoom optical system ZL1 according to Example 1, various aberrations are appropriately corrected covering a range of from a wide-angle end state to a telephoto end state, therefore high optical performance can be obtained. It is found that high image-forming performance can be obtained upon correcting image blur.

Example 2

Figure 5:
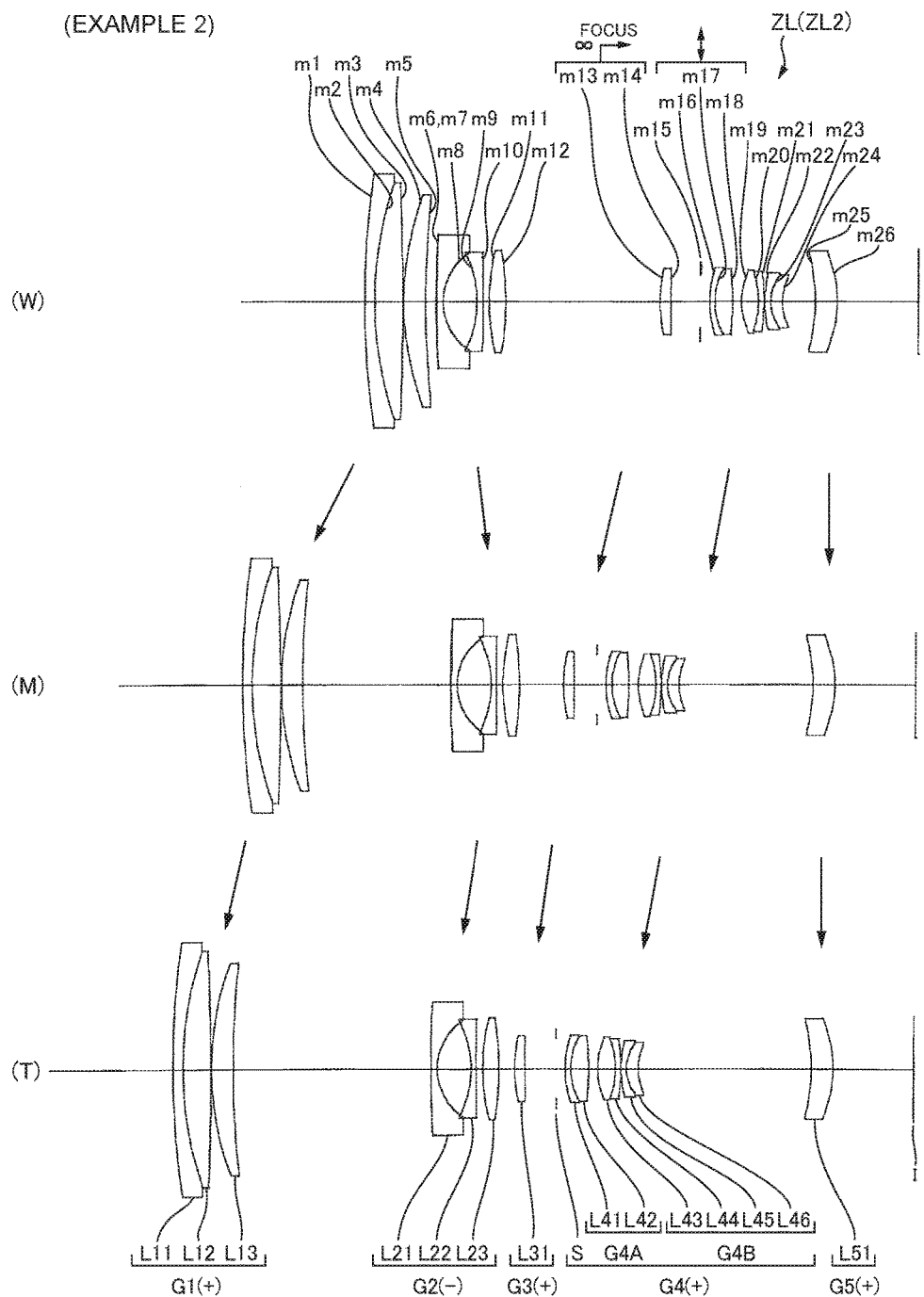
FIG. 5 illustrates sectional views in a wide-angle end state (W), intermediate focal length state (M), and telephoto end state (T) of the zoom optical system according to Example 2.

Example 2 is described using FIG. 5, FIGS. 6A, 6B and 6C, FIGS. 7A, 7B and 7C, FIGS. 8A, 8B and 8C and Table 2. The zoom optical system ZL (ZL2) according to Example 2 comprises, as illustrated in FIG. 5, in order from an object along an optical axis, a first lens group G1 having positive refractive power, a second lens group G2 having negative refractive power, a third lens group G3 having positive refractive power, a fourth lens group G4 having positive refractive power, and a fifth lens group G5 having positive refractive power. An aperture stop S is provided between the third lens group G3 and the fourth lens group G4, and the aperture stop S configures the fourth lens group G4. The fifth lens group G5 is the lens group arranged closest to the image.

The first lens group G1 is composed of, in order from the object along the optical axis, a cemented lens composed of a negative meniscus lens L11 having a convex surface facing the object and a biconvex positive lens L12, and a positive meniscus lens L13 having a convex surface facing the object.

The second lens group G2 is composed of, in order from the object along the optical axis, a negative meniscus lens L21 having a convex surface facing the object, a negative meniscus lens L22 having a concave surface facing the object, and a biconvex positive lens L23. Note that the negative meniscus lens L21 is a complexed aspherical lens made from resin and glass, in which a lens surface on the object side is aspherical-shaped.

The third lens group G3 is composed of a positive meniscus lens L31 having a convex surface facing the object. Note that the positive meniscus lens L31 is a glass-molded aspherical lens in which a lens surface on the object side is aspherical-shaped.

The fourth lens group G4 is composed of, in order from the object along the optical axis, a fourth A sublens group G4A configured of a cemented lens composed of a negative meniscus lens L41 having a convex surface facing the object and a biconvex positive lens L42, a cemented lens composed of a biconvex positive lens L43 and a negative meniscus lens L44 having a concave surface facing the object, and a fourth B sublens group G4B configured of a cemented lens composed of a negative meniscus lens L45 having a convex surface facing the object and a positive meniscus lens L46 having a convex surface facing the object. Note that the negative meniscus lens L44 is a glass-molded aspherical lens, in which a lens surface on the image side is aspherical-shaped.

The fifth lens group G5 is composed of a positive meniscus lens L51 having a concave surface facing the object.

In the zoom optical system ZL2 according to the present embodiment, the first lens group G1 to the fourth lens group G4 move along the optical axis so that an air distance between the first lens group G1 and the second lens group G2, an air distance between the second lens group G2 and the third lens group G3, an air distance between the third lens group G3 and the fourth lens group G4, and an air distance between the fourth lens group G4 and the fifth lens group G5 respectively change upon zooming. The fifth lens group G5 is fixed to the image surface I.

Specifically speaking, the first lens group G1, the third lens group G3, and the fourth lens group G4 move to the object side upon zooming from a wide-angle end state to a telephoto end state. The second lens group G2 moves to the image side from a wide-angle end state to an intermediate focal length state, and moves to the object side from the intermediate focal length state to a telephoto end state. The aperture stop S moves to the object side together with the fourth lens group G4.

With this arrangement, upon zooming, the air distance between the first lens group G1 and the second lens group G2 increases, the air distance between the second lens group G2 and the third lens group G3 decreases, the air distance between the third lens group G3 and the fourth lens group G4 decreases from a wide-angle end state to an intermediate focal length state and increases from the intermediate focal length state to a telephoto end state, and the air distance between the fourth lens group G4 and the fifth lens group G5 increases. An air distance between the aperture stop S and the third lens group G3 decreases from a wide-angle end state to an intermediate focal length state, and increases from the intermediate focal length state to a telephoto end state.

Focusing is performed by moving the third lens group G3 along the optical axis. Specifically speaking, the third lens group G3 is moved to the image side along the optical axis upon focusing from an infinity object to a short-distance object.

When image blur is generated, a correction of image blur (vibration-control) on the image surface I is performed by moving the fourth A sublens group G4A as a vibration-controlled lens group in a manner of having a component in a direction perpendicular to the optical axis.

Table 2 illustrates values of each various data in Example 2. Surface numbers 1 to 26 in Table 2 correspond to each optical surface of m1 to m26 illustrated in FIG. 5.

TABLE 2

[Lens Data]

| Surface number | R | D | nd | vd |
|---|---|---|---|---|
| Object surface | ∞ | | | |
| 1 | 144.9435 | 1.6000 | 1.846660 | 23.80 |
| 2 | 57.9139 | 4.6578 | 1.696800 | 55.52 |
| 3 | −430.8049 | 0.1000 | | |
| 4 | 49.1887 | 3.5211 | 1.696800 | 55.52 |
| 5 | 158.0589 | D5(Variable) | | |
| *6 | 504.4641 | 0.0800 | 1.560930 | 36.64 |
| 7 | 234.1101 | 1.0000 | 1.834810 | 42.73 |
| 8 | 9.4881 | 5.5305 | | |
| 9 | −17.0787 | 0.9276 | 1.741000 | 52.76 |
| 10 | −1027.3916 | 1.0145 | | |
| 11 | 34.5727 | 2.6835 | 1.808090 | 22.74 |
| 12 | −53.1261 | D12(Variable) | | |
| *13 | 24.3966 | 1.6530 | 1.588870 | 61.13 |
| 14 | 296.0192 | D14(Variable) | | |
| 15 | ∞ | 1.5000 | (Stop) | |
| 16 | 17.3960 | 0.9000 | 1.883000 | 40.66 |
| 17 | 11.0000 | 2.8505 | 1.497820 | 82.57 |
| 18 | −48.0307 | 1.5000 | | |
| 19 | 12.4669 | 2.8380 | 1.487490 | 70.32 |
| 20 | −14.1721 | 0.9000 | 1.851080 | 40.12 |
| *21 | −35.5823 | 0.1000 | | |
| 22 | 19.0885 | 0.9000 | 1.883000 | 40.66 |
| 23 | 7.1245 | 1.8774 | 1.620040 | 36.40 |
| 24 | 8.9496 | D24(Variable) | | |
| 25 | −30.0000 | 3.6500 | 1.696800 | 55.52 |
| 26 | −19.7882 | BF | | |
| Image surface | ∞ | | | |

[Aspherical surface data]

The 6th surface

κ = −1.9998
A4 = 2.80199E−05
A6 = −2.77907E−07
A8 = 2.24720E−09
A10 = −8.56636E−12
A12 = 0.00000E+00

The 13th surface

κ = 1.7623
A4 = −2.39838E−05
A6 = −7.89804E−08
A8 = 2.79454E−09
A10 = 0.00000E+00
A12 = 0.00000E+00

The 21th surface

κ = −0.1893
A4 = −9.56775E−06
A6 = −6.24519E−07
A8 = 1.01416E−08

TABLE 2-continued

A10 = 0.00000E+00
A12 = 0.00000E+00

[Various data]
Zoom ratio 6.59

| | W | M | T |
|---|---|---|---|
| f | 10.29976 | 39.99987 | 67.89953 |
| FNO | 3.64 | 5.06 | 5.81 |
| ω | 39.73502 | 10.92213 | 6.56887 |
| Y | 8.00 | 8.00 | 8.00 |
| φ | 8.60 | 9.90 | 9.90 |
| TL | 89.92002 | 109.96784 | 121.58326 |
| BF | 13.25085 | 13.25085 | 13.25085 |

[Variable distance data]

| | W | M | T |
|---|---|---|---|
| f | 10.29976 | 39.99987 | 67.89953 |
| D5 | 1.80000 | 24.18110 | 32.41506 |
| D12 | 25.02141 | 7.23672 | 2.58202 |
| D14 | 4.80996 | 3.66893 | 5.14775 |
| D24 | 5.25391 | 21.84636 | 28.40370 |

[Amount of movement of focusing group upon focusing]

| | W | M | T |
|---|---|---|---|
| Distance between object and image | 1.00 m | 1.00 m | 1.00 m |
| Amount of movement | 0.3072 | 0.9550 | 1.8445 |

[Lens group data]

| Group number | Group first surface | Group focal length |
|---|---|---|
| G1 | 1 | 68.26199 |
| G2 | 6 | −12.46728 |
| G3 | 13 | 45.04911 |
| G4 | 15 | 40.55521 |
| G5 | 25 | 72.75019 |

[Values corresponding to conditional expressions]

Conditional expression(1)f3/ft = 0.633
Conditional expression(2)(−f2)/fw = 1.210
Conditional expression(3)f3/f4 = 1.111
Conditional expression(4)ν3 = 61.13
Conditional expression(5)(d3t − d3w)/fw = 0.033
Conditional expression(6)f4/ft = 0.597
Conditional expression(7)fR/fw = 7.063
Conditional expression(8)f3/ft = 0.663
Conditional expression(9)(d3t − d3w)/fw = 0.033
Conditional expression(10)fR/fw = 7.063
Conditional expression(11)(−f2)/fw = 1.210
Conditional expression(12)f4/ft = 0.597
Conditional expression(13)(d1t − d1w)/ft = 0.451
Conditional expression(14)(d2w − d2t)/ft = 0.330
Conditional expression(15)f3/ft = 0.663
Conditional expression(16)f4/ft = 0.597
Conditional expression(17)fR/fw = 7.063
Conditional expression(18)(−f2)/fw = 1.210
Conditional expression(19)(d3t − d3w)/fw = 0.033
Conditional expression(20)f3/ft = 0.663
Conditional expression(21)f4/fw = 3.937
Conditional expression(22)f3/f4 = 1.111
Conditional expression(23)(−f2)/ft = 0.184
Conditional expression(24)f1/ft = 1.005
Conditional expression(25)fR/fw = 7.063

Table 2 shows that in the zoom optical system ZL2 according to the present embodiment the conditional expressions (1) to (25) are satisfied.

Figure 7A:
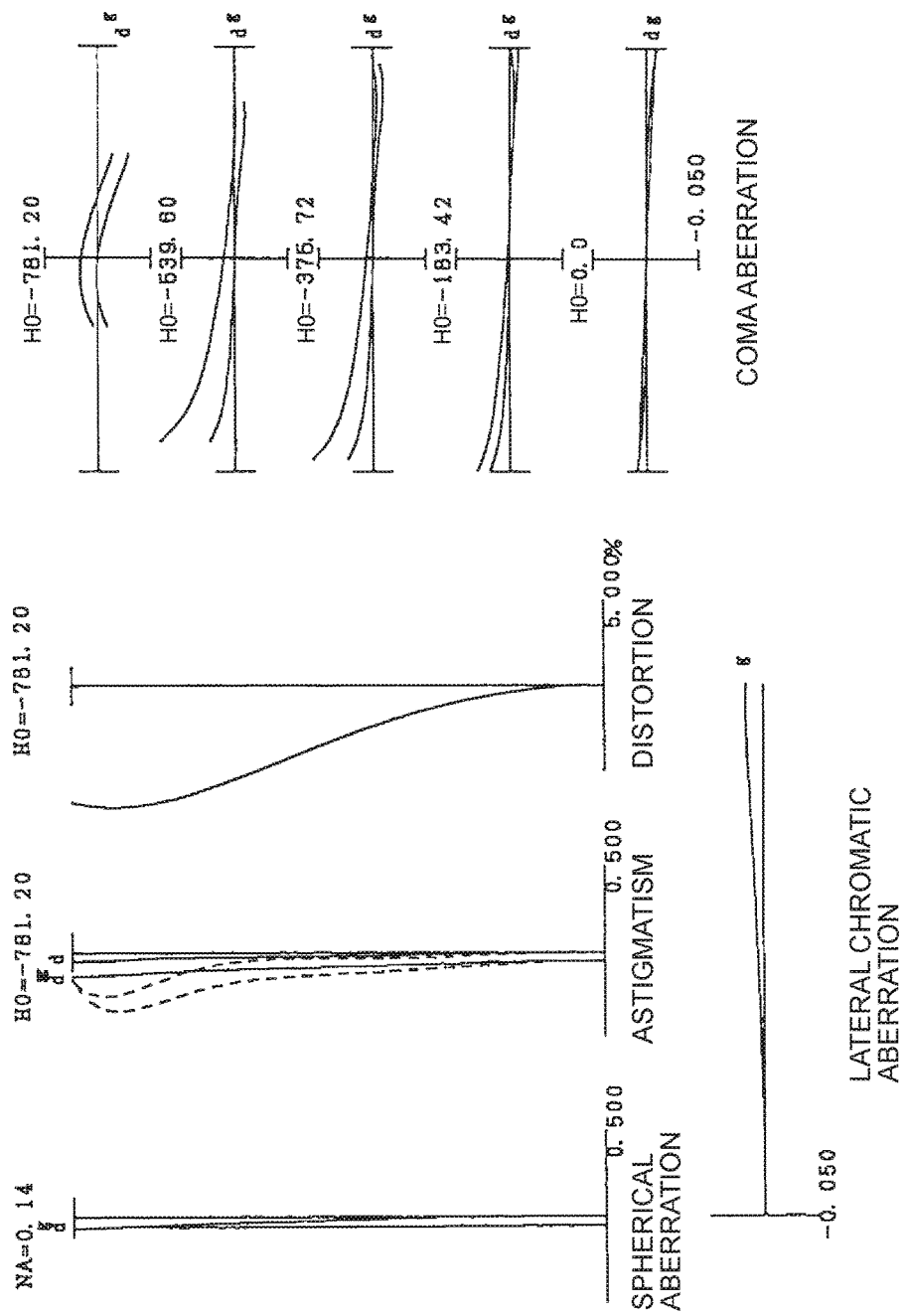
Figure 8A:
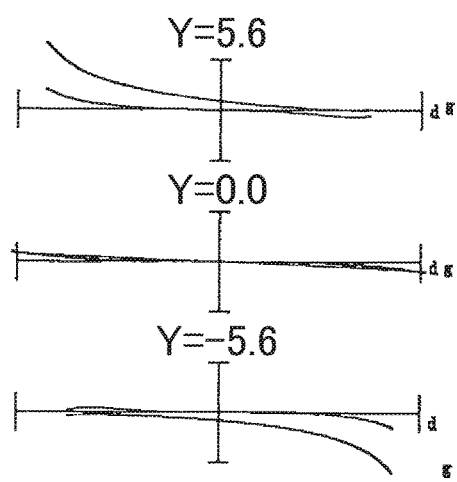
FIGS. 8A, 8B, and 8C respectively illustrate meridional lateral aberration when correcting image blur upon focusing on an infinity object in a wide-angle end state, intermediate focal length state, and telephoto end state of the zoom optical system according to Example 2 (shift amount of a vibration-free lens group=0.1 mm).
Figure 8B:
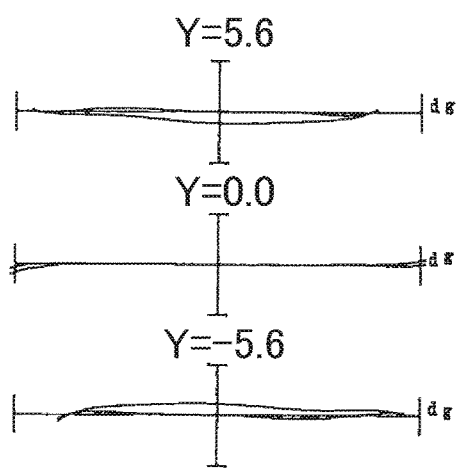
Figure 8C:
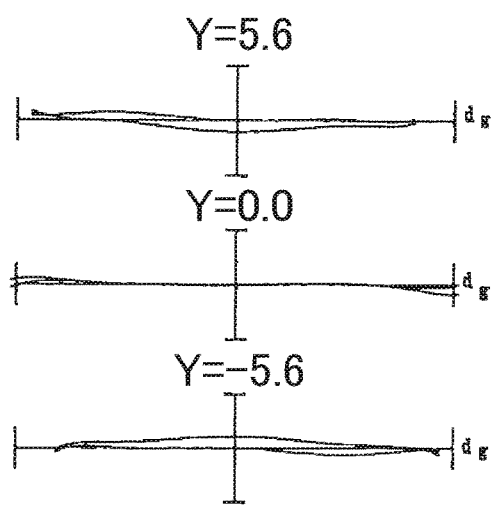

FIGS. 6A, 6B and 6C illustrate graphs showing various aberrations upon focusing on infinity regarding the zoom optical system ZL2 according to Example 2 (spherical aberration, astigmatism, distortion, coma aberration, and lateral chromatic aberration), and FIG. 6A depicts a wide-angle end state, FIG. 6B depicts an intermediate focal length state, and, FIG. 6C depicts a telephoto end state. FIGS. 7A, 7B and 7C illustrate graphs showing various aberrations (spherical aberration, astigmatism, distortion, coma aberration, and lateral chromatic aberration) upon focusing on a short distance object regarding the zoom optical system ZL2 according to Example 2 (1.00 m of distance between the object and image) where FIG. 7A depicts a wide-angle end state, FIG. 7B depicts an intermediate focal length state, and FIG. 7C depicts a telephoto end state. FIGS. 8A, 8B, and 8C illustrate graphs showing meridional lateral aberration when correcting image blur upon focusing on infinity regarding the zoom optical system ZL2 according to Example 2 (shift amount of a vibration-free lens group=0.1 mm), where FIG. 8A depicts a wide-angle end state, FIG. 8B depicts an intermediate focal length state, and FIG. 8C depicts a telephoto end state. In the present example optical performance when controlling vibration, as illustrated in FIGS. 8A, 8B and 8C, is illustrated in a meridional lateral aberration diagram corresponding to a screen center and ±5.6 mm of an image height.

As obvious based on each graph showing aberrations illustrated in FIGS. 6A, 6B and 6C, FIGS. 7A, 7B and 7C, and FIGS. 8A, 8B and 8C, in the zoom optical system ZL2 according to Example 2, various aberrations are appropriately corrected covering a range from a wide-angle end state to a telephoto end state, and a range from an infinity focusing state to a short-distance focusing state, therefore high optical performance can be obtained. It is found that high image-forming performance can be obtained when correcting image blur.

Example 3

Example 3 is described using FIG. 9, FIGS. 10A, 10B and 10C, FIGS. 11A, 11B and 11C, FIGS. 12A, 12B and 12C and Table 3. The zoom optical system ZL (ZL3) according to Example 3 comprises, as illustrated in FIG. 9, in order from an object along an optical axis, a first lens group G1 having positive refractive power, a second lens group G2 having negative refractive power, a third lens group G3 having positive refractive power, a fourth lens group G4 having positive refractive power, a fifth lens group G5 having negative refractive power, and a sixth lens group G6 having positive refractive power. An aperture stop S is provided between the third lens group G3 and the fourth lens group G4, and the aperture stop S configures the fourth lens group G4. The sixth lens group G6 is the lens group arranged closest to the image.

The first lens group G1 is composed of, in order from the optical axis, a cemented lens composed of a negative meniscus lens L11 having a convex surface facing the object and a biconvex positive lens L12, and a positive meniscus lens L13 having a convex surface facing the object.

The second lens group G2 is composed of, in order from the object along optical axis, a negative meniscus lens L21 having a convex surface facing the object, a biconcave negative lens L22, and a positive meniscus lens L23 having a convex surface facing the object. Note that the negative lens L22 is a glass-molded aspherical lens in which a lens surface on the object side is aspherical-shaped.

The third lens group G3 is composed of a biconvex positive lens L31. Note that the positive lens L31 is a glass-molded aspherical lens in which the lens surface on the object side is aspherical-shaped.

The fourth lens group G4 is composed of, in order from the object along the optical axis, a fourth A sublens group G4A configured of a cemented lens composed of a negative meniscus lens L41 having a convex surface facing the object and a biconvex positive lens L42, and a fourth B sublens group G4B configured of a cemented lens composed of a biconvex positive lens L43 and a negative meniscus lens L44 having a concave surface facing the object. Note that the negative meniscus lens L44 is a glass-molded aspherical lens in which the lens surface arranged on the image side is aspherical-shaped.

The fifth lens group G5 is composed of a negative meniscus lens L51 having a convex surface facing the object.

The sixth lens group G6 is composed of a positive meniscus lens L61 having a concave surface facing the object.

In the zoom optical system ZL3 according to the present example, the first lens group G1 to the fifth lens group G5 move along the optical axis upon zooming so that an air distance between the first lens group G1 and the second lens group G2, an air distance between the second lens group G2 and the third lens group G3, an air distance between the third lens group G3 and the fourth lens group G4, an air distance between the fourth lens group G4 and the fifth lens group G5, and an air distance between the fifth lens group G5 and the sixth lens group G6 respectively change. The sixth lens group G6 is fixed to the image surface I.

Specifically speaking, the first lens group G1, the third lens group G3, the fourth lens group G4, and the fifth lens group G5 move to the object side upon zooming from a wide-angle end state to a telephoto end state. The second lens group G2 moves to the image side from a wide-angle end state to an intermediate focal length state, and moves to the object side from the intermediate focal length state to a telephoto end state. The aperture stop S moves to the object side together with the fourth lens group G4.

With this arrangement, upon zooming, the air distance between the first lens group G1 and the second lens group G2 increases, the air distance between the second lens group G2 and the third lens group G3 decreases, and the air distance between the third lens group G3 and the fourth lens group G4 decreases from a wide-angle end state to an intermediate focal length state, and increases from the intermediate focal length state to a telephoto end state, the air distance between the fourth lens group G4 and the fifth lens group G5 increases, and the air distance between the fifth lens group G5 and the sixth lens group G6 increases. The air distance between the aperture stop S and the third lens group G3 decreases from a wide-angle end state to an intermediate focal length state, and increases from the intermediate focal length state to a telephoto end state.

Focusing is performed by moving the third lens group G3 along the optical axis. Specifically speaking, this is performed by moving the third lens group G3 to the image side along the optical axis upon focusing from an infinity object to a short-distance object.

When image blur is generated, a correction of image blur (vibration-controlled) on the image surface I is performed by moving the fourth A sub lens group G4A as a vibration-free lens group in a manner of having a component in the direction perpendicular to the optical axis.

Table 3 shows values of each data in Example 3. Surface numbers 1 to 24 in Table 3 correspond to each optical surface of m1 to m24 illustrated in FIG. 9.

TABLE 3

[Lens Data]

| Surface number | R | D | nd | νd |
|---|---|---|---|---|
| Object surface | ∞ | | | |
| 1 | 270.7698 | 1.6000 | 1.84666 | 23.80 |
| 2 | 63.2289 | 4.7857 | 1.58913 | 61.22 |
| 3 | −180.7756 | 0.1000 | | |
| 4 | 38.2772 | 3.3872 | 1.69680 | 55.52 |
| 5 | 162.5542 | D5(Variable) | | |
| 6 | 222.4687 | 0.9000 | 1.72916 | 54.61 |
| 7 | 8.6817 | 5.3065 | | |
| *8 | −19.5238 | 0.9000 | 1.69680 | 55.52 |
| 9 | 33.5766 | 0.1038 | | |
| 10 | 19.7682 | 2.5354 | 1.84666 | 23.80 |
| 11 | 434.3570 | D11(Variable) | | |
| *12 | 26.1871 | 1.7281 | 1.58887 | 61.13 |
| 13 | −76.6701 | D13(Variable) | | |
| 14 | ∞ | 1.7051 | (Stop) | |
| 15 | 16.6153 | 0.9002 | 1.83400 | 37.18 |
| 16 | 9.9827 | 2.6157 | 1.49782 | 82.57 |
| 17 | −36.7432 | 1.5000 | | |
| 18 | 16.2913 | 2.2592 | 1.51823 | 58.82 |
| 19 | −17.2434 | 0.9000 | 1.85108 | 40.12 |
| *20 | −31.3248 | D20(Variable) | | |
| 21 | 28.0868 | 0.9000 | 1.90265 | 35.72 |
| 22 | 9.2493 | D22(Variable) | | |
| 23 | −37.3758 | 2.2000 | 1.61772 | 49.81 |
| 24 | −18.1325 | BF | | |
| Image surface | ∞ | | | |

[Aspherical surface data]

The 8th surface

κ = 1.0000
A4 = 2.09316E−05
A6 = −8.10797E−07
A8 = 2.75349E−08
A10 = −4.70299E−10
A12 = 2.62880E−12

The 12th surface

κ = 1.0000
A4 = −4.37334E−05
A6 = 3.04727E−07
A8 = −6.38106E−09
A10 = 0.00000E+00
A12 = 0.00000E+00

The 20th surface

κ = 1.0000
A4 = 2.28740E−05
A6 = −3.19205E−07
A8 = −1.46715E−10
A10 = 0.00000E+00
A12 = 0.00000E+00

[Various data]
Zoom ratio 4.71

| | W | M | T |
|---|---|---|---|
| f | 10.30000 | 32.00000 | 48.51858 |
| FNO | 3.53 | 5.00 | 5.72 |
| ω | 39.75617 | 13.57625 | 9.11928 |
| Y | 8.00 | 8.00 | 8.00 |
| φ | 8.20 | 8.80 | 8.80 |
| TL | 80.36557 | 92.30690 | 103.19342 |
| BF | 13.30097 | 13.30097 | 13.30097 |

[Variable distance data]

| | W | M | T |
|---|---|---|---|
| f | 10.30000 | 32.00000 | 48.51858 |
| D5 | 1.80638 | 15.63570 | 22.37678 |
| D11 | 18.74841 | 4.51318 | 2.11693 |
| D13 | 5.83635 | 4.73970 | 5.51292 |
| D20 | 1.50000 | 3.72584 | 3.97118 |
| D22 | 4.84649 | 16.06454 | 21.58766 |

[Amount of movement of focusing group upon focusing]

| | W | M | T |
|---|---|---|---|
| Distance between object and image | 1.00 m | 1.00 m | 1.00 m |
| Amount of movement | 0.1896 | 0.4064 | 0.6618 |

[Lens group data]

| Group number | Group first surface | Group focal length |
|---|---|---|
| G1 | 1 | 60.91787 |
| G2 | 6 | −9.90833 |
| G3 | 12 | 33.35587 |
| G4 | 14 | 15.48045 |
| G5 | 21 | −15.63253 |
| G6 | 23 | 54.62879 |

[Values corresponding to conditional expressions]

Conditional expression(1)f3/ft = 0.687
Conditional expression(2)(−f2)/fw = 0.962
Conditional expression(3)f3/f4 = 2.155
Conditional expression(4)ν3 = 61.13
Conditional expression(5)(d3t − d3w)/fw = 0.031
Conditional expression(6)f4/ft = 0.597
Conditional expression(7)fR/fw = 5.304
Conditional expression(8)f3/ft = 0.687
Conditional expression(9)(d3t − d3w)/fw = −0.031
Conditional expression(10)fR/fw = 5.304
Conditional expression(11)(−f2)/fw = 0.962
Conditional expression(13)(d1t − d1w)/ft = 0.424
Conditional expression(14)(d2w − d2t)/ft = 0.343
Conditional expression(15)f3/ft = 0.687
Conditional expression(17)fR/fw = 5.304
Conditional expression(18)(−f2)/fw = 0.962
Conditional expression(19)(d3t − d3w)/fw = −0.031
Conditional expression(20)f3/ft = 0.687
Conditional expression(21)f4/fw = 1.503
Conditional expression(22)f3/f4 = 2.155
Conditional expression(23)(−f2)/ft = 0.204
Conditional expression(24)f1/ft = 1.256
Conditional expression(25)fR/fw = 5.304

Base on Table 3, it is found that in the zoom optical system ZL3 according to the present embodiment, the conditional expressions (1) to (11), (13) to (15), and (17) to (25) are satisfied.

Figure 10A:
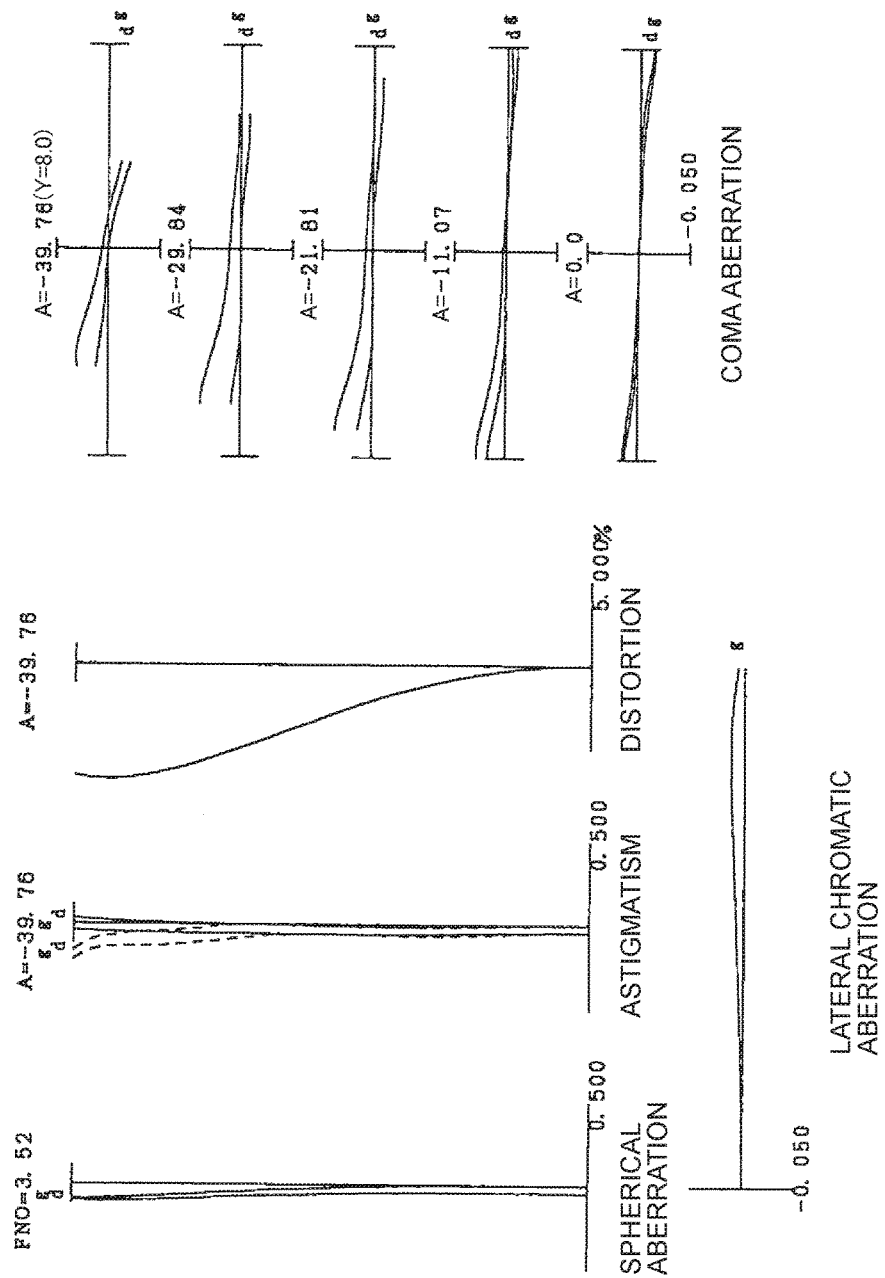
Figure 11A:
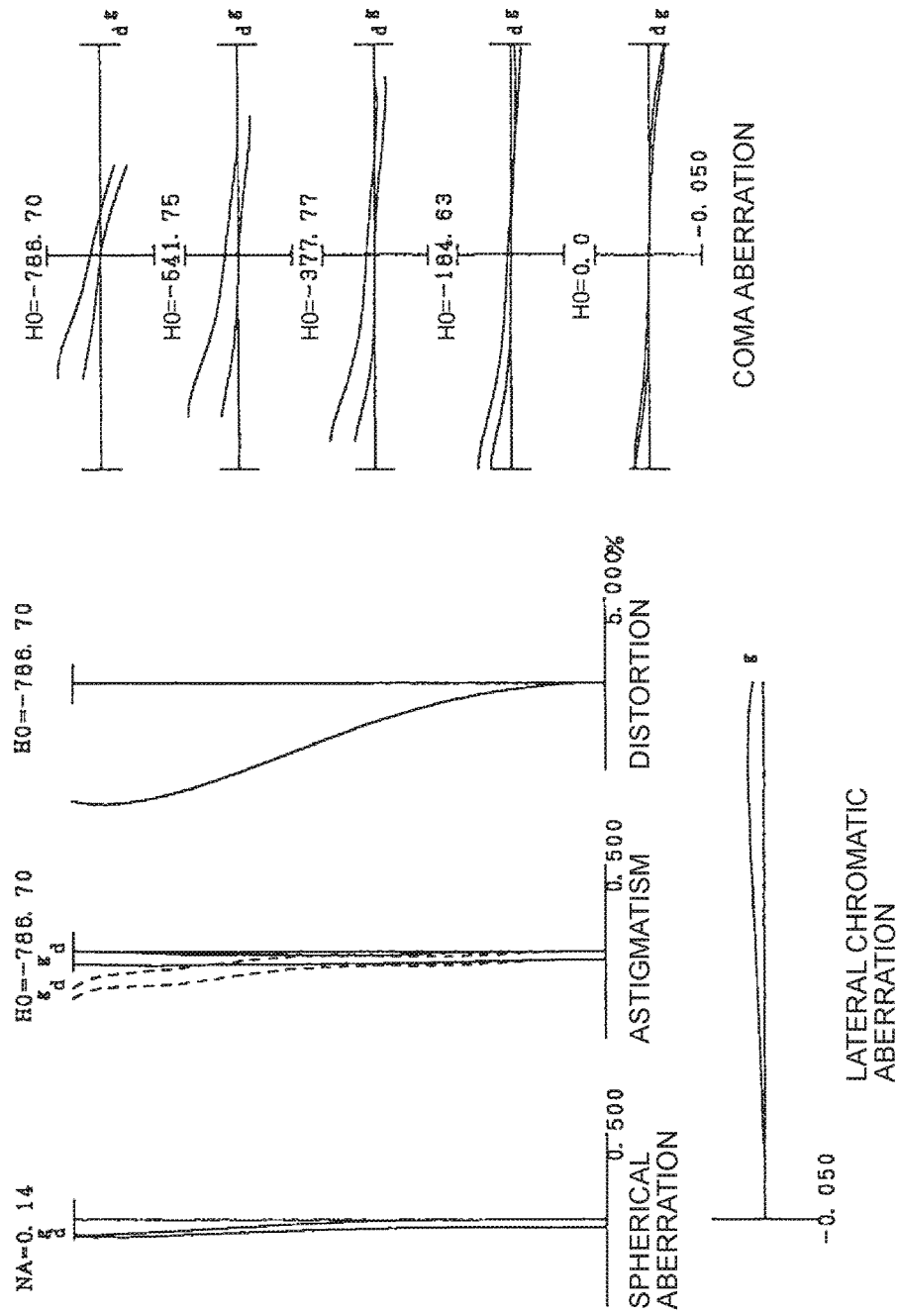
Figure 12A:
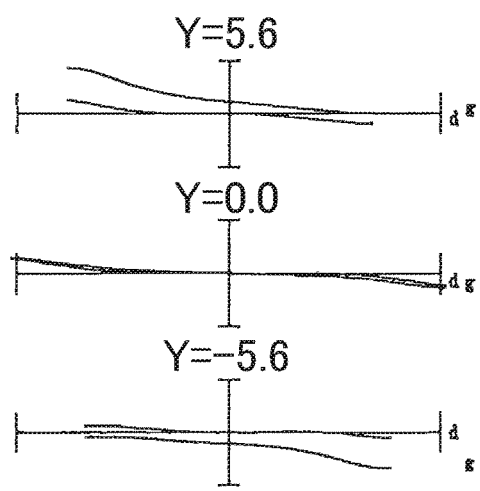
FIGS. 12A, 12B, and 12C respectively illustrate graphs showing meridional lateral aberration when correcting image blur upon focusing on an infinity object focusing in a wide-angle end state, intermediate focal length state, and telephoto end state (shift amount of a vibration-free lens group=0.1 mm) of the zoom optical system according to Example 3.
Figure 12B:
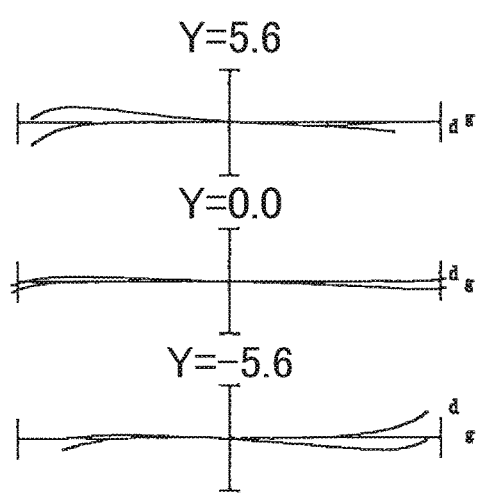
Figure 12C:
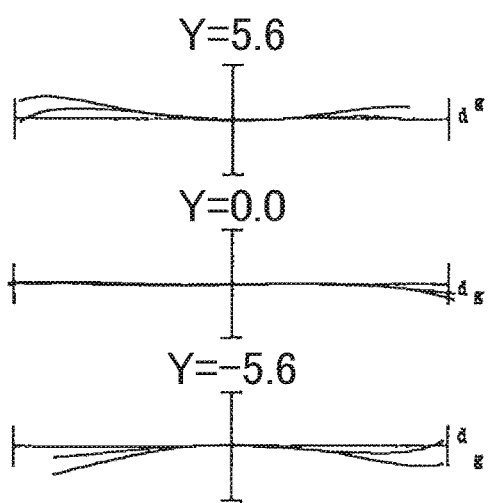

FIGS. 10A, 10B and 10C illustrate graphs showing various aberrations (spherical aberration, astigmatism, distortion, coma aberration, and lateral chromatic aberration) upon focusing on infinity regarding the zoom optical system ZL3 according to Example 3, where FIG. 10A depicts a wide-angle end state, FIG. 10B depicts an intermediate focal length state, and FIG. 10C depicts a telephoto end state. FIGS. 11A, 11B and 11C illustrate graphs showing various aberrations (spherical aberration, astigmatism, distortion, coma aberration, and lateral chromatic aberration) upon focusing on a short-distance object regarding the zoom optical system ZL3 according to Example 3 (1.00 m of distance between the object and image), where FIG. 11A depicts a wide-angle end state, FIG. 11B depicts an intermediate focal length state, and FIG. 11C depicts a telephoto end state. FIGS. 12A, 12B, and 12C illustrate graphs showing meridional lateral aberration when correcting image blur upon focusing on infinity regarding the zoom optical system ZL3 according to Example 3 (shift amount of the vibration-free lens group=0.1 mm), where FIG. 12A depicts a wide-angle end state, FIG. 12B depicts an intermediate focal length state, and FIG. 12C depicts a telephoto end state. In the present example, optical performance when controlling vibration, as illustrated in FIGS. 12A, 12 B and 12C, is illustrated in a meridional lateral aberration diagram corresponding to a screen center and an image height ±5.6 mm.

As found based on each graph showing aberrations illustrated in FIGS. 10A, 10B and 10C, FIGS. 11A, 11B and 11C, and FIGS. 12A, 12B and 12C, in the zoom optical system ZL3 according to Example 3, various aberrations are appropriately corrected covering a range of from a wide-angle end state to a telephoto end state, and a range from an infinity focusing state to a short-distance object, therefore high optical performance can be obtained. It is found that high image-forming performance can be obtained upon correcting image blur.

Example 4

Figure 13:
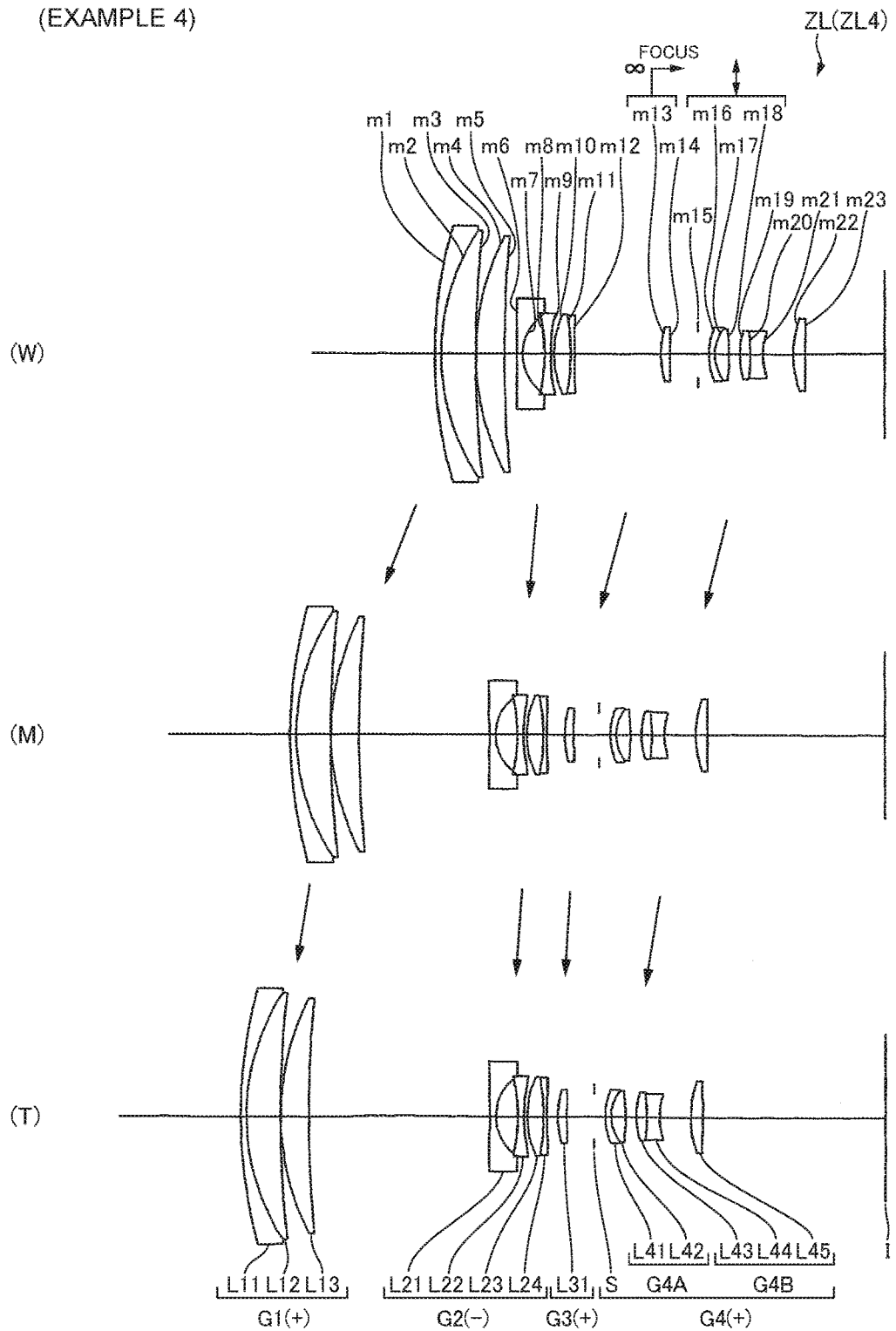
FIG. 13 illustrates sectional views in a wide-angle end state (W), intermediate focal length state (M), and telephoto end state (T) of the zoom optical system according to Example 4.

Example 4 is described using FIG. 13, FIGS. 14A, 14B and 14C, FIGS. 15A, 15B and 15C, FIGS. 16A, 16B and 16C and Table 4. The zoom optical system ZL (ZL4) according to Example 4 comprises, as illustrated in FIG. 13, in order from an object along an optical axis, a first lens group G1 having positive refractive power, a second lens group G2 having negative refractive power, a third lens group G3 having positive refractive power, and a fourth lens group G4 having positive refractive power. An aperture stop S is provided between the third lens group G3 and the fourth lens group G4, and the aperture stop S configures the fourth lens group G4. The fourth lens group G4 is the lens group arranged closest to the image.

The first lens group G1 is composed of, in order from the object along the optical axis, a cemented lens composed of a negative meniscus lens L11 having a convex surface facing the object and a positive meniscus lens L12 having a convex surface facing the object, and a positive meniscus lens L13 having a convex surface to the object side.

The second lens group G2 is composed of, in order from the object along the optical axis, a biconcave negative lens L21, a biconcave lens negative lens L22, and a cemented lens composed of a biconvex positive lens L23 and a biconcave negative lens L24. Note that the negative lens L22 is a glass-molded aspherical lens in which the lens surface on the object side is aspherical-shaped.

The third lens group G3 is composed of a positive meniscus lens L31 having a convex surface facing the object. Note that the positive meniscus lens L31 is a glass-molded aspherical lens in which the lens surface on the object side is aspherical-shaped.

The fourth lens group G4 is composed of, in order from the object side along the optical axis, a fourth A sublens group G4A configured of a cemented lens composed of a negative meniscus lens L41 having a convex surface facing the object and a biconvex positive lens L42, a cemented lens composed of a biconvex positive lens L43 and a biconcave negative lens L44, and a fourth B sublens group G4B configured of a biconvex positive lens L45. Note that the negative lens L44 is a glass-molded aspherical lens in which the lens surface on the image side is aspherical-shaped.

In zoom optical system ZL4 according to the present example, the first lens group G1 to the fourth lens group G4 move along the optical axis upon zooming so that an air distance between the first lens group G1 and the second lens group G2, an air distance between the second lens group G2 and the third lens group G3, and an air distance between the third lens group G3 and the fourth lens group G4 respectively change.

Specifically speaking, the first lens group G1 to the fourth lens group G4 move to the object side upon zooming from a wide-angle end state to a telephoto end state. The aperture stop S moves to the object side together with the fourth lens group G4.

With this arrangement, upon zooming, the air distance between the first lens group G1 and the second lens group G2 increases, the air distance between the second lens group G2 and the third lens group G3 decreases, and the air distance between the third lens group G3 and the fourth lens group G4 decreases from a wide-angle end state to an intermediate focal length state, and increases from the intermediate focal length state to a telephoto end state. An air distance between the aperture stop S and the third lens group G3 decreases from a wide-angle end state to an intermediate focal length state, and increases from the intermediate focal length state to a telephoto end state.

Focusing is performed by moving the third lens group G3 to the optical axis along the optical axis. Specifically speaking, this is performed by moving the third lens group G3 to the image side along the optical axis upon focusing from an infinity object to a short-distance object.

When image blur is generated, a correction of image blur (vibration-controlled) on the image surface I is performed by moving the fourth A sublens group G4A as a vibration-free lens group in a manner of having a component in a direction perpendicular to the optical axis.

Table 4 below shows values of each data in Example 4. Surface numbers 1 to 23 in Table 4 correspond to each optical surface of m1 to m23 illustrated in FIG. 13.

TABLE 4

[Lens Data]

| Surface number | R | D | nd | vd |
|---|---|---|---|---|
| Object surface | ∞ | | | |
| 1 | 77.5097 | 1.0000 | 1.75520 | 27.57 |
| 2 | 36.9718 | 5.6271 | 1.58913 | 61.22 |
| 3 | 167.7984 | 0.1000 | | |
| 4 | 42.4933 | 4.6381 | 1.69680 | 55.52 |
| 5 | 206.8356 | D5(Variable) | | |
| 6 | −873.2108 | 1.0000 | 1.77250 | 49.62 |
| 7 | 7.8543 | 3.6373 | | |
| *8 | −26.1695 | 1.0000 | 1.69680 | 55.52 |
| 9 | 27.7405 | 0.5875 | | |
| 10 | 15.7767 | 2.7220 | 1.75520 | 27.57 |
| 11 | −33.7553 | 0.6000 | 1.79500 | 45.31 |
| 12 | 131.6242 | D12(Variable) | | |
| *13 | 16.5456 | 1.4427 | 1.58887 | 61.13 |
| 14 | 214.1576 | D14(Variable) | | |
| 15 | ∞ | 1.8000 | (Stop) | |
| 16 | 10.9743 | 1.0000 | 1.80440 | 39.61 |
| 17 | 6.8392 | 2.4312 | 1.49782 | 82.57 |
| 18 | −31.7167 | 1.8000 | | |
| 19 | 12.8502 | 1.7243 | 1.51680 | 63.88 |
| 20 | −34.8585 | 2.1512 | 1.85108 | 40.12 |
| *21 | 10.5402 | 5.0997 | | |
| 22 | 17.8216 | 2.0000 | 1.54814 | 45.51 |
| 23 | −380.5160 | BF | | |
| Image surface | ∞ | | | |

[Aspherical surface data]

The 8th surface

κ = 1.0000
A4 = 9.05226E−06
A6 = −3.64342E−07
A8 = 1.64340E−08
A10 = −2.40084E−10
A12 = 2.62880E−12

TABLE 4-continued

The 13th surface

κ = 1.0000
A4 = −3.32881E−05
A6 = −5.73267E−07
A8 = 1.34421E−08
A10 = 0.00000E+00
A12 = 0.00000E+00

The 21th surface

κ = 1.0000
A4 = 4.36460E−05
A6 = −1.73977E−06
A8 = −8.65204E−08
A10 = 4.98963E−09
A12 = 0.00000E+00

[Various data]
Zoom ratio 4.71

|  | W | M | T |
|---|---|---|---|
| f | 10.30000 | 35.00000 | 48.50000 |
| FNO | 3.65 | 5.61 | 5.72 |
| ω | 43.22847 | 12.93946 | 9.34123 |
| Y | 8.00 | 8.00 | 8.00 |
| φ | 7.50 | 7.50 | 7.50 |
| TL | 75.14938 | 98.84478 | 107.15583 |
| BF | 13.51683 | 29.96775 | 30.85637 |

[Variable distance data]

|  | W | M | T |
|---|---|---|---|
| f | 10.30000 | 35.00000 | 48.50000 |
| D5 | 2.09904 | 21.23006 | 29.53997 |
| D12 | 14.54727 | 2.99470 | 1.80000 |
| D14 | 4.62522 | 4.29125 | 4.59848 |

[Amount of movement of focusing group upon focusing]

|  | W | M | T |
|---|---|---|---|
| Distance between object and image | 1.00 m | 1.00 m | 1.00 m |
| Amount of movement | 0.1532 | 0.4169 | 0.7343 |

[Lens group data]

| Group number | Group first surface | Group focal length |
|---|---|---|
| G1 | 1 | 67.90812 |
| G2 | 6 | −9.06196 |
| G3 | 13 | 30.36765 |
| G4 | 15 | 27.85994 |

[Values corresponding to conditional expressions]

Conditional expression(20)f3/ft = 0.626
Conditional expression(21)f4/fw = 2.705
Conditional expression(22)f3/f4 = 1.090
Conditional expression(23)(−f2)/ft = 0.187
Conditional expression(24)f1/ft = 1.400

Based on Table 4, it is found that in the zoom optical system ZL4 according to the present embodiment the conditional expressions (20) to (24) are satisfied.

Figure 14B:
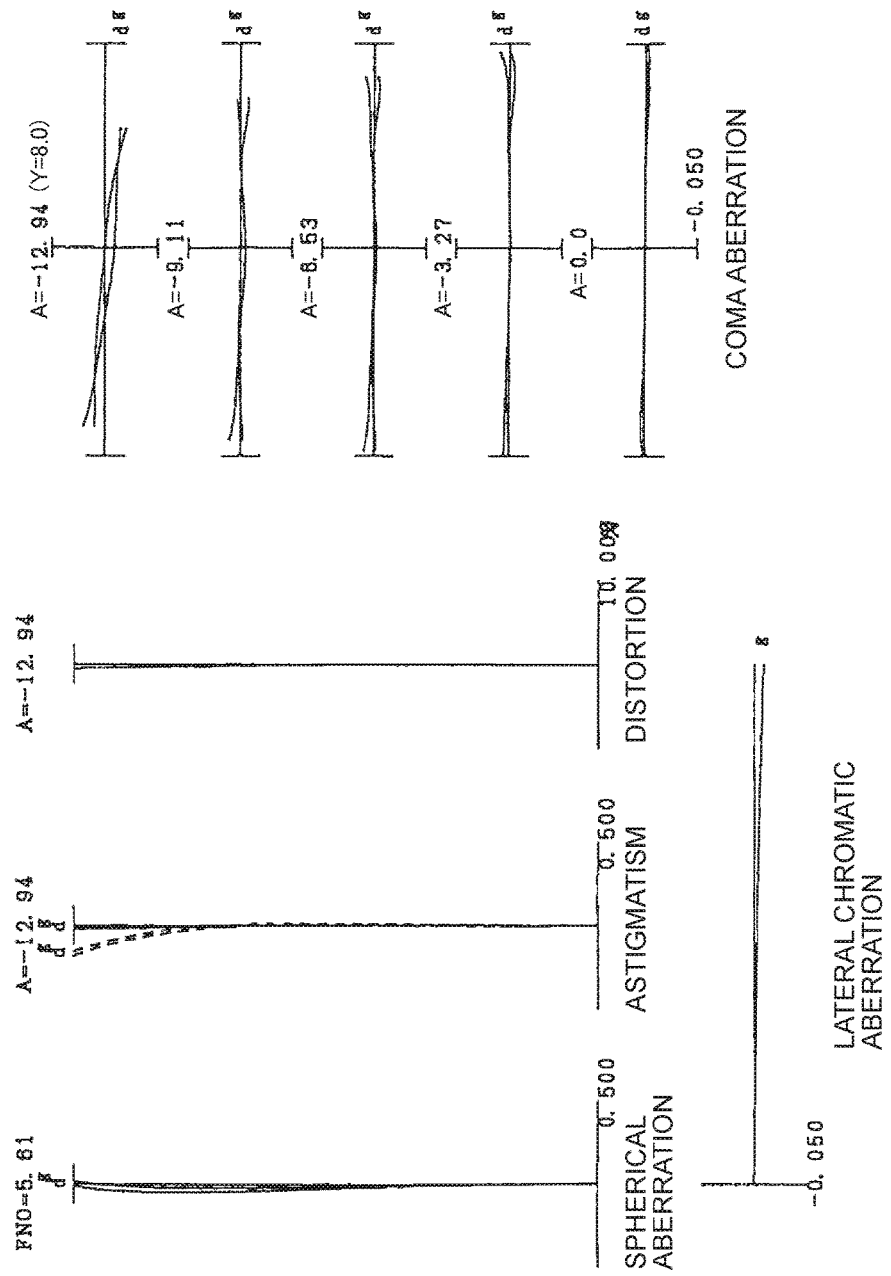
Figure 15A:
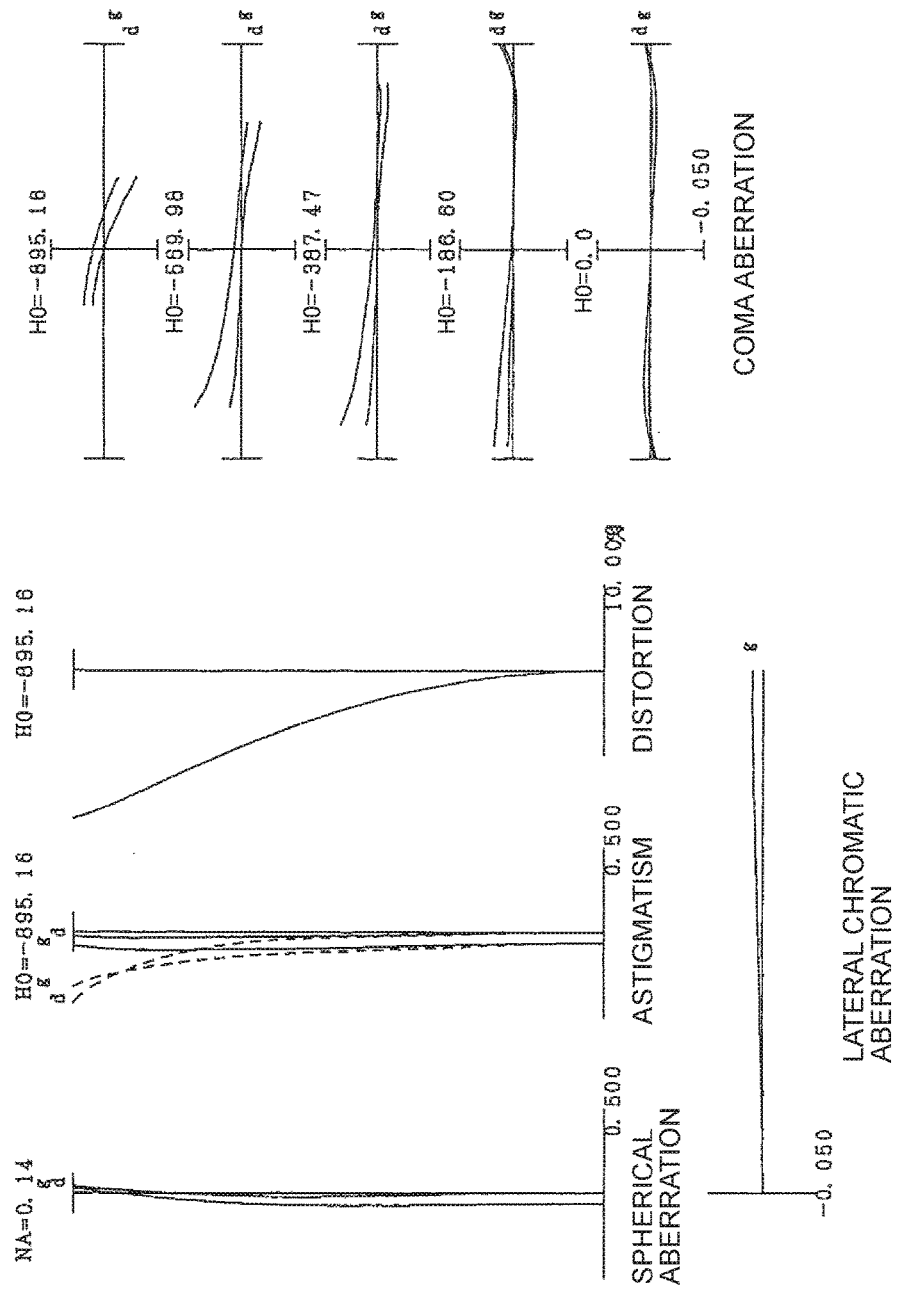
FIGS. 15A, 15B, and 15C respectively illustrate graphs showing various aberration upon focusing on a short-distance object focusing in a wide-angle end state, intermediate focal length state, and telephoto end state (1.00 m of a distance between object images) of the zoom optical system according to Example 4.
Figure 15B:
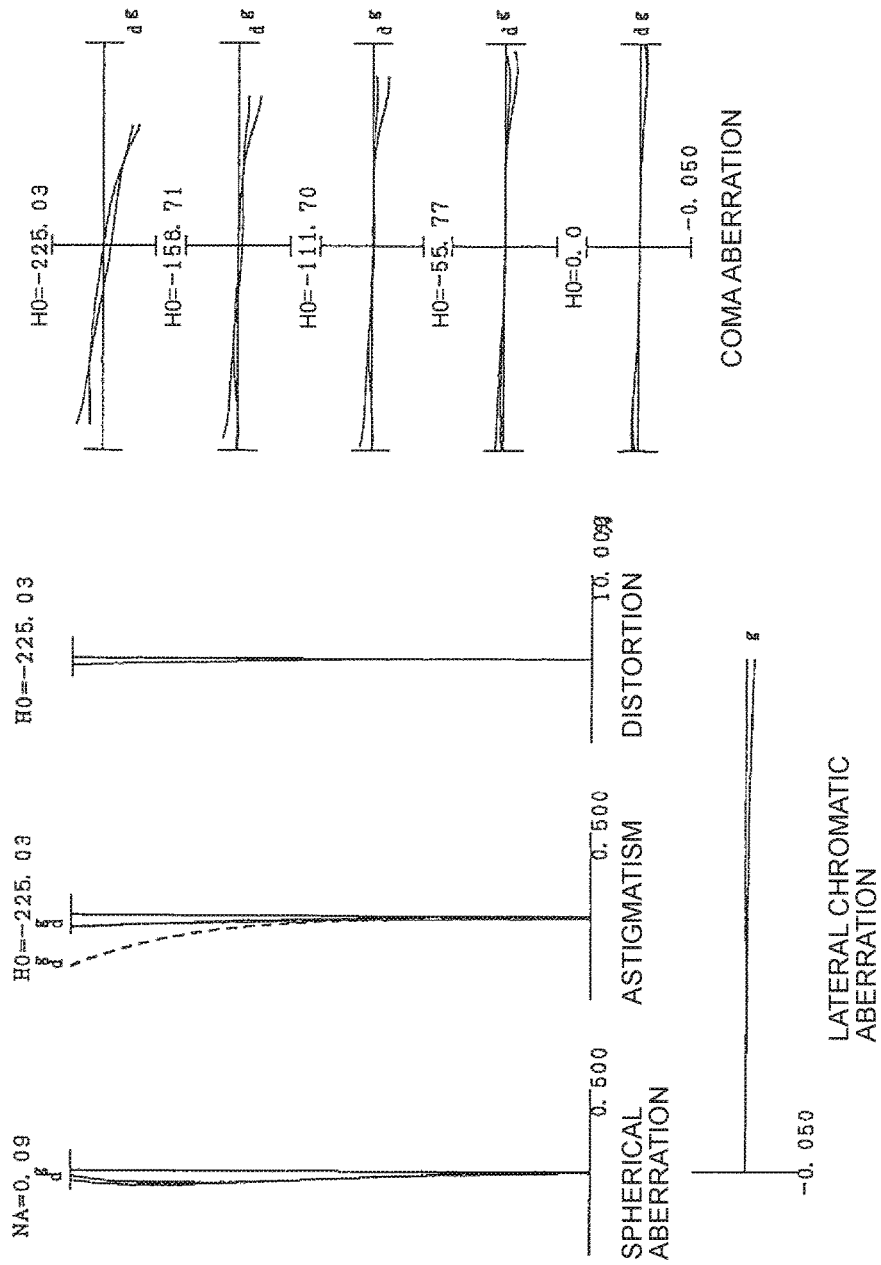
Figure 15C:
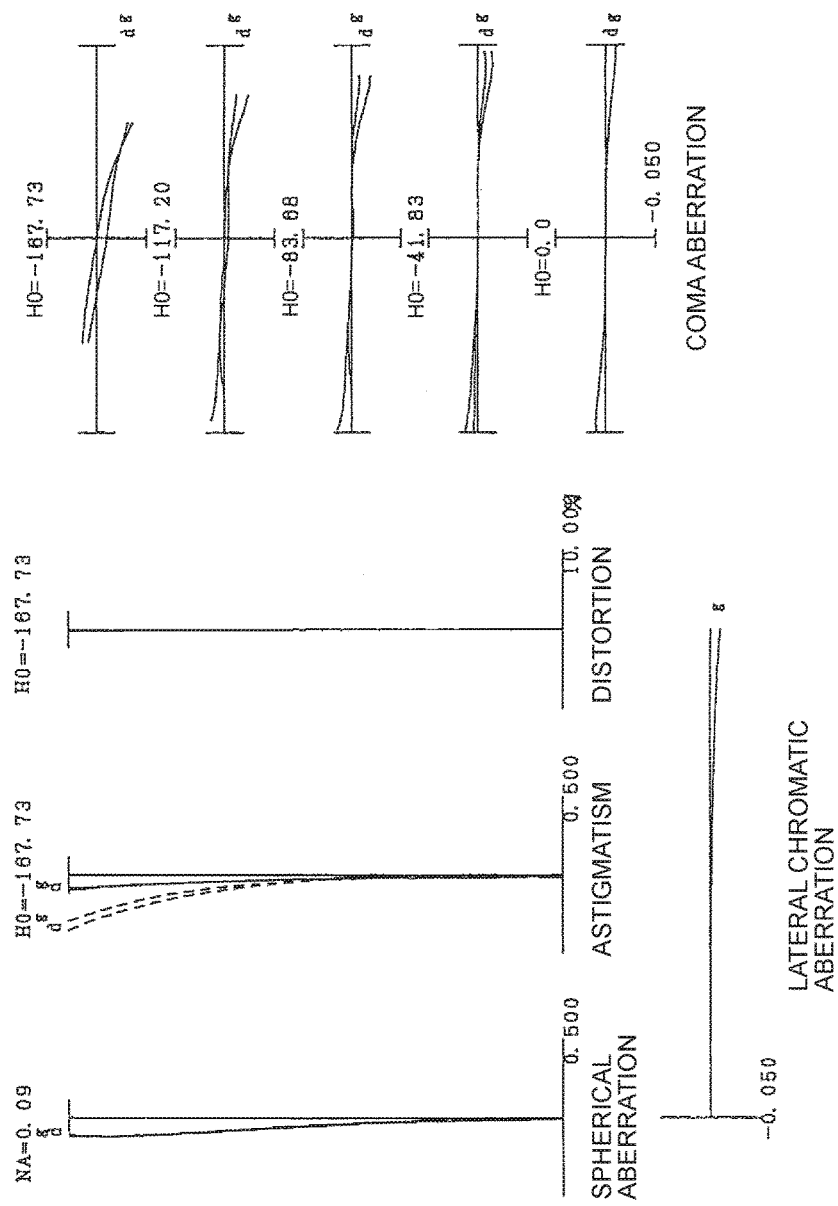
Figure 16A:
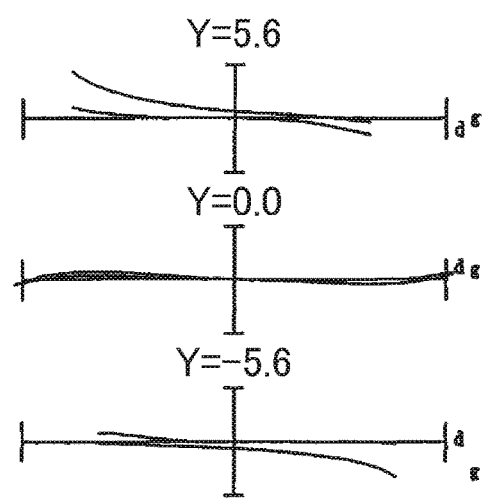
FIGS. 16A, 16B, and 16C respectively illustrate meridional lateral aberration when correcting image blur upon focusing on an infinity object in a wide-angle end state, intermediate focal length state, and telephoto end state (shift amount of a vibration-free lens group=0.1 mm) of the zoom optical system according to Example 4.
Figure 16B:
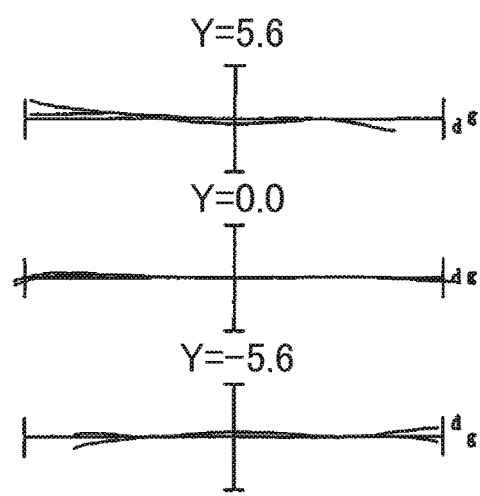
Figure 16C:
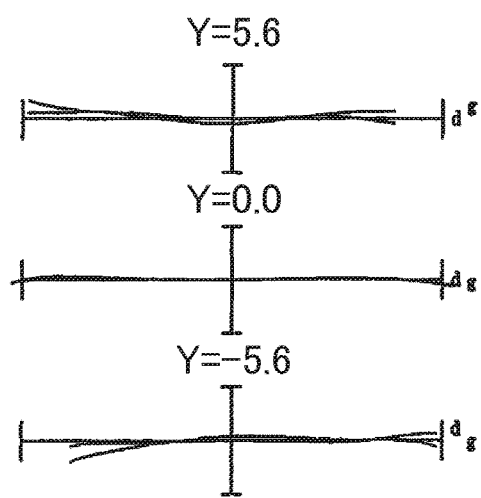

FIGS. 14A, 14B and 14C illustrate graphs showing various aberrations (spherical aberration, astigmatism, distortion, coma aberration, and lateral chromatic aberration) upon focusing on infinity regarding the zoom optical system ZL4 according to Example 4, where FIG. 14A depicts a wide-angle end state, FIG. 14B depicts an intermediate focal length state, and FIG. 14C depicts a telephoto end state. FIGS. 15A, 15B and 15C illustrate graphs showing various aberrations (spherical aberration, astigmatism, distortion, coma aberration, and lateral chromatic aberration) upon focusing on a short-distance object regarding the zoom optical system ZL4 according to Example 4 (1.00 m of distance between the object and image), where FIG. 15A depicts a wide-angle end state, FIG. 15B depicts an intermediate focal length state, and FIG. 15C shows a telephoto end state. FIGS. 16A, 16B, and 16C illustrate graphs showing meridional lateral aberration when correcting image blur upon focusing on infinity regarding the zoom optical system ZL4 according to Example 4 (shift amount of a vibration-free lens group=0.1 mm), where FIG. 16A depicts a wide-angle end state, FIG. 16B depicts an intermediate focal length state, and FIG. 16C depicts a telephoto end state. In the present example optical performance when controlling vibration, as illustrated in FIGS. 16A, 16B and 16C, is illustrated in a meridional lateral aberration diagram corresponding to a screen center and an image height ±5.6 mm.

As found based on each graph showing aberrations illustrated in FIGS. 14A, 14B and 14C, FIGS. 15A, 15B and 15C, and FIGS. 16A, 16B and 16C, in the zoom optical system ZL4 according to Example 4, various aberrations are appropriately corrected covering a range of from a wide-angle end state to a telephoto end state, and a range from an infinity focusing state to a short-distance focusing state, therefore high optical performance can be obtained. It is found that high image-forming performance can be obtained upon correcting image blur.

According to each example above, it is possible to realize the zoom optical system in which the focusing lens group is small, and which has high optical performance upon zooming and focusing.

According to each example above, it is possible to realize the zoom optical system having high optical performance over a whole zoom range.

According to each example above, it is possible to realize the zoom optical system having high optical performance also when correcting image blur.

In order to make the present invention understandable, the descriptions were made with elements of the embodiments, however, needless to say, the present invention is not limited to the above. The following contents can be suitably adopted within a range which does not spoil the optical performance of the zoom optical system of the present application.

Although as examples of values of the zoom optical system ZL according to the first to fourth embodiments, four groups, five groups, and six group configurations are exampled, however they are not limited to those configurations, therefore another group configuration (for instance, seven groups, etc.) can be adopted. Specifically speaking, this is applicable to a configuration in which a lens or a lens group is added closest to the object, or a configuration in which a lens or a lens group is added closest to the image. Note that a lens group means part which has at least one lens separated with an air distance which changes upon zooming.

In the zoom optical systems ZL according to the first to fourth embodiments, in order to perform focusing from an infinity object to a short-distance object, it is appreciated that part of lens group, a whole one lens group, or a plurality of lens groups is configured to move in the optical axis direction as a focusing lens group. Although in the present embodiment the third lens group G3 is exampled as a focusing lens group, however, at least part of the second lens group G2, at least part of the third lens group G3, at least part of the fourth lens group G4, or at least part of the fifth lens group G5 can be configured as the focusing lens group. This focusing lens groups are applicable to autofocus, and suitable for driving by a electromotor for the autofocus (for instance, an ultrasonic motor, etc.).

In the zoom optical systems ZL according to the first to fourth embodiments, although the fourth A sublens group G4A is exampled as a configuration in which image blur generated due to camera shake, etc. is corrected by moving any one of a whole lens group or partial lens group as a vibration-free lens group in a manner of having a component in the direction perpendicular to the optical axis, or rotating and moving (swinging) them in an inner surface direction including the optical axis, this is not limited as above, for example, at least part of the third lens group G3, at least part of the fourth lens group G4, or at least part of the fifth lens group G5 may be configured of the vibration-free lens group.

In the zoom optical systems ZL according to the first to fourth embodiments, a lens surface may be configured of a spherical surface or a plane, or configured of an aspherical surface. In case that a lens surface is a spherical surface or a plane, it is possible to easily have lens processing and an assembly adjustment, and to prevent degradation of optical performance due to errors of the processing and the assembly adjustment, thus it is preferable. It is preferable because there is less degradation of depiction performance when an image surface is shifted. In case that a lens surface is an aspherical surface, the aspherical surface may be formed as any one of an aspherical surface which is formed through grinding processing, a glass mold aspherical surface which glass is formed into an aspherical surface configuration using a mold, and a complexed aspherical surface which resin is formed on a surface of glass into an aspherical surface configuration. It is appreciated that a lens surface is formed as a diffractive surface, additionally a lens is formed as a graded-index lens (GRIN lens) or a plastic lens.

In the zoom optical systems ZL according to the first to fourth embodiments, it is preferable that the aperture stop S is disposed in the fourth lens group G4, or in its vicinity. Note that it is appreciated that instead of providing a member as an aperture stop, the role is substituted with a frame of the lens.

In the zoom optical systems ZL according to the first to fourth embodiments, an antireflection film having high transmittivity in a large wavelength band may be applied to each lens surface in order to reduce flare and ghost and attain high optical performance with high contrast.

EXPLANATION OF NUMERALS AND CHARACTERS

ZL (ZL1-ZL4) Zoom optical system
G1 First lens group
G2 Second lens group
G3 Third lens group
G4 Fourth lens group
G4A Fourth A sublens group
G4B Fourth B sublens group
G5 Fifth lens group
G6 Sixth lens group
S Aperture stop
I Image surface
1 Camera (Optical device)

The invention claimed is:

1. A zoom optical system comprising, in order from an object along an optical axis, a first lens group having positive refractive power, a second lens group having negative refractive power, a third lens group having positive refractive power, a fourth lens group having positive refractive power, and a fifth lens group, a distance between the first lens group and the second lens group, a distance between the second lens group and the third lens group, a distance between the third lens group and the fourth lens group, and a distance between the fourth lens group and the fifth lens group changing upon zooming, a lens group arranged closest to an image being fixed relative to an image surface upon zooming, the third lens group moving along the optical axis upon focusing, and the following conditional expression being satisfied:

$0.480 < f3/ft < 4.000$ where ft denotes a focal length of the zoom optical system in a telephoto end state, and
f3 denotes a focal length of the third lens group.

2. A zoom optical system according to claim 1, wherein the following conditional expression is satisfied:

$0.900 < (-f2)/fw < 1.800$ where fw denotes a focal length of the zoom optical system in a wide-angle end state, and
f2 denotes a focal length of the second lens group.

3. A zoom optical system according to claim 1, wherein the following conditional expression is satisfied:

$0.600 < f3/f4 < 4.000$ where f4 denotes a focal length of the fourth lens group.

4. A zoom optical system according to claim 1, wherein only the third lens group moves along the optical axis upon focusing.

5. A zoom optical system according to claim 1, wherein the third lens group consists of one lens component.

6. A zoom optical system according to claim 1, wherein the third lens group consists of a single lens.

7. A zoom optical system according to claim 1, wherein the third lens group comprises a lens made from an optical material satisfying the following conditional expression:

$48.00 < v3$ where v3 denotes an Abbe number of the optical material at d-line.

8. A zoom optical system according to claim 1, wherein at least one lens surface in the third lens group is aspherical.

9. A zoom optical system according to claim 1, wherein an aperture stop is disposed between the third lens group and the fourth lens group.

10. A zoom optical system according to claim 1, wherein the following conditional expression is satisfied:

$0.470 < f4/ft < 0.900$ where f4 denotes a focal length of the fourth lens group.

11. A zoom optical system according to claim 1, wherein the lens group arranged closest to the image has positive refractive power.

12. A zoom optical system according to claim 1, wherein the following conditional expression is satisfied:

$3.000 < fR/fw < 9.500$ where fw denotes a focal length of the zoom optical system in a wide-angle end state, and
fR denotes a focal length of the lens group arranged closest to the image.

13. A zoom optical system according to claim 1, wherein the lens group arranged closest to the image is the fifth lens group.

14. A zoom optical system according to claim 1, wherein a lens group arranged closest to the image is a sixth lens group.

15. A zoom optical system according to claim 1, wherein the third lens group moves toward the image upon focusing from infinity to a short distance.

16. A zoom optical system according to claim 1, wherein the first lens group moves toward the object upon zooming from a wide-angle end state to the telephoto end state.

17. A zoom optical system according to claim 1, wherein a distance between the first lens group and the second lens group increases upon zooming from a wide-angle end state to the telephoto end state.

18. A zoom optical system according to claim 1, wherein a distance between the second lens group and the third lens group decreases upon zooming from a wide-angle end state to the telephoto end state.

19. A zoom optical device comprising the zoom optical system according to claim 1.

20. A method for manufacturing a zoom optical system, comprising:
   disposing, in order from an object along an optical axis, a first lens group having positive refractive power, a second lens group having negative refractive power, a third lens group having positive refractive power, a fourth lens group having positive refractive power, and a fifth lens group,
   each lens group being arranged in a lens-barrel such that
   a distance between the first lens group and the second lens group, a distance between the second lens group and the third lens group, a distance between the third lens group and the fourth lens group, and a distance between the fourth lens group and the fifth lens group change upon zooming, and
   a lens group arranged closest to an image is fixed relative to an image surface upon zooming, and
   the third lens group moves along the optical axis upon focusing, and
   the following conditional expression is satisfied:

$$0.480 < f3/ft < 4.000$$

where ft denotes a focal length of the zoom optical system in a telephoto end state, and
   f3 denotes a focal length of the third lens group.

21. A zoom optical system comprising, in order from an object along an optical axis, a first lens group having positive refractive power, a second lens group having negative refractive power, a third lens group having positive refractive power, a fourth lens group having positive refractive power, and a fifth lens group,
   a distance between the first lens group and the second lens group, a distance between the second lens group and the third lens group, a distance between the third lens group and the fourth lens group, and a distance between the fourth lens group and the fifth lens group changing upon zooming,
   a lens group arranged closest to an image being fixed relative to an image surface upon zooming, and
   the following conditional expressions being satisfied:

$$0.480 < f3/ft < 4.000$$

$$-0.100 < (d3t-d3w)/fw < 0.330$$

where ft denotes a focal length of the zoom optical system in a telephoto end state,
   f3 denotes a focal length of the third lens group,
   fw denotes a focal length of the zoom optical system in a wide-angle end state,
   d3w denotes a distance on the optical axis from a lens surface arranged closest to an image side of the third lens group to a lens surface arranged closest to an object side of the fourth lens group in the wide-angle end state, and
   d3t denotes a distance on the optical axis from the lens surface arranged closest to the image side of the third lens group to the lens surface arranged closest to the object side of the fourth lens group in the telephoto end state.

22. A zoom optical system according to claim 21, wherein the lens group arranged closest to the image has positive refractive power.

23. A zoom optical system according to claim 21, wherein the following conditional expression is satisfied:

$$3.000 < fR/fw < 9.500$$

where fR denotes a focal length of the lens group arranged closest to the image.

24. A zoom optical system according to claim 21, wherein the following conditional expression is satisfied:

$$0.730 < (-f2)/fw < 1.800$$

where f2 denotes a focal length of the second lens group.

25. A zoom optical system according to claim 21, wherein the following conditional expression is satisfied:

$$0.470 < f4/ft < 0.900$$

where f4 denotes a focal length of the fourth lens group.

26. A zoom optical system according to claim 21, wherein the first lens group moves toward the object upon zooming from the wide-angle end state to the telephoto end state.

27. A zoom optical system according to claim 21, wherein the distance between the first lens group and the second lens group increases upon zooming from the wide-angle end state to the telephoto end state.

28. A zoom optical system according to claim 21, wherein the distance between the second lens group and the third lens group decreases upon zooming from the wide-angle end state to the telephoto end state.

29. A zoom optical system according to claim 21, wherein the following conditional expression is satisfied:

$$0.350 < (d1t-d1w)/ft < 0.800$$

where d1w denotes a distance on the optical axis from a lens surface arranged closest to an image side of the first lens group to a lens surface arranged closest to the object side of the second lens group in the wide-angle end state, and
   d1t denotes a distance on the optical axis from the lens surface arranged closest to the image side of the first lens group to the lens surface arranged closest to the object side of the second lens group in the telephoto end state.

30. A zoom optical system according to claim 21, wherein the following conditional expression is satisfied:

$$0.200 < (d2w-d2t)/ft < 0.700$$

where d2w denotes a distance on the optical axis from a lens surface arranged closest to an image side of the second lens group to a lens surface arranged closest to an object side of the third lens group in the wide-angle end state, and
   d2t denotes a distance on the optical axis from the lens surface arranged closest to the image side of the second lens group to the lens surface arranged closest to the object side of the third lens group in the telephoto end state.

31. A zoom optical system according to claim 21, wherein an aperture stop is disposed between the third lens group and the fourth lens group.

32. A zoom optical system according to claim 21, wherein the third lens group moves along the optical axis upon focusing.

33. A zoom optical system according to claim 21, wherein the third lens group moves toward the image upon focusing from infinity to a short distance.

34. An optical device equipped with the zoom optical system according to claim 21.

35. A method for manufacturing a zoom optical system, comprising:
disposing, in order from an object along an optical axis, a first lens group having positive refractive power, a second lens group having negative refractive power, a third lens group having positive refractive power, a fourth lens group having positive refractive power, and a fifth lens group,
each lens group being arranged in a lens-barrel such that a distance between the first lens group and the second lens group, a distance between the second lens group and the third lens group, a distance between the third lens group and the fourth lens group, and a distance between the fourth lens group and the fifth lens group change upon zooming, and
a lens group arranged closest to an image is fixed relative to an image surface upon zooming, and
the following conditional expressions are satisfied:

$$0.480 < f3/ft < 4.000$$

$$-0.100 < (d3t-d3w)/fw < 0.330$$

where ft denotes a focal length of the zoom optical system in a telephoto end state,
f3 denotes a focal length of the third lens group,
fw denotes a focal length of the zoom optical system in a wide-angle end state,
d3w denotes a distance on the optical axis from a lens surface arranged closest to an image side of the third lens group to a lens surface arranged closest to an object side of the fourth lens group in the wide-angle end state, and
d3t denotes a distance on the optical axis from the lens surface arranged closest to the image side of the third lens group to the lens surface arranged closest to the object side of the fourth lens group in the telephoto end state.

36. A zoom optical system comprising, in order from an object along an optical axis, a first lens group having positive refractive power, a second lens group having negative refractive power, a third lens group having positive refractive power, a fourth lens group having positive refractive power, and a fifth lens group,
a distance between the first lens group and the second lens group, a distance between the second lens group and the third lens group, a distance between the third lens group and the fourth lens group, and a distance between the fourth lens group and the fifth lens group changing upon zooming,
a lens group arranged closest to an image being fixed relative to an image surface upon zooming,
the fourth lens group comprising an aperture stop,
the first lens group moving toward the object, and not moving toward the image, upon zooming from a wide-angle end state to a telephoto end state, and
the following conditional expression being satisfied:

$$0.480 < f4/ft < 4.000$$

where ft denotes a focal length of the zoom optical system in a telephoto end state, and
f3 denotes a focal length of the third lens group.

37. A zoom optical system according to claim 36, wherein the following conditional expression is satisfied:

$$0.470 < f4/ft < 0.900$$

where ft denotes a focal length of the zoom optical system in a telephoto end state, and
f4 denotes a focal length of the fourth lens group.

38. A zoom optical system according to claim 36, wherein the lens group arranged closest to the image has positive refractive power.

39. A zoom optical system according to claim 36, wherein the following conditional expression is satisfied:

$$3.000 < fR/fw < 9.500$$

where fw denotes a focal length of the zoom optical system in a wide-angle end state, and
fR denotes a focal length of the lens group arranged closest to the image.

40. A zoom optical system according to claim 36, wherein the following conditional expression is satisfied:

$$0.730 < (-f2)/fw < 1.800$$

where fw denotes a focal length of the zoom optical system in a wide-angle end state, and
f2 denotes a focal length of the second lens group.

41. A zoom optical system according to claim 36, wherein a distance between the first lens group and the second lens group increases upon zooming from a wide-angle end state to a telephoto end state.

42. A zoom optical system according to claim 36, wherein a distance between the second lens group and the third lens group decreases upon zooming from a wide-angle end state to a telephoto end state.

43. A zoom optical system according to claim 36, wherein the aperture stop is disposed in the fourth lens group so as to be closest to the third lens group.

44. A zoom optical system according to claim 36, wherein the third lens group moves along the optical axis upon focusing.

45. A zoom optical system according to claim 36, wherein the third lens group moves toward the image upon focusing from infinity to a short distance.

46. An optical device equipped with the zoom optical system according to claim 36.

47. A method for manufacturing a zoom optical system, comprising:
disposing, in order from an object along an optical axis, a first lens group having positive refractive power, a second lens group having negative refractive power, a third lens group having positive refractive power, a fourth lens group having positive refractive power, and a fifth lens group, and
each lens group being arranged in a lens-barrel such that a distance between the first lens group and the second lens group, a distance between the second lens group and the third lens group, a distance between the third lens group and the fourth lens group, and a distance between the fourth lens group and the fifth lens group change upon zooming, a lens group arranged closest to an image is fixed relative to an image surface upon zooming, the fourth lens group comprises an aperture stop, the first lens group moves toward the object, and does not move toward the image, upon zooming from a wide-angle end state to a telephoto end state, and the following conditional expression being satisfied:

$$0.480 < f4/ft < 4.000$$

where ft denotes a focal length of the zoom optical system in a telephoto end state, and f3 denotes a focal length of the third lens group.

* * * * *